United States Patent [19]
Ida et al.

[11] Patent Number: 6,055,335
[45] Date of Patent: *Apr. 25, 2000

[54] METHOD AND APPARATUS FOR IMAGE REPRESENTATION AND/OR REORIENTATION

[75] Inventors: Takashi Ida, Kawasaki; Yoko Sanbonsugi, Yamato; Takehiko Kagoshima, Tokyo-to; Hiroshi Takahashi, Okegawa, all of Japan

[73] Assignee: Kabushiki Kaisha Toshiba, Kawaski, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/528,408

[22] Filed: Sep. 14, 1995

[30] Foreign Application Priority Data

Sep. 14, 1994 [JP] Japan .................................. 6-220086
Sep. 14, 1994 [JP] Japan .................................. 6-246996
Mar. 29, 1995 [JP] Japan .................................. 7-096114

[51] Int. Cl.$^7$ .................................................. G06K 9/36
[52] U.S. Cl. .................................... 382/232; 364/715.02
[58] Field of Search .................................. 382/249, 232, 382/248; 395/119; 364/516, 715.02; 358/432

[56] References Cited

U.S. PATENT DOCUMENTS

| | | | |
|---|---|---|---|
| 4,694,407 | 9/1987 | Ogden | 395/141 |
| 5,347,600 | 9/1994 | Barnsley et al. | 382/249 |
| 5,416,856 | 5/1995 | Jacobs et al. | 382/249 |
| 5,497,435 | 3/1996 | Berger | 382/249 |
| 5,513,130 | 4/1996 | Redmond | 364/578 |
| 5,568,391 | 10/1996 | Mckee | 364/469.01 |
| 5,666,212 | 9/1997 | Gilge | 358/432 |
| 5,684,893 | 11/1997 | Shikakura | 382/232 |

FOREIGN PATENT DOCUMENTS

| | | |
|---|---|---|
| 3-269782 | 12/1991 | Japan . |
| 4-170685 | 6/1992 | Japan . |

OTHER PUBLICATIONS

Ida, Takashi, et al., Image Segmentation Using Fractal Coding, IEEE Transactions on Circuits and Systems for Video Technology, vol. 5, No. 6, (Dec. 1995), pp. 567–570.

Peli et al; "Multi–Scale Fractal and Correlation Signatures for Image Screening and Natural Clutter Suppression"; *SPIE vol. 1199 Visual Communications and Image Processing IV* (1989), pp. 402–415.

Barnsley et al; "Application of Recurrent Iterated Function Systems to Images"; *SPIE vol. 1001 Visual Communications and Image Processing '88*, pp. 121–131.

Jacquin; "Fractal Image Coding: A Review"; *Proceedings of the IEEE*, vol. 81, No. 10, Oct. 1993, pp. 1451–1465.

*Primary Examiner*—Jon Chang
*Assistant Examiner*—Jayanti K. Patel
*Attorney, Agent, or Firm*—Foley & Lardner

[57] ABSTRACT

An attribute detecting apparatus of data signals obtains a block to which a mapped point belongs, for data signals divided into a plurality of blocks; sequentially repeats mapping processing in such a way that the mapped point belonging to the block is mapped to a similar region in the data signals previously allowed to correspond to the block (by setting an attribute detection position to an initial position of the mapped point and using the preceding mapping point as a new mapped point); and decides the attribute at the attribute detection position on the basis of position data of the mapping points obtained by the repeated mappings. An attribute detecting apparatus suitable for detecting the attributes of the fractal coded video signals can be realized.

2 Claims, 53 Drawing Sheets

(a) METHOD OF USING
N-th MAPPING POINT (b) METHOD OF USING MOVING
RANGE OF MAPPING POINT (c) METHOD OF USING
NO. OF PERIOD (d) METHOD OF USING
PERIODIC TRACK

METHOD AND APPARATUS FOR IMAGE REPRESENTATION AND/OR REORIENTATION

BACKGROUND OF THE INVENTION

The present invention relates to method and apparatus for detecting predetermined attributes (e.g., texture) of data signals (e.g., video and audio signals), and more specifically to a method and apparatus for detecting feature patterns of characters or graphics as the predetermined attributes of video signals (i.e., data signals).

Further, the present invention relates to a method and apparatus for an image segmentation to divide a picture into a plurality of regions to recognize and process the divided regions on the basis of video signal levels, and further to easily represent a boundary of the divided regions.

First, the prior art technique related to the method and apparatus for detecting data signal attributes will be described hereinbelow.

(1) As a novel compression coding technique for a gray-scale image, fractal coding technique has been so far studied (for instance, as disclosed by Document 1: "Fractal Image Coding: A Review", A. E. Jacquin, Proceedings of the IEEE, VOL. 81, No.10, October, 1993). In this technique, an original square picture to be coded is divided into a plurality of blocks, as shown in FIG. 1, and a coder decides a similar region or regions for each block on the basis of the other blocks in the same picture. Here, "similar" implies the relationship between the blocks in which the picture patterns can be roughly equalized to each other, by a linear reduction transform in the picture, a simple pixel arrangement transform (such as revolution in units of 90 degrees and mirror image reversal, etc.), and a liner transform of pixel values. The above-mentioned linear transform is referred to as an affine transform. Here, in the case of digital video signals, since a picture is constructed by a number of discrete pixels, the reduction transform in a picture is the same as the sampling of pixels.

Now, as shown in FIG. 2, the assumption is made that there exists a similar region 152 whose vertical and horizontal sizes are twice as large as those of a block 151, and the block 151 is composed of 4×4 pixels and the similar region 152 is composed of 8×8 pixels. Here, when the pixel arrangement is not transformed, for instance, a pixel 153 located on the upper left side of the block 151 corresponds to a white point 155 of the similar region 152. However, there exists no pixel at this position 155. In this case, therefore, the value of the pixel 153 is determined by an average value of four pixels 154 surrounding the white point 155. As described above, the reduction transform can be obtained by sampling 4×4 pixel data from the 8×8 pixel data.

Further, the fractal coder outputs (a) the position and the sizes of a similar region for each block, (b) the transform method of pixel arrangement, and (c) the data required for pixel value transform method as code data. The outputted coded data are transmitted or stored. In the reduction transform method in a picture, since the coded output data can be decided unequivocally in accordance with the size of the similar region and the size of the previously determined blocks, it is unnecessary to transmit and store the code data.

FIG. 4 is a block diagram showing a prior art fractal coder. Original picture data 301 are stored in a frame memory 302. On the basis of a signal 304 for designating the linear transform applied from a control section 303, picture data 305 in a designated region are read from the frame memory 302, and then inputted to a size reduction transform section 306. The size reduction transform section 306 reduces the picture data 305 in the region to the same size of the block (i.e., the same number of pixels of the block). The reduced data 307 are transmitted to the transform section 308. The transform section 308 executes the aforementioned-mentioned linear transforms other than the size reduction transform, and the transformed data 309 are inputted to a difference section 311. On the other hand, the block data 310 are inputted from the frame memory 302 to the difference section 311. The difference section 311 calculates a difference between the block data 310 and the transformed data 309, and transmits a difference 312 to a control section 303. As described above, the control section 303 designates several sorts of linear transforms, and decides the linear transform of the minimum difference 312 as the similarity transform of the block. The decided data are outputted as codes 313 to the outside.

FIG. 3 is a block diagram showing a prior art fractal decoder for decoding an original picture on the basis of the codes transmitted from the fractal coder as described above. In the drawing, codes 501 are inputted to a transform section 502. Further, an original picture is previously stored in a frame memory 503. Any images can be used as the original picture. In accordance with the data included in the codes 501, the similar region data 504 for each block are read from the frame memory 502. The similar region data 504 are processed in accordance with the data included in the codes 501. The processing executed by the transform section 501 is intra-picture reduction transform, pixel arrangement transform, and pixel value transform. The transformed data 505 are transmitted to the frame memory 503, and overwritten on the corresponding blocks of the frame memory 503. The above-mentioned rewriting of pixel values are executed for all the blocks, respectively to obtain a first replacement picture. After that, on the basis of the first replacement picture, the similar replacement as with the case of the first replacement is executed again to obtain a second replacement picture. After the above-mentioned replacements have been iterated several times, since the picture stored in the frame memory 503 can be converged to a picture roughly equal to the original picture, the converged picture is outputted to the outside as a reconstructed image 506. The reconstructed image 506 will not change any more even if replaced repeatedly. In other words, the following expression can be obtained $$F(A)=A$$

where A denotes a reconstructed image and F denotes a replacement transform.

The fact that an image is reconstructed on the basis of the fractal coding/decoding is to obtain an image A which can satisfy the above expression. In the case where the transform F is the reduction transform, the conventional method utilizes such a nature that any image can approach an image A gradually after the replacement transforms F have been iterated.

FIG. 5A is a block diagram showing a prior art fractal decoder. First, any desired initial pictures can be stored in a picture memory 401. In general, this initial picture is different from an original picture. Input codes 402 are read from a storage medium 403, for instance. Further, similarity region data 405 of the first block are read from the picture memory 401. The data 405 read from the picture memory 401 are transformed by a position transform section 404 in accordance with the transform designated by the position transform codes 406 of the first block, and then transmitted to a pixel value transform section 407. In the pixel value transform section 407, the transform executed is designated by the pixel value transform codes 408 of the first block. The transformed data 409 are returned to the picture memory 401. In the picture memory 401, the first block pixels are replaced with the transformed data. The pixel replacement by the similarity transform as described above are executed for the second block and after in the same way, to obtain the first transformed picture. The obtained picture is different from the original picture in general.

After that, the similar replacement transforms for each block are executed by use of the first transformed picture stored in the picture memory 401, to obtain the second transformed picture. By repeating the above-mentioned replacement transforms, the picture in the picture memory 401 is converged gradually to a picture roughly equal to the original picture. The converged picture is outputted as the reproduced picture, and then displayed on a display unit 410, for instance.

On the other hand, as the fractal codes represent a geometrical structure of a picture as codes, it is possible to consider that the attribute at each portion of the video signals can be discriminated, by use of data of the block and the similar region included in the codes. The discrimination as to which region the pixels in a picture belong to is considered to be effective for division of the picture. The division of the picture region can be applied to various fields. For instance, after a picture including a plurality of objects has been divided into a plurality of regions for each object, these regions can be synthesized again in any desired arrangement or the sorts of the objects can be recognized on the basis of the shapes of the regions. Further, in the compression coding of the video signals, it is possible to allocate many bits to only important regions from the visual standpoint, to improve the subjective picture quality. Therefore, the technique of the image segmentation is important as the basic technique for these applications. However, there have been not yet proposed any method of detecting the attributes of the data signals (e.g., original video signals) from the fractal codes and further the method of the image segmentation on the basis of the detected attributes.

Further, in the prior art method as described with reference to FIG. 3, since the frame memory is required to store pixel values for each picture in the fractal decoder, there exists a problem in that the apparatus scale and cost thereof both increase. In addition, when only a part of an image is required to be reconstructed, in the prior art method, after the entire image has been once reconstructed, any desired part is cut away from the entire image, while discarding the other remaining portions. In this method, however, wasteful calculations are inevitably executed for the reconstruction of the unnecessary portion, thus it being not preferable from the standpoint of processing efficiency.

Here, in the case where there exists a picture data base (in which a great number of pictures are stored in the form of fractal coded data) and the stored data base can be retrieved, this will be taken into account.

When any desired picture is found, in general, the picture codes are read from the data base to reproduce the original picture, and the read picture codes are displayed on the display unit for each picture. In this retrieval, however, in many cases it is sufficient when a simple picture indicative of a rough picture size and luminance value or a picture impression can be seen, without necessarily seeing its own original picture. Therefore, since the simple picture can be formed by a smaller quantity of calculations and a smaller circuit scale, as compared with the original picture, it is possible to save the retrieval time and cost. In particular, when a simple binary picture can be formed, it is possible to display the picture, without use of a high gradation display of higher cost.

Further, when an original picture is processed (e.g., morphing or deforming), in general an original picture is first reproduced on the basis of the compressed data; the compressed data are processed in accordance with the conventional method on the basis of light and dark picture levels; and the processed picture is compressed again for transmission or storage. However, when the compression and the reproduction are repeated many times as described above, there exists a problem in that the picture becomes obscure or distorted, with the result that the picture quality deteriorates gradually. Further, since the coder and the decoder must be both required, there exists a problem in that the hardware scale inevitably increases.

(1) As described above, since the fractal codes include the geometrical structure of a picture, when the attributes of the respective portions of the picture and other data signals can be discriminated by use of the data of the block and the similar region related to the codes, the obtained attributes seem very useful to divide the picture region. However, there have been not yet so far proposed the method of detecting the attributes of data signals (e.g., the original video signals) from the fractal codes and further the method of dividing the region on the basis of the detected attributes.

Further, in the prior art technique, since the frame memory is required to store the pixel values for one picture in the fractal decoder, there exists a problem in that the system scale and cost thereof increases. Further, when only a part of a picture is required to be reproduced, after the entire picture has been once reproduced, since a desired part is cut way while discarding the other remaining parts, there arises another problem in that the wasteful calculations are executed for unnecessary parts, with the result that the processing efficiency is not high.

(2) In the prior art picture forming apparatus, even in the case where a simple picture is sufficient (as with the case of a data retrieval from a data base in which a great number of pictures are stored in the form of codes), since an original picture has been so formed, many reproduction calculations are required to be executed, with the result that there arises a problem in that the circuit scale increases and a high-costly multi-gradation display unit must be prepared to display a picture.

In addition, when the picture is processed on the light and dark level, such problems arise that the picture quality deteriorates gradually during the compression reproduction and further the coder and decoder both must be prepared.

On the other hand, there exists the following prior art technique for extracting the feature pattern.

Conventionally, the technique of recognizing characters (e.g., hand-written letters) has been important and widely used in practice in the fields of mail sorting or the hand-written letter input. In the current technique, however, since it is difficult to cut off the characters as a pattern in a unit of one character, the cutting-off of the characters is supplemented by recognizing a meaning indicated by the character (knowledge information such as a radical). Here, if the character size can be detected before the processing in which the knowledge information is used, since the succeeding recognition can be executed more easily, there exists a need of developing a technique for detecting the character size.

Further, at the pre-processing of recognition of a picture in which a plurality of textures are mixed (fine patterns are distributed uniformly), there exists a need of detecting the size of each texture. Or else, there exists another need such that a pitch period of an audio signal is required to be detected to facilitate processing of the succeeding recognition.

It has been known that the fractal dimensions are used to detect the feature pattern size of these signals. Here, the fractal dimensions can represent a complexity of signals (e.g., video signals) by an identifier value (See "Fractal Mathematical Principle", Applied Mathematics I, by Yamaguchi, Hata, and Kigami, IWANAMI COURSE, April, 1993). Further, there are some methods of obtaining the fractal dimensions. Here, however, a Blanket-Covering method (one of the fractal dimension obtaining methods) will be explained hereinbelow (See, T. Peli, V. Tom, B. Lee, "Multi-Scale Fractal and Correlation Signatures for Image Screening and Natural Clutter Suppression", SPIE vol, 1199, Visual Commun. and Image Processing IV, 1989).

Now, an image curved surface (three dimensional) composed of a set of dots (each of whose length indicates an intensity of luminance value (an integer value) at each pixel) and a series $\{\epsilon_k\}$ (k=0, 1, ...) of scale $\epsilon_k$ (>0) are considered for the respective pixels in the two-dimensional picture plane in a direction perpendicular to the picture. Further, the above-mentioned image curve is covered with a blanket with a width $\epsilon_k$ in a certain scale $\epsilon_k$ on both the upper and lower sides thereof. Here, if the upper surface of the blanket over the pixel (i, j) is denoted by $u_{i,j}$ ($\epsilon_k$); if the lower surface of the blanket under the pixel (i, j) is denoted by $b_{i,j}$ ($\epsilon_k$); and if the luminance value (an integer value) at the pixel (i, j) is denoted by $g_{i,j}$ since $u_{i,j}(\epsilon_0)=b_{i,j}(\epsilon_0)=g_{i,j}$, the upper surface $u_{i,j}$ ($\epsilon_k$) of the blanket over the pixel (i, j) and the lower surface $b_{i,j}$ ($\epsilon_k$) of the blanket under the pixel (i, j) can be obtained gradually as follows:

$$u_{i,j}(\epsilon_k) = \max\{u_{i,j}(\epsilon_{k-1}) + 1, \max_{m,n \in \eta}\{u_{m,n}(\epsilon_{k-1})\}\}$$

$$b_{i,j}(\epsilon_k) = \min\{b_{i,j}(\epsilon_{k-1}) + 1, \min_{m,n \in \eta}\{b_{m,n}(\epsilon_{k-1})\}\}$$

$$\eta = \{(m, n)|(m - i)^2 + (n - j)^2 \le 1\}$$

Here, since $\epsilon_0=0$, the change B ($\epsilon_k$) of the bright surface of the blanket can be obtained as $$B(\epsilon_k) = \left\{\sum_{i,j}(u_{i,j}(\epsilon_k) - b_{i,j}(\epsilon_k))\right\}/2\epsilon_k$$

This B ($\epsilon_k$) is referred to as a measure relative to the scale ($\epsilon_k$). In other words, the scale corresponds to a unit for obtaining the measure B ($\epsilon_k$). As shown in FIG. 5B, when the logarithm of the measures are taken on the ordinate and the logarithm of $\epsilon$ is taken on the ordinate, there exists a case where a straight line having a gradient a can be obtained. Here, (D=2−a) obtained on the basis of the gradient of the straight line is referred to as fractal dimension.

In general, since the measure is a rate corresponding to a volume or area determined unequivocally relative to the scale, the linear relationship obtained when the measure and the scale are both taken in logarithmic scale is characterized by the fractal dimension.

Conventionally, the method of extracting the feature region of a picture by use of the fractal dimension as described above has been studied. For instance, in Japanese Published Unexamined (Kokai) Patent Application No. 4-17068, blocks of an object picture is divided gradually into smaller blocks, until the fractal dimension will not change according to the size of the divided blocks. In the conventional method using the fractal dimension as described above, however, it has been impossible to extract the regions without block division.

Further, Japanese Published Unexamined (Kokai) Patent Application No. 3-269782 discloses the method of extracting the character region from the character picture by use of the fractal dimension. In this method, the fractal dimension is obtained at all the pixels in both vertical and horizontal directions of a picture, and the region indicative of the character region is discriminated on the basis of the fractal dimension pixel by pixel. However, since the region is divided in unit of pixel, it takes much time, and further it has been impossible to easily specify the pattern size by grasping the character roughly.

As described above, in the prior art methods, when the size of the feature pattern of the data signals is required to be detected, there exists a problem in that the processing is very troublesome and thereby complicated, with the result that it has been impossible to easily detect the size of the pattern.

Finally, the prior art technique related to the region division of data signals will be explained hereinbelow by taking video signals as a practical example of data signals.

The technique for dividing a picture into partial regions (in which the local feature of video data (e.g., luminance value, color, etc.) is uniform) is referred to as region division. Conventionally, this region division of a picture has been important technique, and widely applied to various fields such as video signal coding, video signal processing, character region recognition, etc. However, the region division has been mainly used when video signals on a plane picture are processed.

Further as a technique related to this region division, there exists a technique of representing the region boundaries (referred to as region boundary representation, hereinafter). When data obtained as a result of region division are stored, transmitted through a communication path, or utilized as coding, this region boundary representation technique is required. Therefore, an important problem is how to represent the region boundary by use of the smallest possible amount of data, which has been so far studied.

First, the prior art technique of region division will be described hereinbelow.

The technique for dividing a picture into partial regions (at which the local feature of video data (e.g., luminance value, color, etc.) is uniform) is referred to as region division. Conventionally, this region division of a picture has been important technique, and widely applied to various fields such as video signal coding, video signal processing, character region recognition, etc. However, the region division has been mainly used when video signals on a plane picture are processed.

For instance, as a simple region expansion method, the regions are divided on the basis of the luminance values between the adjacent pixels (See IMAGE ANALYSIS HANDBOOK, Editors: Takagi, Shimoda, Tokyo University Publishers' Assoc. October, 1991). With reference to FIG. 6, the processing flow is as follows: the luminance value at a non-classified pixel is compared with those of the other adjacent pixels. When a difference between the two is less than a threshold value θ, two pixels are synthesized (or integrated) and a label is attached thereto. The same operation is repeated until the region cannot be synthesized. This method is the most basic and simple method.

Although the region division performance thereof is slightly lower than that of the other complicated method, since the threshold value θ is a clear parameter, this method is easy to use.

Further, the region division methods can be classified into an integration method, a separation and/or integration method and pixel coupling method by changing the region forming process. Further, there exists an intermediate method by which the feature space is further classified and after that the region is divided. In these methods, however, where the feature rate to the region has an ambiguity due to the picture uncleanness or noise, it has been impossible to execute the region division at a sufficiently high precision. To overcome this problem, the regions have been so far divided in combination with the relaxation method for removing the ambiguity. However, it takes much time to set many parameters for some pictures, so that it has been difficult to divide the regions of complicated texture or the regions of less luminance difference.

Further, there exists a need of utilization of the picture region division such that any region is required to be extracted from the picture. However, when the boundary of the region requested to extract is of complicated shape, even if the region can be grasped roughly, it has been difficult to extract a region of complicated shape accurately.

Further, in the method and apparatus for compressing and reproducing a picture by dividing the picture into regions and then coding the divided regions, since the picture regions are transmitted as the additional data, a huge data amount must be processed. Further, as shown in FIG. 7, there exists a method such that a shape $I_s$ of a region is approximated by a simple shape $I_A$ to reduce the amount of data. Further, various methods of transmitting the region shapes have been proposed such that: the regions are divided into several blocks and each block is approximated by segments (See "Image Coding by Utilization of Contour Fractal Characteristics" by Suzuki, Sumiyoshi, Miyauchi; Proceedings of TV Society, Vol. 48, No. 1, pp. 69–77, 1994) or the time-shifted picture regions already obtained are substituted for the regions of an original picture (See "Study of Method of Compensating for Block Size Movement with reference to Preceding Frame" by Kida, Kawashima, Tominaga, All-Japan Meeting of Communications Society, D-179, March 1993).

Further, when any desired region is extracted from a picture in a system (for retrieving and processing pictures after communications and storage as a data base) in accordance with the prior art picture compression method, it has been necessary to reproduce the picture from the compressed data and further to re-compress the reproduced data after processing. In addition, when these processing are repeated, there exists a problem in that the picture quality inevitably deteriorates.

Further, in the method of executing the region dividing on the basis of luminance, a method of executing the region division recurrently by obtaining adaptive threshold value for division has been proposed (See "Recurrent decision method of density threshold and edge detecting threshold on the basis of match evaluation between contour and edge, by Goto, Toriu, Proceedings of Electron Information Communications D-11, Vol. J77-D-II, No. 9, pp. 1727–1734, September, 1994). In these methods, however, there exists a problem in that it takes much time to set many parameters according to a picture or a region of complicated texture is divided too finely, or a region of less difference in luminance cannot be well divided, etc.

The prior art technique related to the region boundary representation will be explained herein below.

The well known method of representing a region boundary is chain coding method (See IMAGE ANALYSIS HANDBOOK, Editors: Takagi, Shimoda, Tokyo University Publishers' Assoc. October, 1991). In this method, the directions that the boundary extends from a starting point are described. This method is effective as the method of describing the contour of a region picture. However, in order to express the region boundary in detail at one-pixel precision, there exists such a problem in that several bits are required for each bit as the data for representing the extending direction of the region boundary.

Further, as one of the fractal coding, there exists Recurrent IFS coding method for coding line drawings after the region boundary has been extracted" (See M. F. Barnsley, A. E. Jacquin, "Application of recurrent iterates function systems to image", SPIE VOL. 1001, Visual Communications and Image Processing, '88, pp. 122–131). In this method, as shown in FIG. 10, a region boundary 8 is divided by several segments 9 corresponding to the afore-mentioned fractal coding block, and the transform parameters 11 for the similar segments 10 corresponding to a similar block are obtained. In this method, however, there exist problems in that the region boundary 8 is detected by use of another method and further the division of the segment 9 and the transform parameters 11 for the similar segments 10 must be both obtained manually, that is, the coding is not automatized. In addition, it is necessary to transmit all the broken points 12 (double circles in FIG. 10) of the firstly divided segment. Further, in order to express a more detailed region boundary, the segment must be divided more finely for more accurate retrieval of the similar segments, thus causing drawbacks such that the number of the broken points 12 increases and thereby the data representative of positions inevitably increases.

SUMMARY OF THE INVENTION

With these problems in mind, therefore, it is a first object of the present invention to provide a method and apparatus for detecting attributes of data signals suitable for detecting attributes of fractal coded data signals.

Further, a second object of the present invention is to provide a picture forming apparatus for forming a simple picture.

Further, a third object of the present invention to provide a method and apparatus for easily detecting a size of a signal feature pattern.

Further, a fourth object of the present invention is to provide a method and apparatus for calculating attributes used for discrimination and for deciding pixel attributes at the same time. In this connection, in the prior art method, the attribute used for discrimination is decided by manual operation, or by calculating another clustering.

Further, a fifth object of the present invention is to provide a method and apparatus for reproducing a picture and for dividing the reproduced picture into regions at the same time. In this connection, in the prior art method, the picture reproduction and the region division are executed separately.

Further, a sixth object of the present invention is to provide a method and apparatus for representing a region boundary in detail by use of a small number of bits. In this connection, in the prior art method, it has been difficult to extract a detailed region boundary and to represent the detailed region boundary by use of a small number of bits.

(1) To achieve the first object, the first aspect of the present invention provides a method of detecting an attribute of data signals, comprising the steps of: dividing data signals into a plurality of blocks; allowing a similar region of the data signals to correspond to each of the divided blocks; defining mapping from a mapped point in the block to a mapping point in the similar region corresponding to the block, for each block; repeating the mapping in sequence by setting an attribute detection position of the data signals to an initial position of the mapped point and further by setting the preceding mapped point as a new mapped point; and deciding the attribute of the attribute detection position of the data signal on the basis of movement of the mapped points.

(2) Here, when the data signals are video signals each having a pixel value at each pixel, the mapped point is defined by a position on a picture plane of the video signals and a pixel value direction thereat; and a pixel value component is decided as the pixel value at the attribute detection position at such an initial position that the pixel value component at the mapped point obtained by setting the attribute detection position to the initial position will not diverge by the repeated mapping.

(3) Further, the first aspect of the present invention provides an attribute detecting apparatus of data signals, comprising: means for obtaining a block to which a mapped point belongs, for data signals divided into a plurality of blocks; mapping means for sequentially repeating mapping such that the mapped point belonging to the block obtained by the obtaining means is mapped to a similar region in the data signals previously allowed to correspond to the block, by setting an attribute detection position to an initial position of the mapped point and by using the preceding mapped point as a new mapped point; and attribute deciding means for deciding the attribute at the attribute detection position on the basis of position data at the mapped points obtained when the mapping are repeated by said mapping means.

(4) Here, when the data signals are video signals each having a pixel value at each pixel; the mapped point is defined by a position on a picture plane of the video signals and a pixel value direction thereat; and said attribute deciding means decides a pixel value component, as the pixel value at the attribute detection position, at such an initial position that the pixel value component at the mapped point obtained with said mapping means by setting the attribute detection position to the initial position will not diverge.

(5) Further, the attribute deciding means comprises means for detecting pixel value component at such an initial position that the pixel value components at the mapped points will not diverge in a positive direction when the mapping is repeated; means for detecting pixel value components at such an initial position that the pixel value components at the mapped points diverge in an negative direction when the mapping is repeated; and pixel value deciding means for deciding a boundary value between the pixel value components diverging in a positive direction and the pixel value components diverging in an negative direction, as a pixel value at the attribute detection position.

(6) Further, the mapping means executes predetermined mapping N-time, and the attribute deciding means comprises storing means for storing block data generated during the repeated mapping in sequence; means for setting an initial value as the pixel value; means for reading block data from the storing means in the reverse direction; pixel value transform means for transforming the pixel value in sequence N times by use of the read pixel value transform data from the similar region to the corresponding block; and pixel value deciding means for deciding the output of the pixel value transforming means as the pixel value at the attribute detection position.

(7) Further, to achieve the second aspect of the present invention, the present invention provides picture forming means comprising: when an original picture is composed of a plurality of coded unit regions, for forming a simple picture of the original picture on the basis of at least one of position transform data and the pixel value transform data selected from the similarity transform data for each predetermined coded unit region.

(8) Here, the simple picture forming means comprises edge detecting means for detecting an edge of an object in a picture on the basis of the position transform data, and means for forming a simple picture by synthesizing the edges.

(9) The edge detecting means obtains the fixed transform points of each coded unit region on the basis of the position transform data, to obtain an edge by collecting the fixed points or by connecting the fixed points.

(10) Further, the edge detecting means obtains vectors indicative of the movement direction due to the position transform on the basis of the position transform data for a plurality of coded unit regions, to decide the position at which the vector directions match each other as an edge.

(11) Further, the simple picture forming means comprises texture picture forming means for forming a texture picture on the basis of the pixel value transform data.

(12) The texture picture forming means comprises means for forming position transform again, to from a picture on the basis of both the formed position transform data and the pixel value transform data.

(13) Further, the image forming apparatus of the second aspect of the present invention comprises input means for inputting manually affine transform data for each coded unit region of a picture composed of a plurality of coded unit regions, and means for forming a picture by use of the input affine transform.

(14) The picture forming apparatus of the second aspect of the present invention comprises means for reading previously obtained affine transform data of a picture composed of a plurality of coded unit regions, and transform correcting means for modifying the read affine transform data partially. Here, the transform correcting means changes the coded values indicative of the position transform data.

(15) Further, the transform correcting means changes the coded values indicative of the pixel vale transform data.

(16) Further in the input means or the transform correcting means for inputting the affine transform data, the affine transform data are inputted or corrected in such a way as to vary slightly with the lapse of time. In the same way, the picture forming means forms a moving picture which changes in sequence with the lapse of time.

(17) Further, the picture forming apparatus of the second aspect of the present invention comprises coding means for outputting the inverse transform data as the affine transform data in such a way that an error between an enlarged transformed picture data of the coded unit region of the picture composed of a plurality of coded unit regions and the picture data of the similar region can be minimized.

(18) Further, the signal feature pattern size detecting apparatus according to the present invention comprises: storing means for storing input signals; scale setting means for setting a plurality of scales for the input signals; measure detecting means for detecting measures of the input signals in each of the set scales; and proper size deciding means for deciding a proper size of the input signals on the basis of the detected measures.

(19) Further, in the signal feature pattern size detecting method of the present invention, the input signals are stored;

a plurality of scales are set for the input signals; measures of the input signals in each of the scales are obtained; and a proper size of the input signals is decided on the basis of the obtained measures.

(20) Further, in the picture region dividing methods according to the present invention; the data signals are video signals and the attribute is a region in a picture; and the apparatus further comprises method of dividing a picture region on the basis of a detected image region including the steps of: a fractal coding step of dividing one picture into a plurality of blocks and obtaining a mapping to each of the similar regions allowed to correspond to each of all the divided blocks; a mapping point deciding step of obtaining a plurality of mapping points in sequence by executing a predetermined transform processing plural times in accordance with the attribute, beginning from the initial point defined as a specific point on coordinates on the basis of a predetermined attribute; a mapping discriminating step for obtaining the mapping to the similar region corresponding to the block, from a block having the transformed mapped point; an attribute content deciding step for deciding a predetermined attribute content at the initial point on the basis of the mapped points obtained by the transform processing executed plural times; and a feature region dividing step for dividing a region corresponding to the mapping, as a specific feature region, in accordance with the predetermined attribute obtained in the attribute content deciding step.

Further, in the present invention, it is possible to decide the attribute of the initial point and to divide the picture, by transforming the initial point by a predetermined mapping several times and by use of at least two of a plurality of mapped points obtained during a plurality of transform processing.

Further, in the present invention, it is possible to decide the attribute at the initial point and the pixel value at the initial point simultaneously, by transforming the initial point by a predetermined mapping and on the basis of the obtained mapping.

Further, in the present invention, in a picture divided into a plurality of blocks, after mapping to each of the similar regions in the picture corresponding to each of the blocks has been obtained for all the blocks, and in a picture region dividing method for obtaining the mapped points $a_{n+1}$ by setting $a_0$ to the initial point and by use of the mapping corresponding to the block having mapped point $a_n$ (n=0, ..., N-1) and further for obtaining the attribute at the initial point by use of the mapped points $a_n$ (n=1, ..., N); a block having both the attribute at a point in an object region and the attribute at a point in a region other than the object region is detected from the regions indicated by the attribute; and a region boundary can be represented by deciding the block position and the mapped point defined in the block, as boundary data.

In the constructions (1) to (20) as described above, the following effects can be obtained:

(1) In the first aspect of the present invention, the mapping of the mapped point can be decided unequivocally on the basis of the positional relationship between the block and the similar region. Here, since the attribute detection position is determined as the initial position, the mapping from the mapped point is repeated. The movement of the mapped point during the mapping can be classified according to the status of the block and the similar region, that is, converges or converged to a periodic track or moves in chaos. Further, if does not move in chaos nor periodically, the mapped point moves roughly along a specific shape, or moves only within a constant region. Further, when other components exist at the mapped point, the components diverges, converges to a constant value, vibrates or others. On the basis of the correspondence between the classification of the movement of the mapped point and the attribute at the attribute detection position, the attribute can be decided.

(2) When the data signals are video signals, since the pixels correspond to the respective positions in a picture one by one, the mapped point can be defined by three dimensions of the position (x, y) and the pixel value (z). Further, the mapping from the block to the similar region is a combination of the transform of the pixel position and the transform of the pixel value. Here, if the mapping is repeated by setting the pixel value of a reconstructed picture to an initial value, the pixel value will not diverge. However, if the mapping is iterated from the pixel value slightly dislocated away from the reconstructed picture, the pixel value component at the mapped point diverges. Therefore, inversely, it is possible to obtain the reconstructed value for each pixel, without use of a frame memory unit, by finding out the pixel value at an initial position at which the pixel value component will not diverge when the mapping is iterated, independently for each pixel.

(3) In the mapping means, the mapping from the mapped point is repeated by setting the attribute detection position to the initial position, the block to which the mapped point belongs is obtained for each mapping, and the mapping is executed from the block to which the mapped point belongs to the similar region corresponding to the block. Here, since the mapping results can be classified into several cases, the attribute deciding means can decide the attribute by finding the corresponding relationship between the classified mapping result and the attribute at the attribute detection position.

(4) When the data signals are video signals, since the pixel value corresponds to each pixel position in a picture, and the position and the pixel value can be defined by three-dimensional mapped point. In the attribute deciding means, the pixel value of the reproduced picture can decide by the pixel value deciding means for deciding the pixel value component as the pixel value at the attribute detection position, at such an initial position that the pixel value component at the mapped point will not diverge by the mapping means.

(5) The attribute means detects the pixel value component at such an initial position that the pixel value components at the mapped point diverge in a positive direction by the repeated mapping, and further the pixel value component at such an initial position that the pixel value components at the mapped point diverge in an negative direction by the repeated mapping. As a result, a boundary value between the pixel value components diverging in a positive direction and the pixel value components diverging in an negative direction can be obtained. Here, since the mapped point which will not diverge lie between the positive diverging mapped point and the negative diverging mapped point, it is possible to obtain the reproduced value for each pixel without use on any frame memory by deciding the boundary between both as the pixel value of the picture.

(6) In the mapping means, the mapping is iterated predetermined N times. In the attribute deciding means, the block data obtained during the repeated processing of the mapping are first stored in sequence in the storing means. Secondly, the initial pixel value is set. Any value can be decided as the initial pixel value when the N is sufficiently large. Further, the block data are read from the storing means in the reverse sequence. The pixel value transforming means executes the pixel value transform N times in the reverse sequence of the mapping means by use of the pixel value transform data from the similar region (corresponding to block) to the block. By the processing, when returning to the attribute detection position, since the pixel value becomes the pixel value of the reproduced picture, it is possible to decide the transformed result as the pixel value at the attribute detection position. Therefore, since a memory for storing only the processed block in sequence is necessary (memory capacity is very smaller than that of the frame memory), it is possible to obtain the reproduced value for each pixel in spite of a memory whose capacity is fairly smaller than that of the conventional one.

(7) In the image forming apparatus of the second aspect of the present invention, a simple picture of an original picture can be formed by use of at least one position transform data or the pixel value transform data of the affine transform data for each coded unit region. Therefore, since it is unnecessary to use all the affine transform data, a picture can be formed by a smaller hardware scale.

(8) Further, since the position transform data originally include edge data of an object in the picture, the object edge can be obtained by use of an appropriate algorithm. Further, when the obtained edges are synthesized, a simple picture can be obtained. Further, since the edge picture can be represented as a binary picture, a low-costly binary display can be used.

(9) Further, as the algorithm for obtaining the edge, the fixed points of the position transform in each coded unit region are obtained. Here, the fixed point is a point which will not change after transformed. Since the fixed points of the position transform lie on the edge, an edge can be obtained by collecting the fixed points or by connecting the fixed points.

(10) Further, as the algorithm for obtaining the edge point, vectors (referred to as flow vectors, hereinafter) indicative of the movement direction (i.e., to which position each pixel is transformed and then moved) due to the position transform on the basis of the position transform data are obtained for a plurality of the coded unit regions. There exists a nature that the direction of the edge matches the directions of flow vectors at the edge portion (however, there exists the case where the direction is opposite to each other). Therefore, when the flow vectors are obtained by the position transforms for a plurality of coded unit regions for each pixel, the portion at which the directions of the flow vectors match each other can be determined as the edge portions.

(11) Further, since the pixel value transform data originally include the texture data, a texture image can be formed by use of an appropriate algorithm, so that a simple picture can be formed by a small-scale circuit.

(12) Further, as the algorithm for obtaining the texture, the position transform is set at random. By doing this, it is possible to form a texture image on the basis of the position transform and a previously obtained pixel value transform data.

(13) In the picture forming apparatus of the second aspect of the present invention, since the similarity transform can be set manually in any desired way for each coded unit region, the picture can be processed in the compressed-picture code level, so that it is possible to prevent the picture deterioration due to repeated compression and reproduction and further to eliminate the coder.

Further, the predetermined similarity transform data can be read and the read similarity transform data can be changed partially. Therefore, when an already-existing picture is required to be modified, it is unnecessary to input all the similarity transform data from the first.

(14) In the transform correcting means, it is possible to deform the shape of an object by changing the code value representative of the position transform data.

(15) In the transform correcting means, it is possible to change the light and dark pattern of a picture, an impression when seen, and the picture quality can be changed by changing the code values representative of the pixel value transform data, in particular.

(16) In the similarity transform data input means or the transform correcting means, since the affine transform data changing slightly with the lapse of time can be set, it is possible to form pictures changing slightly in sequence with the lapse of time by the picture forming means. When the affine transform changes, since the formed picture changes continuously, a smooth moving picture can be formed.

(17) In the picture forming apparatus of the second aspect of the present invention, when the affine transform is decided, an inverse enlarge transform is decided as the affine transform in such a way that an error between the picture data obtained by enlarge-transforming picture data of the coded unit region and the picture data of the similar region can be minimized. Here, when the picture is enlarged by use of codes, the codes related to the position and the magnitude of the similar region (of the position transform data included in the affine transform data) are multiplied by a constant time. Here, when the codes decided by use of the reduction-transformed picture (as with the case of the conventional coder) are used, the enlarged picture is distorted slightly. In contrast with this, in the present invention, since the error is compared on the basis of the level of the actually-enlarged picture, it is possible to prevent a fine distortion not existing on the original picture from being formed.

(18) and (19) As described above, according to the present invention, the input signals are stored; a plurality of scales are set to the stored input signals; the measures of the input signals are obtained in each of a plurality of the set scales; and the proper sizes of the input signals are obtained on the basis of the obtained measures. Therefore, being different from the conventional method, it is unnecessary to execute the image segmentation, so that the signal feature pattern size can be detected easily.

(20) The picture is divided into a plurality of blocks, and the mapping is defined as follows: a point is transformed to a similar region in a picture (which has been previously allowed to correspond to the block to which the point belongs), by the means for obtaining the block having a predetermined point.

The coordinates of the initial point are transformed several times by a predetermined mapping, so that a mapped point can be obtained for each transform, that is, a plurality of mapped points can be obtained. The mapped point can be obtained by the mapping allowed to correspond to the block having the transformed point. At least two of the mapped points are used in a plurality of the obtained mapped points. In other words, in the present invention, even if the mapped points obtained midway is used, during the processing for obtaining the final mapped point obtained as a result of the final transform, it is possible to execute clustering, which is different from the conventional method. Therefore, as far as the two points can be transformed to the attribute region having the other points in the picture, the attribute of the points can be decided, so that the picture can be divided for each attribute related to the point.

Here, since a pixel corresponds to a position of a picture unconditionally, the point can be defined by the three dimensions of the position (vertical and horizontal) and the pixel value. On the basis of the relationship between the block and the similar region, the point mapping can be determined unambiguously, and the point mapping is repeated. The movement of the mapping points can be classified into several cases according to the status of the block and the similar region as follows: the mapping points converges to a periodic track or a point or moves in chaos. Further, the mapping point moves along a specific shape or moves around only within a constant region. Therefore, it is possible to decide the attribute of the initial point before transform by allowing the classified result to correspond to the attribute at the initial point. Further, when the movement of the points are in the same region, the mapped points move around the same region in such a way as to be entangled. Therefore, it is possible to allow a range (in which a representative point moves) to correspond to one attribute, and further to decide the other mapped points moving in the same range as the same attribute.

Further, after the initial point has been transformed by a predetermined mapping, the attribute at the initial point can be decided from the mapped point. At the same time, the pixel value at the initial point can be decided by the mapped point. As a result, the attribute and the pixel value of the picture can be decided simultaneously.

The initial point arranged in a picture plane and stored in the storing means and the mapping data defined for the initial point are both inputted to the transform means. The initial point is transformed repeatedly several times by mapping, and then stored in the storing means. Further, the mapped points outputted from the storing means are inputted to the attribute deciding means, so that a plurality of the attribute at the initial point can be decided. The attributes outputted by the attribute deciding means are inputted to the dividing means. The dividing means outputs the division results of the region of the picture. Further, at the same time, the mapped points outputted from the same storing means are inputted to the pixel value deciding means to decide the pixel value at the initial point corresponding to the mapped point, so that a reproduced picture can be outputted.

When the above-mentioned transform is repeated beginning from a predetermined pixel value, the pixel values can be reconstructed. On the basis of the relationship between the block and the similar block, it is possible to obtain the mapped point at the pixel included in the block. When the mapped point are further mapped repeatedly, if the mapped points match the pixel values of the reconstructed picture, the transformed pixel values will not diverge. However, if do not match, the transformed pixel values diverge. Therefore, it is possible to reconstruct the picture by obtaining the pixel values which will not diverge by the repeated mapping. Here, since the mapping for reproducing the picture and the mapping for obtaining the attribute are the same mapping as already described, the transform means and the storing means can be used in common. Therefore, it is possible to execute the transform for reproducing the picture and the transform for obtaining the mapped points at the same time.

Further, when the image segmentation method according to the present invention is used in particular as the method of extracting and representing only the region boundary, the following functions can be obtained:

The picture is divided into a plurality of blocks, and the mapping is defined as follows: a point is transformed to a similar region in a picture (which has been previously allowed to correspond to the block to which the point belongs), by the means for obtaining the block having the given point.

The coordinates of the initial point are transformed several times by a predetermined mapping, so that a mapped point can be obtained for each transform, that is, a plurality of mapped points can be obtained. The mapped point can be obtained by the mapping allowed to correspond to the block having the transformed point. By use of these mapped points, the clustering is executed to decide the region representative of the attribute (referred to as a cluster region, hereinafter). With respect to the mapped points other than the points used for the cluster decision, the attribute of the cluster region obtained by the iterated transforms is decided as these points. As a result, all the attributes at all the points in the picture can be decided, so that the picture can be divided for each attribute. The blocks having the boundary of the divided blocks can be detected. The detection results and the mapped data are both inputted to the control means, and the mapping allowed to correspond to the detected block is outputted. Finally, the region boundary can be represented by two of the mapping and the block position having the region boundary.

To represent the region boundary in detail in accordance with the prior art method, a huge code quantity has been so far required. In the present invention, however, it is possible to represent a fine boundary without increasing the quantity of codes of the mapping and the position of the block having the boundary.

As explained above, in the first aspect of the present invention, since the attribute of the fractal-coded data signals can be detected, it is extremely effective when a picture is required to be divided. Further, since no frame memory is needed, the apparatus scale and the cost thereof can be both reduced. In addition, when a part of the picture is required to be reconstructed, since only the necessary region can be divided, it is possible to provide an attribute detecting method and apparatus of high processing efficiency, without executing wasteful calculations.

In the second aspect of the present invention, since a simple picture can be formed, when a data base is required to be retrieved, for instance, it is possible to decrease the quantity of calculations and thereby to reduce the hardware scale, without use of any high-costly multi-gradation display unit. Further, when the simple picture is processed as it is, since the picture quality will not deteriorate due to the compressed code reconstruction, (being different from the prior art method for processing a picture on the basis of the grayscale level). Further, since both the coder and decoder are not required, it is possible to provide a picture forming apparatus for processing pictures by a simple hardware construction.

As described above, in the present invention, the signal feature pattern size can be detected easily. Further, the picture can be divided into regions in spite of a relatively small quantity of calculations. Further, when the fractal-coded compressed data are used, the image segmentation and the image reconstruction can be executed at the same time.

Further, a fine region boundary can be extracted and further the extracted region boundary can be represented effectively.

BRIEF DESCRIPTION OF THE DRAWINGS

In the attached drawings:

FIG. 61A is a block diagram showing an image segmentation apparatus according to the present invention;

DETAILED DESCRIPTION OF THE PREFERRED EMBODIMENTS

With reference to the attached drawings, some preferred embodiments of the method and apparatus for detecting a predetermined attribute of data signals according to the present invention will be described hereinbelow.

First Embodiment

Figure 11:
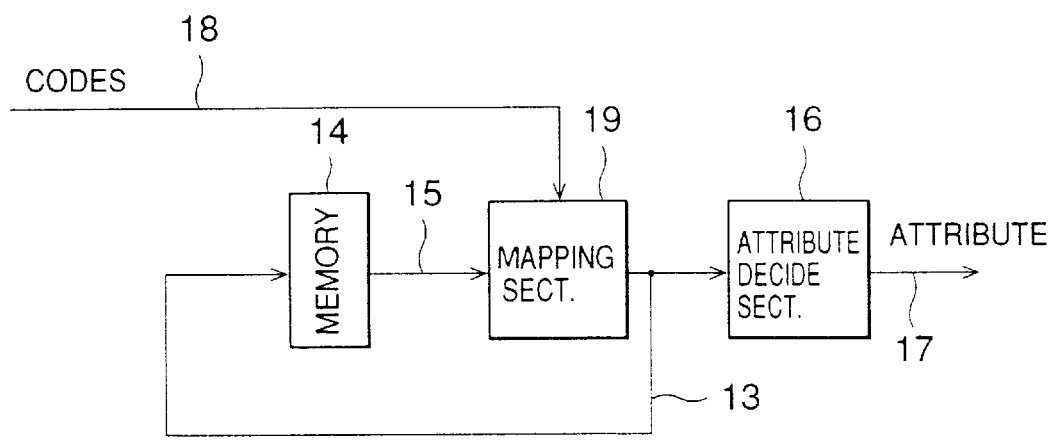
FIG. 11 is a block diagram showing the construction of a first embodiment of the attribute detecting apparatus according to the present invention.
Figure 12:
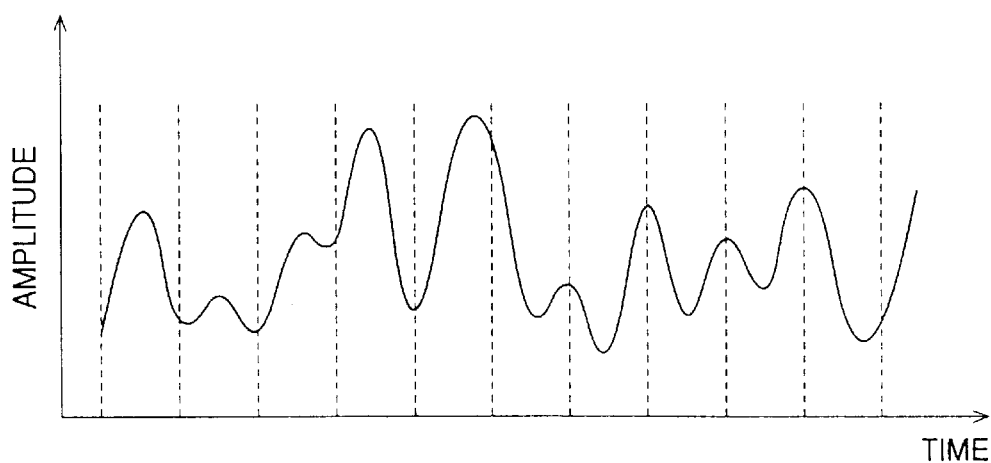
FIG. 12 is a characteristic diagram showing a one-dimensional signal divided into blocks in the first embodiment of the apparatus.

FIG. 11 is a block diagram showing a first embodiment of the attribute detecting apparatus. In FIG. 11, first input code data 18 are given. The input code data 18 are codes indicative of various information such as a position and a size of a similar region corresponding to each block, signal (pixel) arrangements, and a signal (pixel) value transform method, which are all formed by a fractal coder, for instance. Here, the original data signals (code data) 18 are one-dimensional signals (audio signals as shown in FIG. 12) or two-dimensional signals (video signal). In the case of the one-dimensional signal, the signals are divided into a plurality of blocks in the time-axis direction as shown by dot lines in FIG. 12. Further, in the case of the two-dimensional signals, the signals are divided into a plurality of blocks in a spatial direction. Further, the similar regions corresponding to the respective blocks are designated by codes 18.

The codes 18 are inputted to a mapping section 19. In this mapping section 19, first an initial point is set to an attribute detection position. After that, it is discriminated which block the initial point belongs to, and a point (a mapped point) is mapped from the block to the similar region. The position data 13 indicative of the mapped point outputted by the mapping section 19 are stored in a memory 14 temporarily. Thus, the first mapping has been completed.

In the second mapping, the position data 15 are read out of the memory 14, and then the mapping is executed in the same way as the first mapping. Further, the position data 13 of the second mapped point are stored in the memory 14. The mapping as described above are repeated several to several tens times.

The position data 13 of the mapped point 13 are transmitted in sequence to the attribute decide section 16. The attribute decide section 16 detects whether the mapped point converges to one point or not; if so which point the mapped point converges; or whether it converges to a periodic track; if so which periodic track converges; or whether it moves in a chaos state; if so which region and along which track the mapped point moves, etc. On the basis of the detected results, the attribute decide section decides the attribute at the attribute detection point, and further outputs the decided attribute data 17 to the outside.

Here, the attributes are for instance such that (a) the dispersion of the reproduced values of data signals; (b) the dispersion of the data signals; (c) the signal pattern period of the data signal; (d) the presence or absence of abrupt changes of the data signals; (e) the sort of the data signals when classified into several portions according to the signal patterns; etc. Further, the portion at which the data signals change abruptly, the similar region is located at a relatively remote position in the data signals. Therefore, since the mapped points move within a wide range, when the mapped points go and return within a wide range conversely, it is possible to decide that a position at which the signal changes abruptly exists in the vicinity of the initial point. Further, when the mapped points move periodically, it is presumed that the signals have a periodic pattern. Further, when the mapped points go and return only within a range, it is presumed that the similar signal pattern continues within the range.

Figure 13:
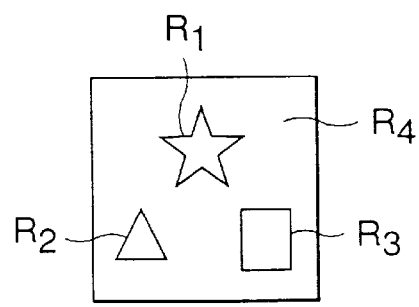
FIG. 13 is an illustration showing an input picture for assistance in explaining the feature of mapping using the fractal codes.
Figure 14:
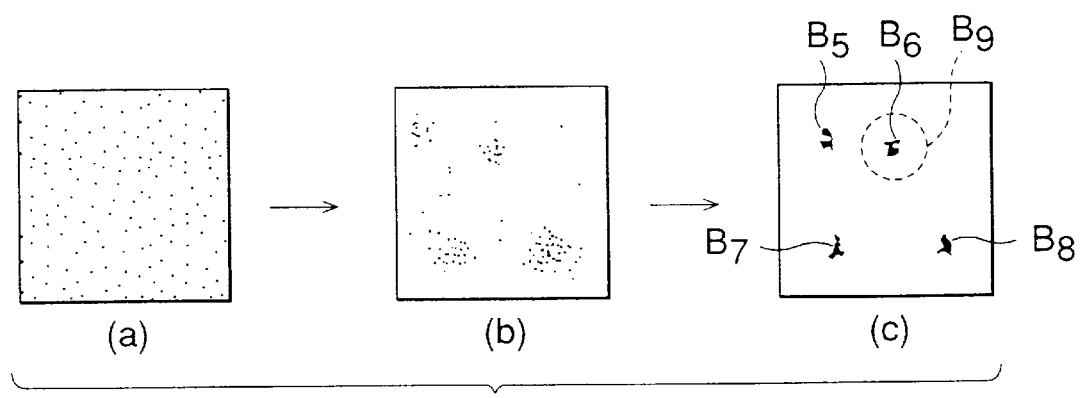
FIGS. 14(a) to 14(c) are illustrations showing the mapping procedure for assistance in explaining the feature of mapping using the fractal codes.
Figure 15:
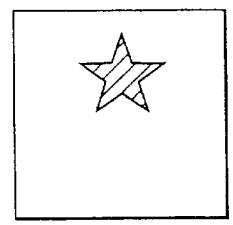
FIG. 15 is an illustrations showing the final process for assistance in explaining the feature of mapping using the fractal codes.

With reference to FIGS. 13 to 15, the feature of mapping by use of the fractal codes will be described hereinbelow. FIG. 13 shows an input picture, in which there are four region of a star $R_1$, a triangle $R_2$, a square $R_3$ and a background $R_4$. In FIGS. 13 to 15, each image of the regions $R_1$, $R_2$, $R_3$ and $R_4$ is described simply by segments, in practice however, these images can be represented by gray-scale images. Since the pixel values or the textures are different from each other at the respective regions $R_1$, $R_2$, $R_3$ and $R_4$, it is assumed that at least when a man sees these images, these images can be recognized separately. Further, a point decided by the fractal codes, that is, the data of the similar region for each block is denoted by P.

Here, FIG. 14(a) shows a new picture prepared, in which initial points are arranged at random. Then, when the mapping P is repeated for all the initial points shown in FIG. 14(a), a difference in point arrangement density appears as shown in FIG. 14(b). Further, when the mapping is repeated, the points are gathered as shown in FIG. 14(c), in which four clusters (point group) $B_5$, $B_6$, $B_7$ and $B_8$ can be formed by way of example.

The feature of the mapping of the present invention is that these clusters $B_5$, $B_6$, $B_7$ and $B_8$ correspond to the regions $R_1$, $R_2$, $R_3$ and $R_4$, respectively. For instance, when only the cluster B caused by the initial points as shown in FIG. 14(a) are left (by deleting all the other points), a star-shaped region appears as shown in FIG. 15. In the same way, the cluster $B_7$ corresponds to the region $R_2$; the cluster $B_8$ corresponds to the region $R_3$; and the cluster $B_5$ corresponds to the region $R_4$ (background). Even if it is difficult to divide the region in the state shown in FIG. 13, when the points are arranged being far away from each other as shown in FIG. 14(c), the clustering can be made easily, so that the regions can be divided easily on the basis of the above-mentioned clustering.

Figure 16:
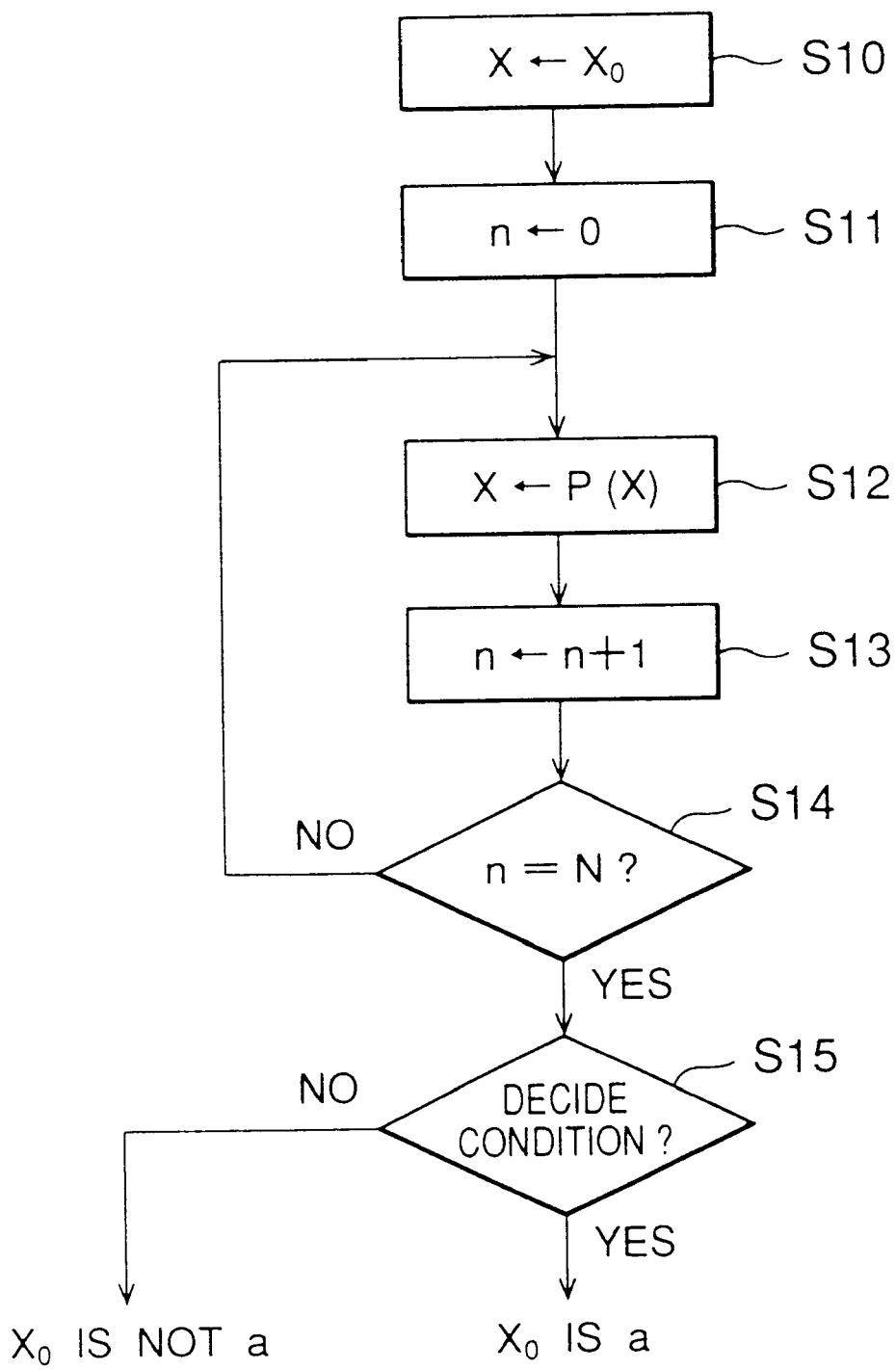
FIG. 16 is a flowchart showing a procedure of the first embodiment of the attribute detecting method according to the present invention.

FIG. 16 shows a flowchart showing the procedure for deciding the region to which the attribute detection position belongs, on the basis of the movement of the mapped points, by best use of the above-mentioned mapping feature.

The control flows are all executed by a control section (referred to as control simply, hereinafter) including a CPU, ROM, RAM, etc. in accordance with software.

In step S10, control substitutes an attribute detection position vector $x_0$ for a position vector x in a picture. Further, in step S11, control substitutes zero for the number of mappings n. In step S12, control obtains the mapped point of x, and updates x. At the same time, in step S13, control substitutes n+1 for n. In step S14, control checks whether the number n of mappings reaches a predetermined number N. If no, control returns to step S12. If yes, in step S15, control decides $x_0$ on the basis of predetermined discrimination condition using x. The discrimination condition executed in step S15 is for instance such that [whether x belongs to a set 9 (shown in FIG. 14(c)]. If yes, control decides that [$x_0$ belongs to a region 1]; and if no, control decides that [$x_0$ does not belong to a region 1].

Further, although being different from the region division, when the reproduced values of video signals are obtained as the attribute (as with the case of the third embodiment, described later), since x is a three-dimensional vector (picture plane and pixel value), a pixel value is also mapped in addition to the position value as the mapping P. In this case, the discrimination condition executed in step S15 is such that [whether a pixel value at x lies within a predetermined range]. If yes, the decision is such that [the reproduced value at $x_0$ is an initially set pixel value]. If no, decision is such that [the reproduced value at $x_0$ is not an initially set pixel value].

In general, two outputs of [$x_0$ is a] and [$x_0$ is not a] are obtained according to yes and no determined as an answer to the discrimination condition.

Figure 17:
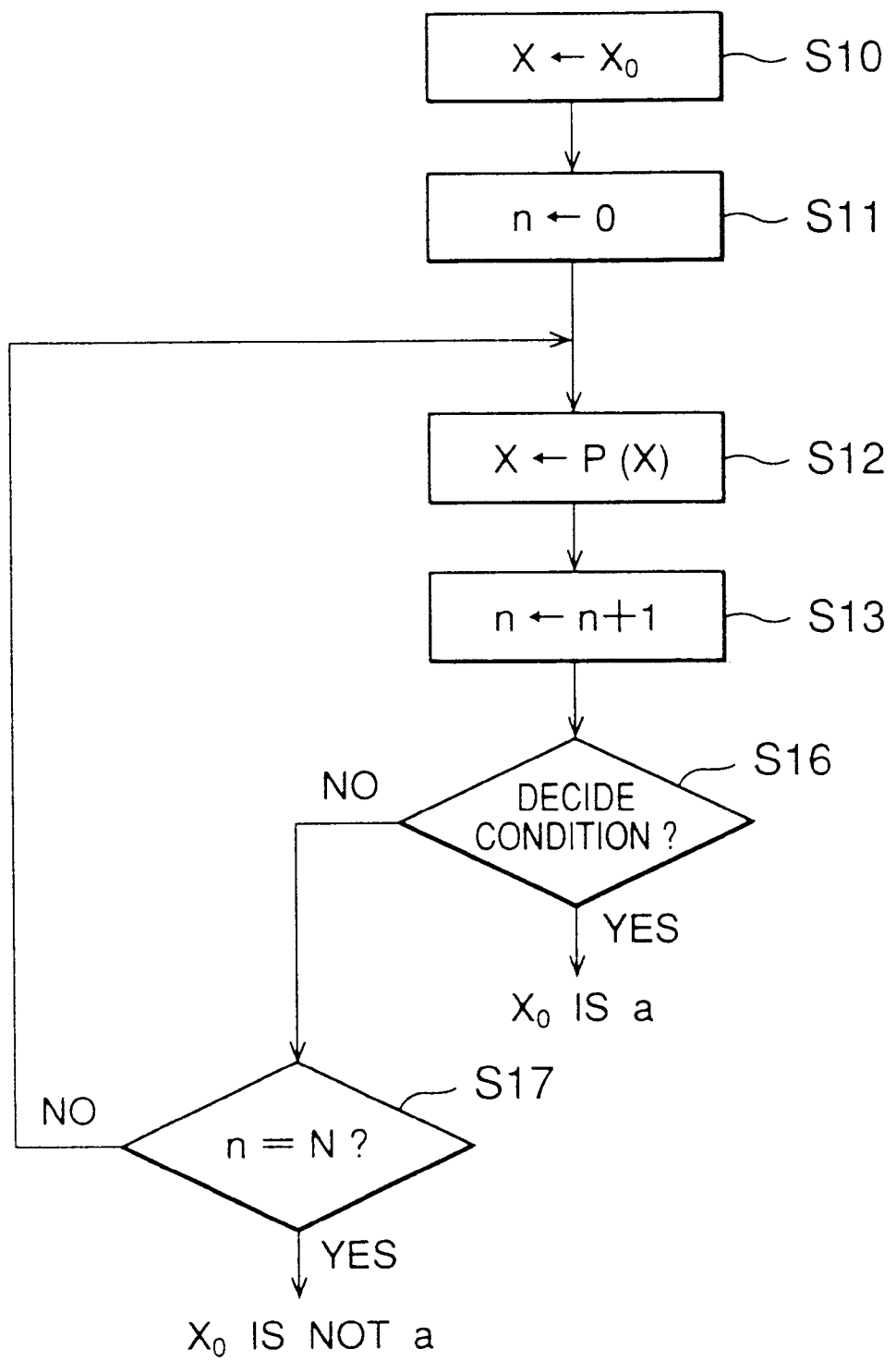
FIG. 17 is a flowchart showing another procedure of deciding the region to which the attribute detection position belongs, in the first embodiment of the attribute detecting method according to the present invention.

FIG. 17 shows a flowchart showing another procedure for deciding the region belonging to the attribute detection position. FIG. 17 is different from FIG. 16 in that whenever x is replaced with P(x), in step S16 control executes the discrimination processing. Here, if yes, control immediately decides [$x_0$ is a]. If no, in step S17, control checks whether the number n of mappings reaches N. If yes, control decides [$x_0$ is not a]. If no, control returns to step S12.

Second Embodiment

Figure 18:
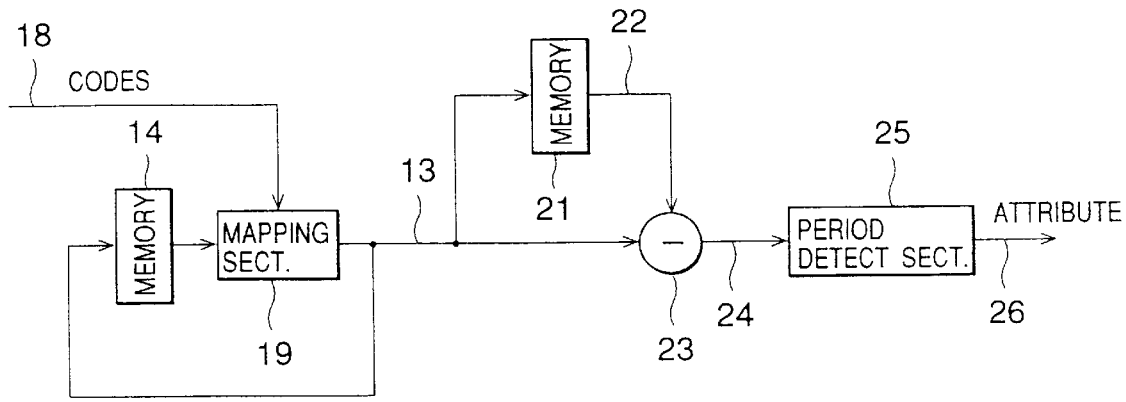
FIG. 18 is a block diagram showing the construction of a second embodiment of the attribute detecting apparatus according to the present invention.

FIG. 18 is a diagram showing a second embodiment, which is different from the first embodiment in that the attribute decide section 16 shown in FIG. 11 is replaced with a period detect section 25. This period detect section 25 detects whether the data signals are periodic or not. The position data 13 of the mapped point obtained after several mappings are stored in a memory 21. The mapping is further kept continued. Whenever mapping is executed, the position data 22 of the mapped point stored in the memory 21 and the current position data 13 of the mapped point are both inputted to a difference section 23. The difference section 23 detects a difference 24 between the two, and transmits the detected difference 24 to the period detect section 25. When the difference 24 is below a predetermined value, the period detect section 25 decides that the data signals are periodic and therefore the track is closed. In contrast with this, when the difference 24 is not reduced less than a predetermined value after the mappings are repeated several times, the period detect section 25 decides that the data signals are not periodic. That is, the periodic detect section 25 outputs the attribute data 26 indicative of periodic or non-periodic. Further, when the number of mappings and the track routes are checked until the track is closed, it is possible to execute more diversified classifications.

Third Embodiment

Figure 1:
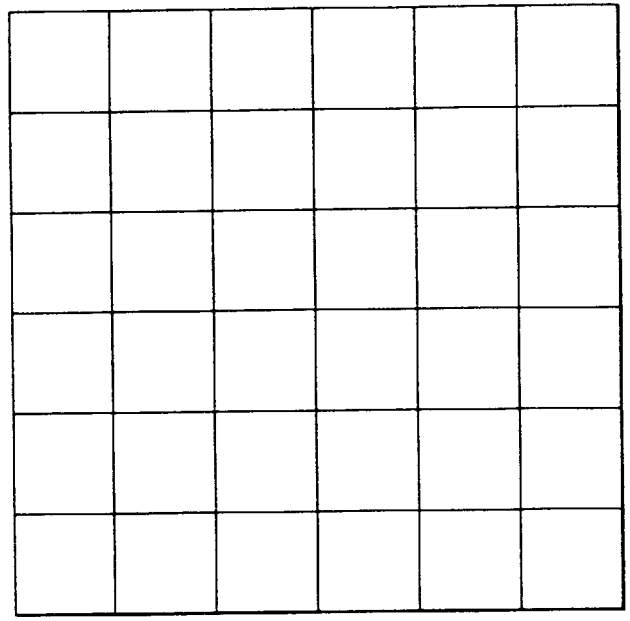
FIG. 1 is an illustration showing the state in which a picture is divided into a plurality of blocks.
Figure 19:
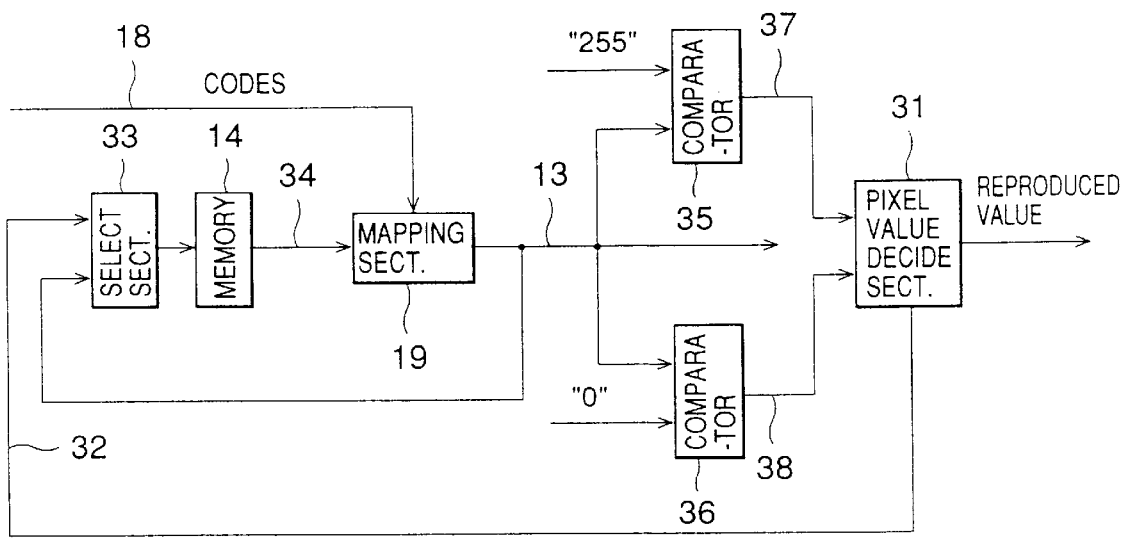
FIG. 19 is a block diagram showing the construction of a third embodiment of the attribute detecting apparatus according to the present invention, which is suitable for decoding a picture.

FIG. 19 is a block diagram showing a third embodiment of the present invention, in which the feature of the present invention is applied to the decoder. The picture is divided into square blocks as shown in FIG. 1.

The codes 18 are codes indicative of various information such as the positions and the sizes of similar regions corresponding to each block, pixel arrangements, and pixel value transform methods, which are all formed by a fractal coder, for instance. The codes 18 are inputted to a mapping section 19. A pixel value decide section 31 transmits initial point data (composed of three components in total (two position components in a picture, and a pixel value component) to a selector 33. The position components of the initial point data 32 are position coordinates of a pixel required to be reproduced, and the pixel value component is a pixel value determined temporarily. The initial pixel value is switched later in the method of trial and error.

The selector 33 selects one of the two input signals and outputs the selected one signal. At this time, the selector 33 is so previously set as to output the initial point data 32. Therefore, the initial point data 32 are stored in a memory 14 as they are. After that, the initial point data are read from the memory 14 as the position data 34 of the mapped point, and then inputted to a mapping section 19.

Figure 2:
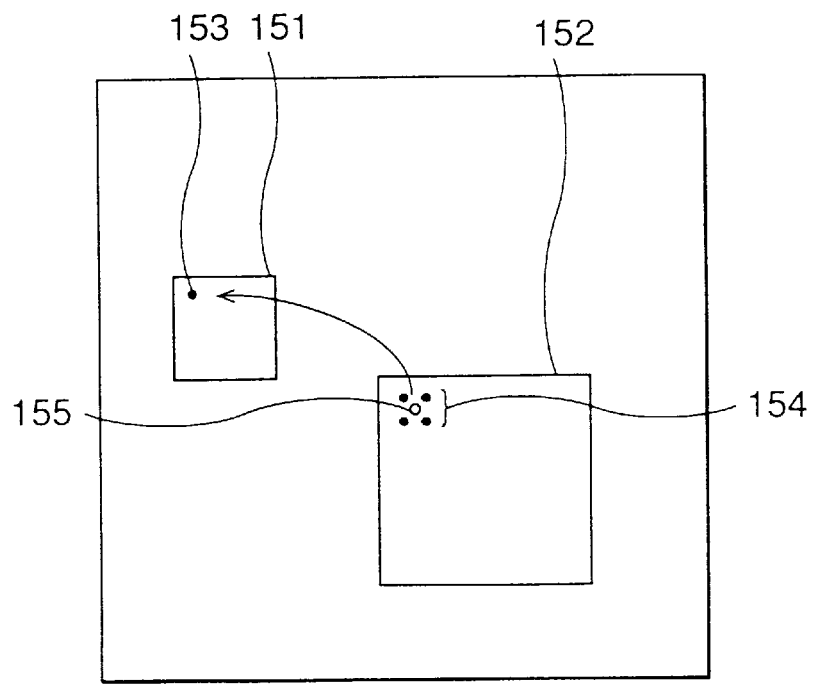
FIG. 2 is an illustration for assistance in explaining the prior art sub-sampling.
Figure 3:
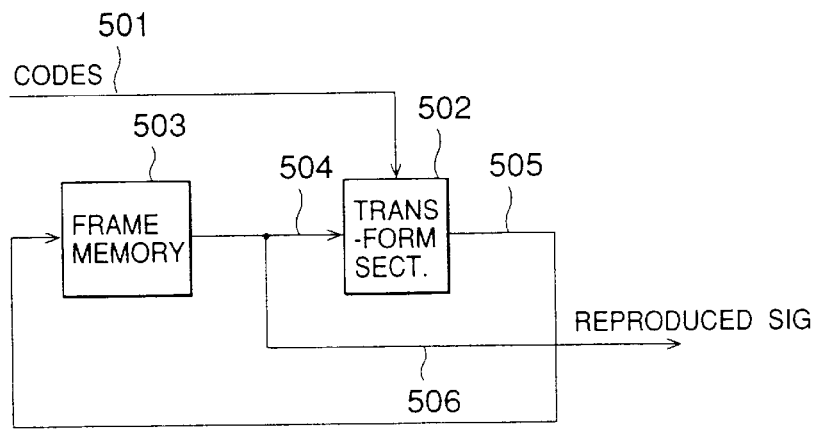
FIG. 3 is a block diagram showing a prior art fractal decoder.
Figure 20:
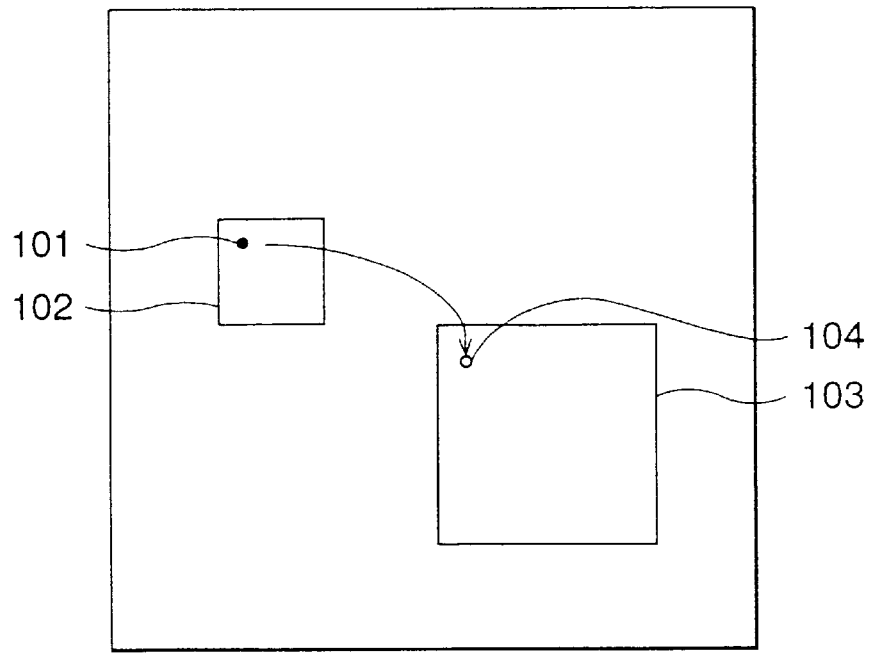
FIG. 20 is an illustration showing a mapping from a block to a similar region in the third embodiment according to the present invention.

The mapping section 19 obtains a block 102 (as shown in FIG. 20) to which the mapped point 101 belongs. The mapped point 101 is mapped to a mapping point 104 on the basis of the codes 18 indicative of data of the similar region 103 corresponding to the block 102. In practice, the mapping section 19 calculates the position coordinates of the mapping point 104 on the basis of data at the mapped point 101 and the similar region 103. This calculation is a reversal transform (pixel sampling) as explained under the description related to prior art with reference to FIG. 2. The mapped point 104 is not mapped onto the pixel position in general, the coordinates are obtained as they are. At the same time, the pixel value at the mapped point 101 is transformed in the direction from the block to the similar region, to obtain a pixel value at the mapped point 104.

In more detail, when the pixel value is denoted by v and when the transform coefficients are denoted by a and b, if the transform g(v) of the pixel value from the similar region 103 to the block 102 can be expressed as $$g(v)=a \cdot v+b$$

the mapping section 12 calculates the pixel value at the mapped point 104 by the revere transform h of g as $$h(v)=(v-b)/a$$

where a and b differ according to the block.

With reference to FIG. 19 again, the mapping section 19 transmits the position data 13 at the mapped point 104 to the select section 33. The select section 33 is previously so switched as to output the position data 13 at the mapped point 104. Therefore, the position data 13 are inputted and stored in the memory 14. After that, the position data at the preceding mapping point are read from the memory 14 as the position data at a new mapped point. The similar mappings are repeated in the same way.

Figure 21:
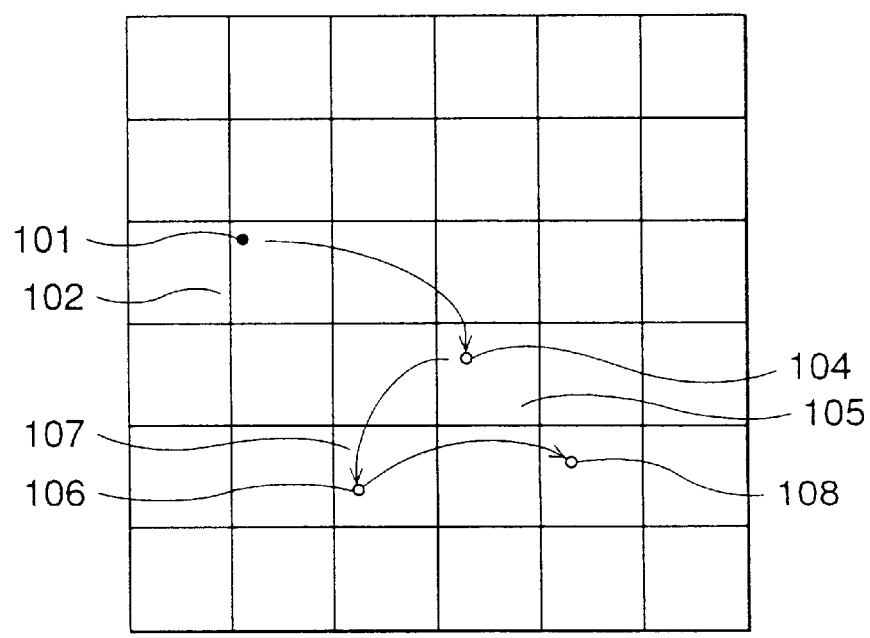
FIG. 21 is an illustration showing the state where the mapping is repeated.

In more detail, as shown in FIG. 21, now the mapped point 104 obtained at the preceding mapping is used as a new mapped point, and a block 105 to which the new mapped point belongs is obtained. Further, a mapping is executed from this block 105 to a similar region, so that a new mapped point 106 can be obtained. The pixel value at the new mapped point 106 is also calculated. The above-mentioned mapping procedure is repeated several times.

Figure 22:
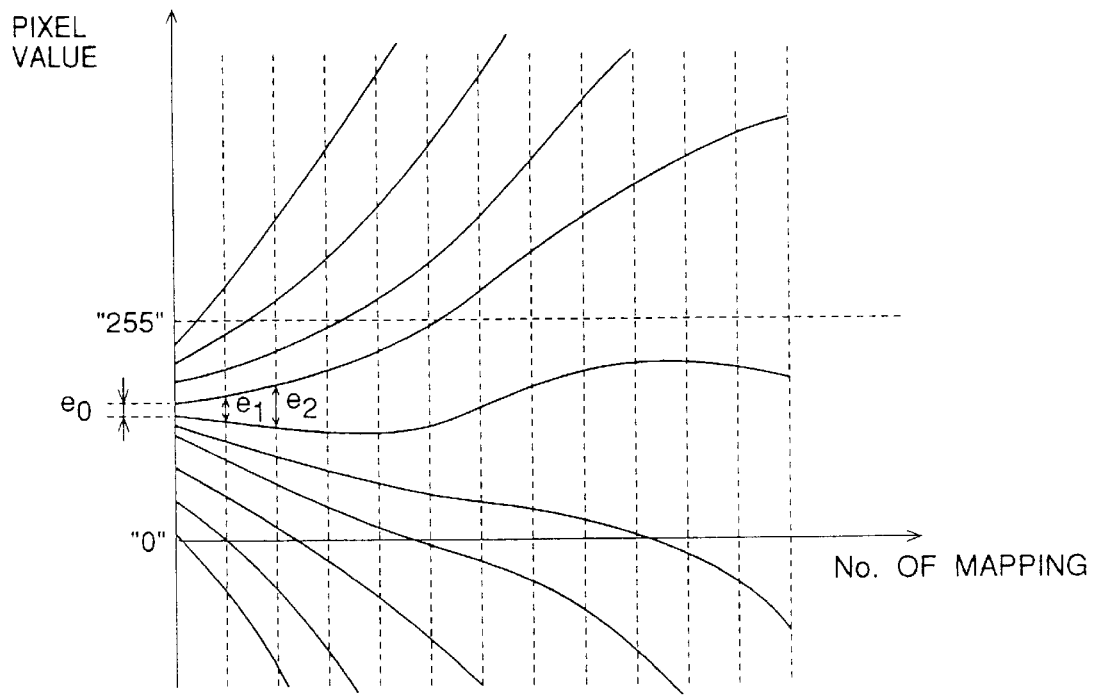
FIG. 22 is an illustration showing the state where the pixel values diverge.

FIG. 22 shows changes of the pixel values at the mapped points obtained when the mapping are repeated, in which the pixel values at the initial point are set to various values. In FIG. 22 the abscissa indicates the number of mappings and the ordinates indicates the pixel value at the mapped points. Further, the original pixel values on the original picture range from "0" to "255".

The case where the pixel value at the initial point (i.e., the number of mappings is zero) matches the reproduced value is shown by a thick line. As already explained under the description of the prior art, the reproduced picture A will not change according to the transform F. Therefore, this indicates that when a point just existing on the reproduced picture A is determined as an initial point, even if the mapping is executed by tracing the transform F for each pixel in the reverse direction, as with the case of the present invention, it can be understood that the mapped point exists on A. Therefore, in this embodiment, even if the mappings are repeated, since the mapped points exist on A in sequence, the pixel values will diverge, with the result that the pixel values lie between "0" and "255".

However, in the decoder, since the reproduced value at the initial point is of course not known, the temporal pixel value at the initial point is different from the reproduced value. In FIG. 22, the case where the pixel values at the initial point are different from the reproduced values are shown by thin lines.

Here, when a difference between the temporal pixel value at the initial point and the reproduced value is denoted by $e_0$, and the a difference between the pixel values at the mapped point and the reproduced value is denoted by $e_i$ (i=1, 2, 3, . . . ), the following relationship can be obtained $$e_k = |1/ak| \cdot e_{k-1} (k=1, 2, 3, \ldots)$$

where ak denotes a coefficient a of the pixel value transform h(v) used at k. Since the coefficient a is determined less than one almost all cases so that the transform F is determined as the reduction transform, the reciprocal number of one is more than one. Therefore, $e_i$ increases in accordance with an exponential function, so that the pixel value at the mapped points diverse. Further, when ak is positive, since the magnitude relationship between the reproduced value and the pixel value at the mapped point is not reversed due to mapping, when the initial value is larger than the reproduced value, the pixel value at the mapped point diverges in a positive direction. On the other hand, when smaller than the reproduced value, the pixel values at the mapped point diverges in a negative direction. Therefore, when an initial value boundary between that diverging in a negative direction and that diverging in a positive direction is found by switching the initial pixel values in various ways, it is possible to find out the reproduced value. Further, when ak is a negative value, since the magnitude relationship between the reproduced value and the pixel value at the mapped point is reversed due to mapping, when the number of negative values ak developed at the past mapping is an even number, the pixel value at the mapped point becomes a large positive absolute value, and when an odd number, the pixel value at the mapped point becomes a large negative absolute value.

In FIG. 19, the divergence of the mapping can be discriminated as follows: the pixel value at the mapped point designated by the position data 13 at the mapped point (obtained by the mapping section 12) are inputted to two comparators 35 and 35. The comparator 35 compares the value "255" with the pixel value at the mapped point designated by the position data 13, and transmits the comparison result 37 to a pixel value decide section 31. Further, at the same time, the comparator 36 compares the value "0" with the pixel value at the mapped point designated by the position data 13, and transmits the comparison result 38 to the same pixel value decide section 31.

When the pixel value at the mapped point exceeds "255" due to the repeated mappings, the pixel value decide section 31 interrupts the mapping. Further, when the number of negative values ak formed by the repeated mappings is zero or an even number, the pixel value at the initial point 32 is determined smaller than the previous value to execute the mapping again. However, when the number of negative values ak is an odd number, the pixel value at the initial point 32 is determined larger. Further, when the pixel value at the mapped point is smaller than 0" and further when the number of negative values ak is zero or an even number, the pixel value at the initial point designated by the initial point data 32 is determined larger than the previous value. However, when the number of negative values ak is an odd number, the pixel value at the initial point is determined smaller. As described above, the upper end and the lower end of an interval in which the reproduced value exists are narrowed gradually, so that a final reproduced value can be obtained.

Further, when the pixel value stays between "0" and "225" after a predetermined number of mappings have been repeated, the initial value at that time is determined as the reproduced value. Further, when the position data reach the boundary of the block during the mapping process, any one of the blocks sandwiching the boundary can be selected.

Further, as described in Document 1: "Fractal Image Coding: A Review", A. E. Jacquin, Proceedings of the IEEE, VOL. 81, No.10, October, 1993, there exists the case where the similar regions are not defined according to the blocks and pixel values are directly coded. In case the mapping proceeding reaches the block as described above, when the value a is always positive, as far as the pixel value at the mapped point is always larger than the value given to the block, it is possible to discriminate that the initial value is larger than the reproduced value. In contrast with this, as far as the pixel value at the mapped point is always smaller than the value given to the block, it is possible to discriminate that the initial value is smaller than the reproduced value. Further, when the value a is always negative, the similar algorithm can be adopted.

According to the present embodiment, the apparatus scale can be reduced to such an extent that the frame memory is not required, as compared with the prior art apparatus. Further, when only a part (e.g., ¼ on upper left side) of the picture is required to be reproduced, since the reproduced values are obtained only for the pixels at this area of the picture, it is possible to reduce the amount of calculations and thereby to improve the processing efficiency. Further, since only the necessary portion of a picture can be reconstructed, it is also possible to shorten the time required for reconstruction.

Figure 19A:
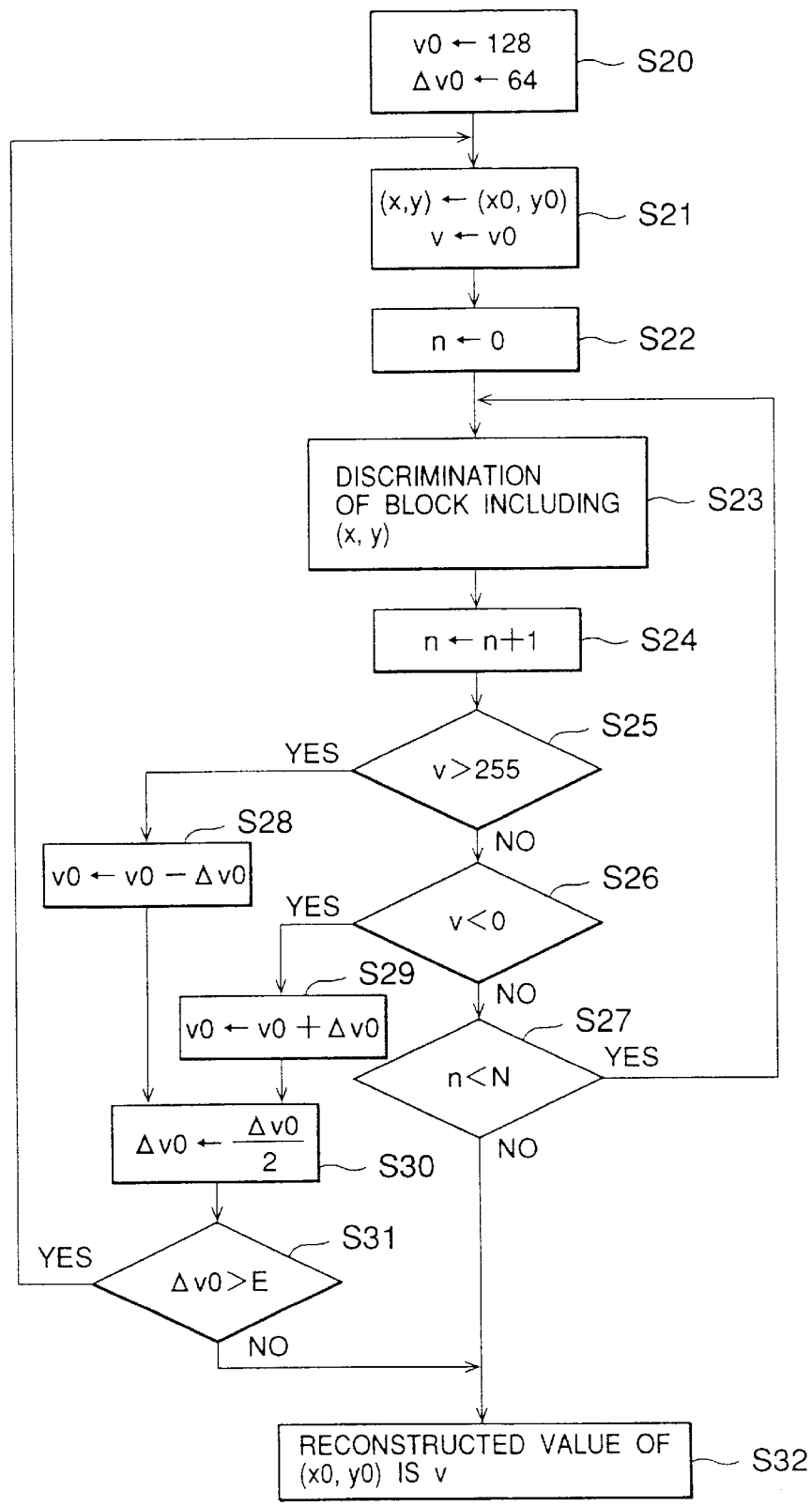
FIG. 19A is a flowchart showing an image reconstructing method corresponding to the apparatus shown in FIG. 19.

FIG. 19A shows an image reconstructing method corresponding to the apparatus shown in FIG. 19, which is a flowchart for reconstructing pixel value at a position (x0, y0). In FIG. 19A, (x, y) denote coordinates on a picture, and v denotes a pixel value. Further, an image is assumed to have pixel values of 256 gradations from 0 to 255.

S20: 128 is substituted for v0, and 64 is substituted for Δv0, proceeding to step S21.

S21: (x0, y0) are substituted for (x, y), and v0 is substituted for v, proceeding to step S22.

S22: 0 is substituted for n, proceeding to step S23.

S23: (x, y) are updated to w(x, y), and v is update to h(v), proceeding to step S24.

Here, w denotes a mapping from a block belonging to a mapped point (x, y) a corresponding point in an affine region. Further, h denotes a transform of the above-mentioned pixel value.

S24: n is updated to n+1, proceeding to step S25.

S25: if v is larger than 255, proceeding to S28; and if not so, proceeding to S26.

S26: is v is smaller than 0, proceeding to S29; and if not so, proceeding to S27.

S27: if v is smaller than a previously determined N, proceeding to S23; and if not so, proceeding to S32.

S28: v0 is updated to v0−Δv0, proceeding to step S30.

S29: v0 is updated to v0+Δv0, proceeding to step S30.

S30: Δv0 is updated to Δv0/2, to step S31.

S31: if Δv0 is larger than a previously determined E, proceeding to S21; and if not so, proceeding to S32.

S32: a reconstructed value at (x0, y0) is decided as v0.

This algorithm checks the divergence state, on the assumption that the reconstructed value is first 128. Then, if v is larger than 255, a positive divergence is discriminated. At this stage; since it can be understood that the reconstructed value lies between 0 and 128, successively an intermediate value between 0 and 128 is checked. On the other hand, if v0 is 64 and further v is smaller than 0, a negative divergence is discriminated. This indicates that the reconstructed value lies between 64 and 128. As described above, the range where the reconstructed value lies is gradually narrowed, and stopped when the range becomes smaller than an allowable value E of the reconstructed value error. The value v0 at this stop time is determined as the reconstructed value. Further, when v still lies between 0 and 255 after N-times mappings, v0 is discriminated as being sufficiently approximate to the reconstructed value, so that v0 at this time is determined as the reconstructed value.

Fourth Embodiment

Figure 23:
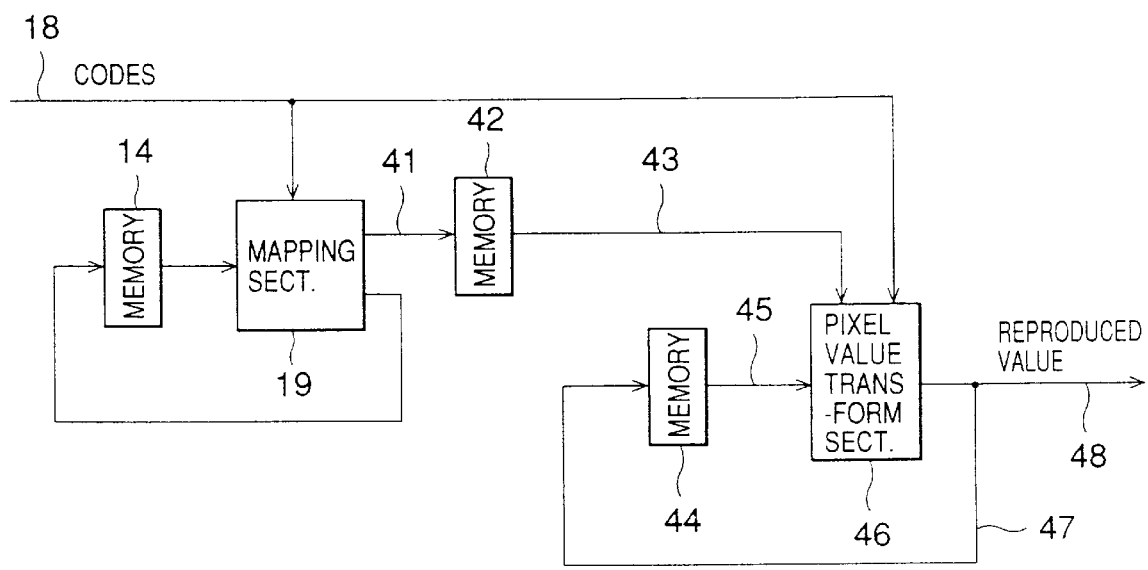
FIG. 23 is a block diagram showing the construction of a fourth embodiment of the attribute detecting apparatus according to the present invention.

FIG. 23 is a block diagram showing a fourth embodiment of the present invention, in which both forward and reverse transforms are used for mapping. In the same way as with the case of the third embodiment, the mapping section 19 executes the point mapping repeatedly on the basis of the codes 18. In this embodiment, however, the mapping section 19 executes only the position mapping, without executing the pixel value mapping. Therefore, only the pixel positions at which the reproduced values are required to obtain are stored in the memory 14, and after that only the mapped point positions are stored. Further, a predetermined number N of mappings are executed. The mapping section 12 outputs block specify data 41 indicative of which block the mapped point belongs to are outputted in sequence. The N-units of the block specify data 41 are stored in the memory 42. In the example of FIG. 21, the block specify data 41 are stored in the order of block 102→block 105→block 107. In this example, N is 3.

Then, a pixel value of "128" for instance is set to the memory 44. Further, the block specify data 43 written at the last are read from the memory 42, and further the pixel value transform in the direction from the corresponding similar region to the block is executed for the pixel value 45 read out of the memory 44. That is, the pixel value transform section 46 obtains the pixel value 47 by calculating the following expression:

$$g(v) = a \cdot v + b$$

in accordance with the aforementioned-mentioned notation. Here, the values a and b are different from each other for each corresponding block, and these values are read from the codes 18 by the pixel value transform section 46. The pixel value transforms are executed by N times by reading the block specify data in sequence from the memory 44, and the transformed results are outputted to the outside as the reproduced values 48.

The reason why the reproduced values can be obtained as described above will be explained hereinbelow. In the example shown in FIG. 21, the error at the initial point increases with increasing number of mappings according to an exponential function. This indicates the following fact: when mappings are traced from the right to the left, even if the mapping starts with an error on the right side, the error can be reduced gradually when traced gradually in the reverse direction (from the right side to the left side), and roughly approaches the reproduced value shortly. However, when the mappings are traced in the reverse direction, since it is necessary that the point is mapped at any desired pixel point just after the N-th mapping, it becomes necessary to previously store the position mappings in the memory 42 and then to read them in sequence in the reverse direction. At this time, since the pixel value transform is decided for each block, it is unnecessary any detailed data related to the pixel positions. That is, data indicative of which block the pixel belongs to are sufficient. Here, the error eN at the N-th time mapping can be expressed as $$eN = e_0 / |a1 \cdot a2 \ldots aN|$$

where ak (k=1, 2, ... N) denotes a coefficient a of the k-th time mapping.

Here, since the pixel values of the reproduced picture are between "0" and "225", when the error of the reproduced value is required to be suppressed equal to or less than E, if N is determined to satisfy the following expression:

$$E / |a1 \cdot a2 \ldots aN| > 225$$

it is possible to securely suppress the error less than E, even if the pixel value 45 starts from any value between "0" and "225". For instance, if $$a1 = a2 = \ldots = aN = 1/2E = 1$$

N is determined to be 8 or more.

In the case of the fourth embodiment, although the capacity of the memory slightly increases, as compared with the third embodiment, since it is unnecessary to check the divergent status in the method of trial and error, the quantity of calculations can be reduced.

The second aspect of the present invention will be explained hereinbelow.

Fifth Embodiment

Figure 24:
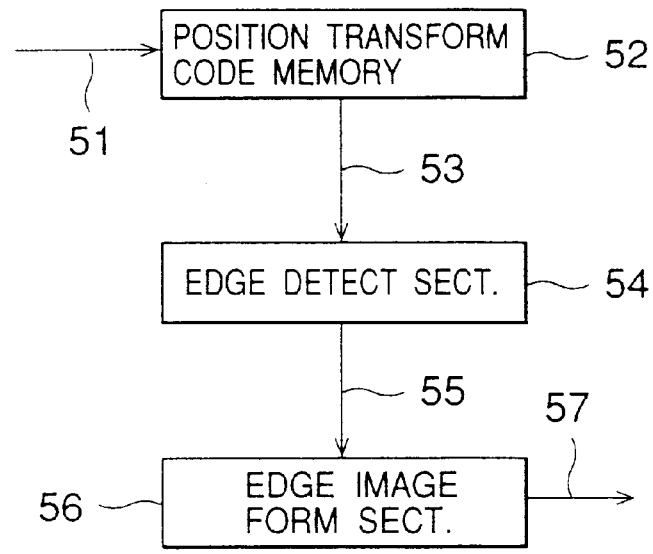
FIG. 24 is a block diagram showing the construction of a fifth embodiment of the attribute detecting apparatus according to the present invention.

FIG. 24 is a block diagram showing a fifth embodiment of the present invention. In FIG. 24, codes 51 indicative of the position transform data are inputted from the outside and then stored in a position transform memory 52. The position transform code 53 read from the position transform code memory 52 are transmitted to an edge detect section 54. In the edge detect section 54, a contour (i.e., edge positions) of an object in a picture are detected, and the detected edge position data 55 are transmitted to an edge image form section 56. The edge image form section 56 forms an edge image 57 by distinguishing an image on the basis of the luminance value or color (e.g., an edge portion designated by the edge position data 55 is determined as black and the remaining portion is determined as white), and outputs the formed edge image 57 to the outside.

Sixth Embodiment

Figure 25:
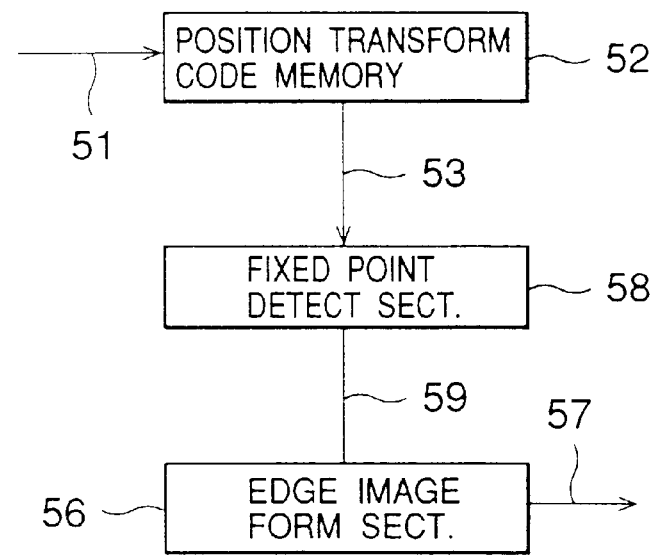
FIG. 25 is a block diagram showing the construction of a sixth embodiment of the attribute detecting apparatus according to the present invention.

FIG. 25 is a sixth embodiment in which the fifth embodiment (shown in FIG. 24) is realized in another way. That is, the edge detect section 54 shown in FIG. 24 is realized by a fixed point detect section 58. The fixed point detect section 58 obtains the fixed point position (at which the position is transformed) for each block. The obtained fixed point position data 59 are transmitted to the edge image form section 56. The edge image form section 56 forms the point designated by the position data 59 at the fixed point and the edge image 57 (a group of dots in this embodiment) distinguished by other different factors (e.g., color, luminance value). The formed edge image 57 is outputted to the outside.

Figure 26:
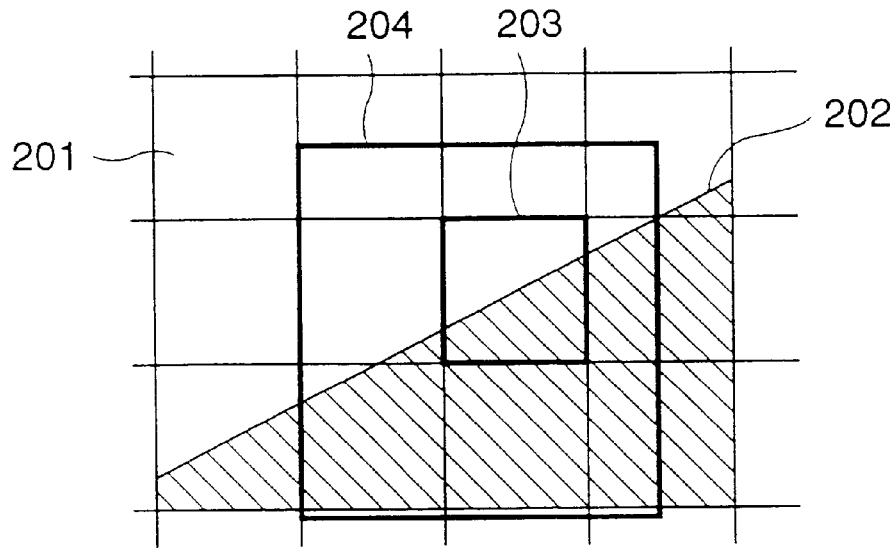
FIGS. 26 and 27 are illustrations showing a similar region in the sixth embodiment of the attribute detecting apparatus according to the present invention, respectively.
Figure 27:
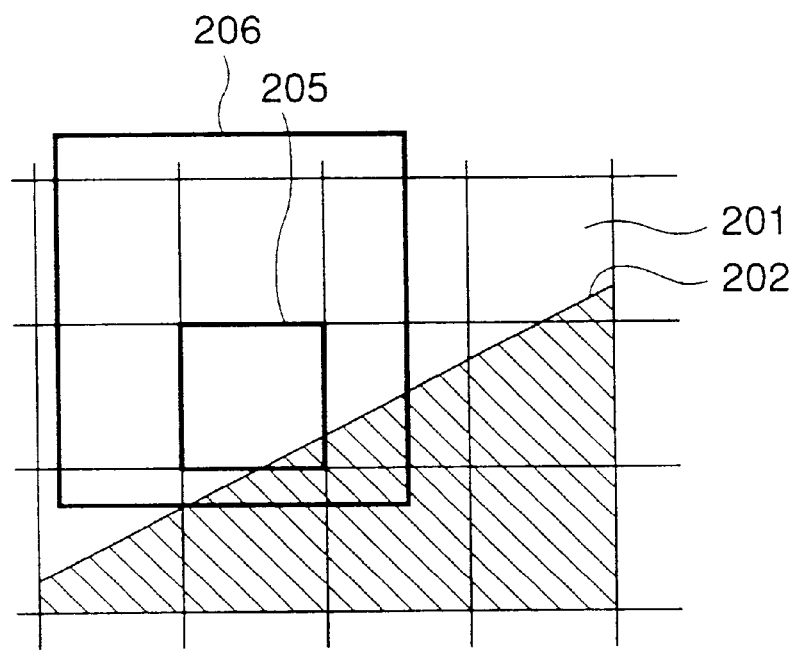
Figure 28:
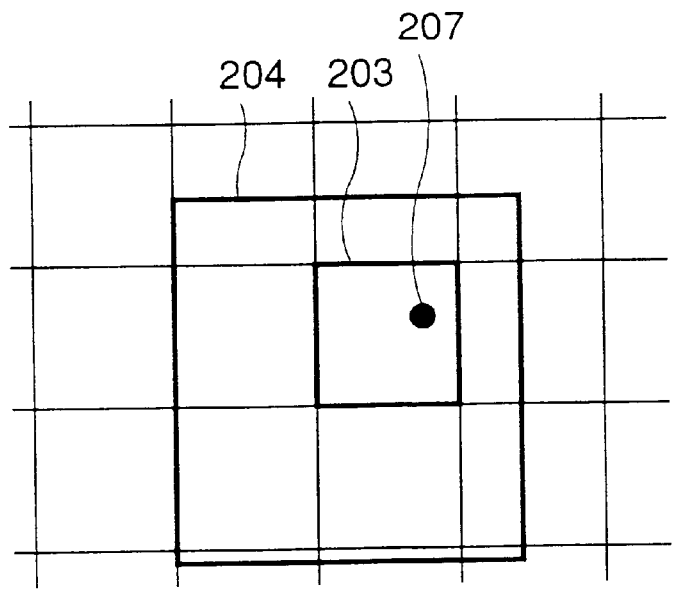
FIGS. 28 and 29 are illustrations showing a fixed point in the sixth embodiment of the attribute detecting apparatus according to the present invention, respectively.
Figure 29:
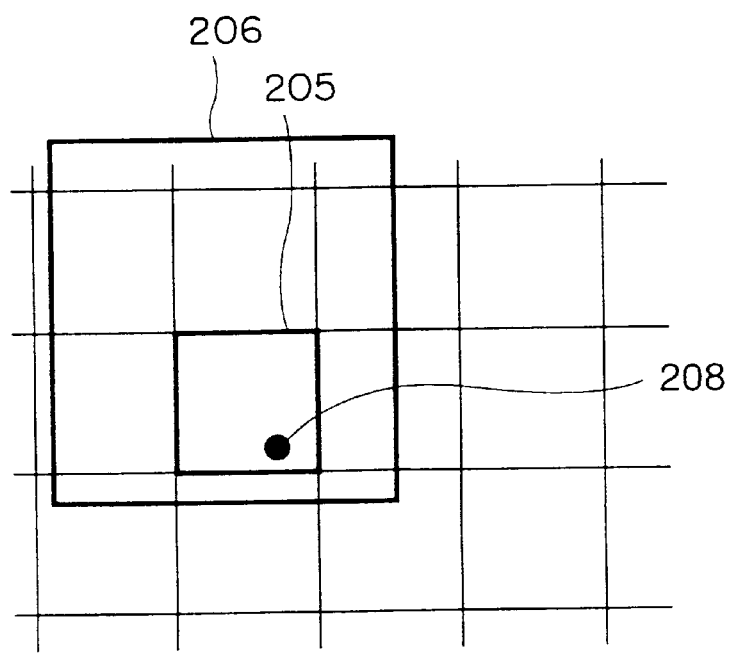

Now, as shown in FIG. 26, the assumption is made that in the picture 201 having an edge 202, a region 204 has been determined as a similar region in the block 203. In the same way, as shown in FIG. 27, the assumption is made that a region 206 has been determined as a similar region in the block 205. Further, FIG. 28 shows a fixed point 207 for the similarity transform in the block 203, and FIG. 29 shows a fixed point 208 for the similarity transform in the block 205. As shown above, since the fixed points 207 and 208 are on the edge 202, when these fixed points are obtained for each block and then expressed on the picture, it is possible to recognize an external shape of an object.

Seventh Embodiment

Figure 30:
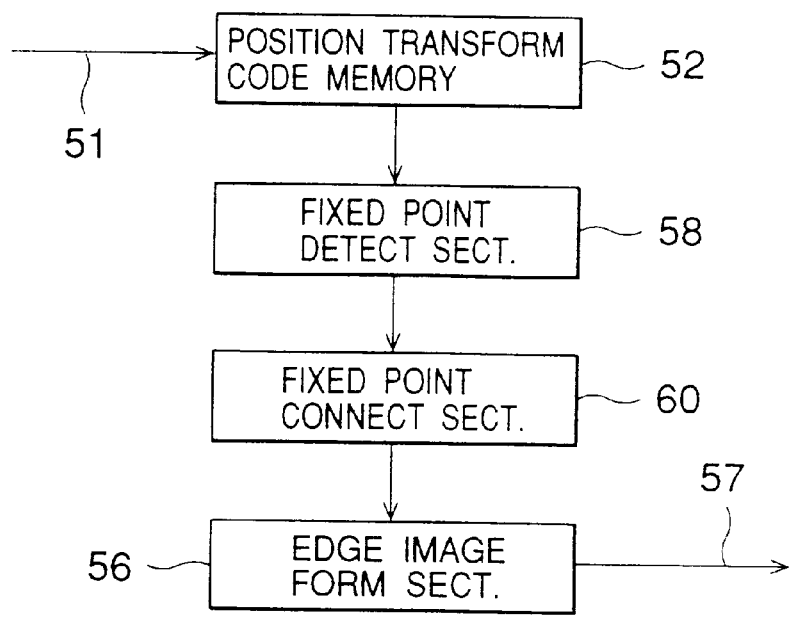
FIG. 30 is a block diagram showing the construction of a seventh embodiment of the attribute detecting apparatus according to the present invention.
Figure 31:
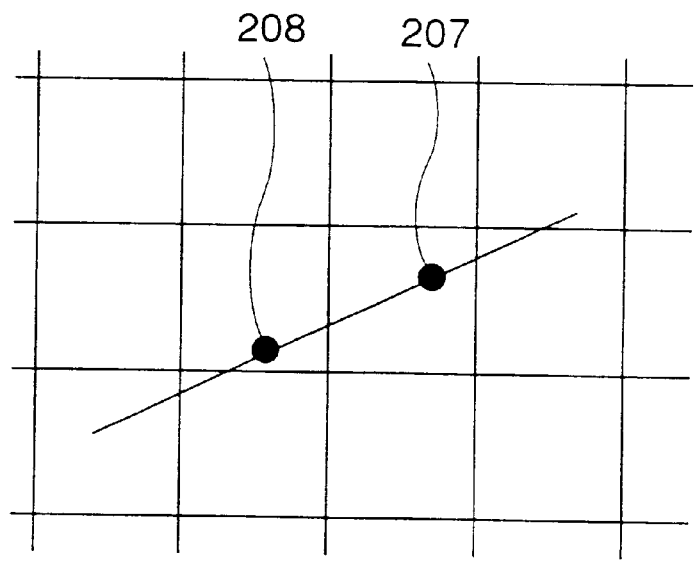
FIGS. 31 and 32 are illustrations showing an edge in the seventh embodiment of the attribute detecting apparatus according to the present invention, respectively.

FIG. 30 is a block diagram showing a seventh embodiment, in which a fixed point connect section 60 is interposed between the fixed point detect section 58 and the edge image form section 56. Therefore, in this embodiment, line data obtained by connecting the fixed points are transmitted to the edge image form section 56, instead of the point data. The fixed point connect section 60 connects the fixed points which seem to be located on the same edge (e.g., a fixed point 207 of the block 203 shown in FIG. 28 and a fixed point 208 of the block 205 (adjoining to the block 203) shown in FIG. 29), without connecting all the fixed points to each other.

Figure 32:
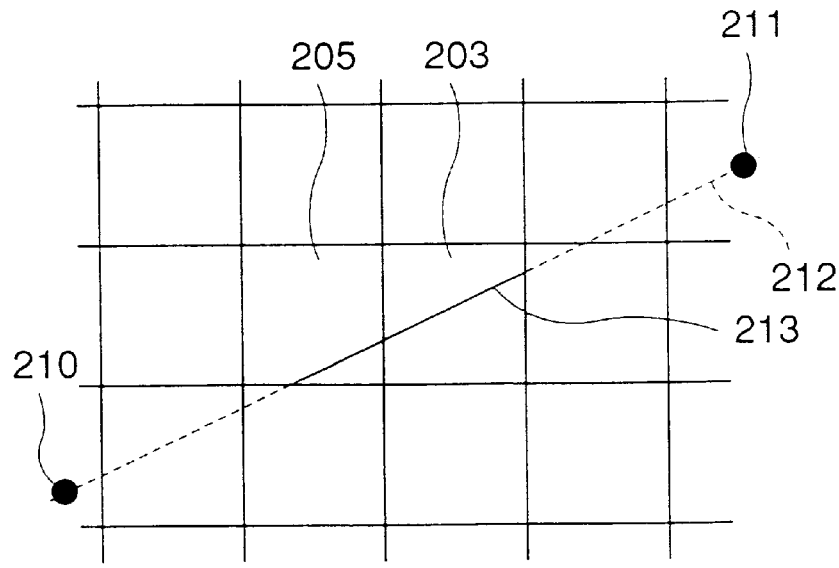

Further, being slightly different from the above-mentioned example, when the fixed points 211 and 210 of the two adjacent blocks 203 and 205 are located far away from each other as shown in FIG. 32, only the segment 213 shown by a solid line in the two blocks 203 and 205 is determined as an edge. This is because there exists the case where although the line between the points 210 and 211 is overlapped with the edge in and around the blocks 203 and 205 or regions 204 and 206, the line is dislocated far away from the edge.

Eighth Embodiment

Figure 33:
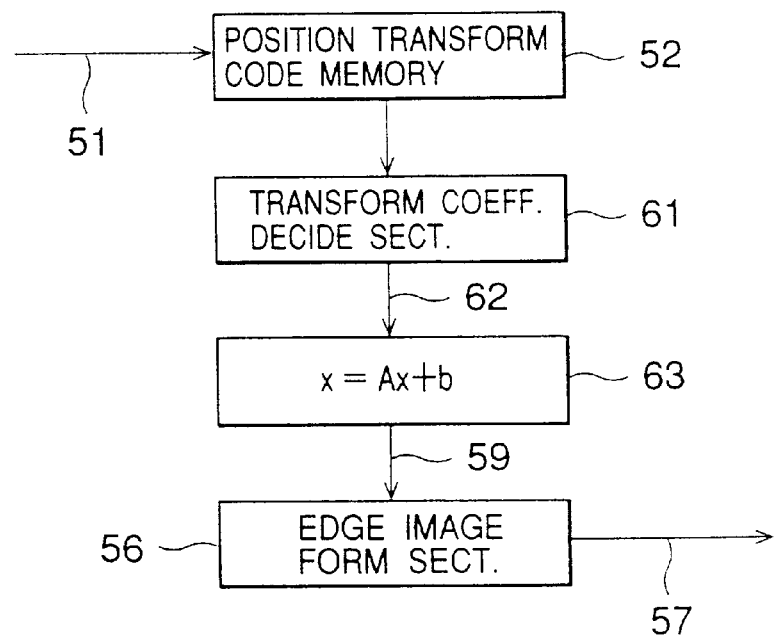
FIG. 33 is a block diagram showing the construction of an eighth embodiment of the attribute detecting apparatus according to the present invention.

FIG. 33 is a block diagram showing an eighth embodiment, in which the fixed point detect section 58 shown in FIG. 25 is shown in more practical way. That is, the position transform is expressed by affine transform w as follows:

$$w\begin{pmatrix}x\\y\end{pmatrix} = \begin{pmatrix}a & b\\c & d\end{pmatrix}\begin{pmatrix}x\\y\end{pmatrix} + \begin{pmatrix}e\\f\end{pmatrix} \quad (1)$$

where x, y denote the abscissa of the pixels and the ordinate value; and a, b, c, d, e, and f are all affine transform coefficients. Further, if $$X = \begin{pmatrix}x\\y\end{pmatrix}, \quad A = \begin{pmatrix}a & b\\c & d\end{pmatrix}, \quad b = \begin{pmatrix}e\\f\end{pmatrix}$$

The expression (1) can be expressed as $$X'=AX+b \quad (2)$$

where X' denotes the point at which the X is transformed.

In FIG. 33, a transform coefficient decide section 61 decides A and B (i.e., a to f). For this purpose, first the following three points $X_1(=(X_1, Y))$, $X_2$, and $X_3$ are set, for instance on the upper left side, the upper right side, and the lower left side, respectively. These three point are position-transformed to obtain $X_1'$, $X_2'$, and $X_3'$. Since these values satisfy the expression (2), the following simultaneous equations can be obtained $$X_1'=AX_1+b$$

$$X_2'=AX_2+b$$

$$X_3'=AX_3+b$$

Since these simultaneous equations are six linear simultaneous equations, it is possible to obtain six un-known quantities. The transform coefficient decide section 61 transmits the six values a to f (62) thus obtained to a fixed point decide section 63.

In the fixed point decide section 63 solves the two-element linear simultaneous equations as follows:

$$X_0=AX_0+b$$

to obtain the fixed point 59 of $X_0=(x_0, y_0)$.

Ninth Embodiment

Figure 34:
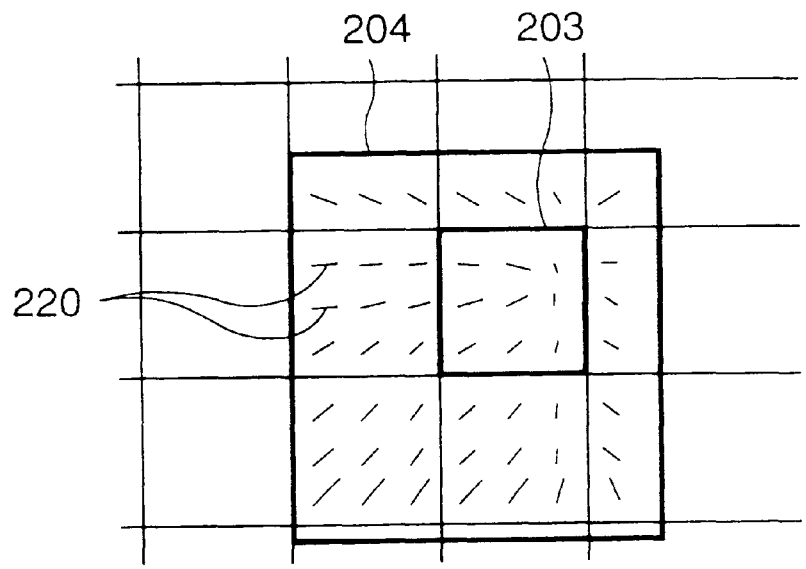
FIGS. 34 and 35 are illustrations showing flow vectors in a ninth embodiment of the attribute detecting apparatus according to the present invention, respectively.

An embodiment for obtaining an edge by use of flow vectors will be described hereinbelow. As shown in FIG. 34, the flow vectors 220 indicate which direction the respective points in the similar region are transformed. In practice, the transform points are obtained at each point, and a gradient of a line obtained by connecting two points corresponding to before and after transforms is determined as a flow vector. Here, the magnitude of the vector is previously determined.

Figure 35:
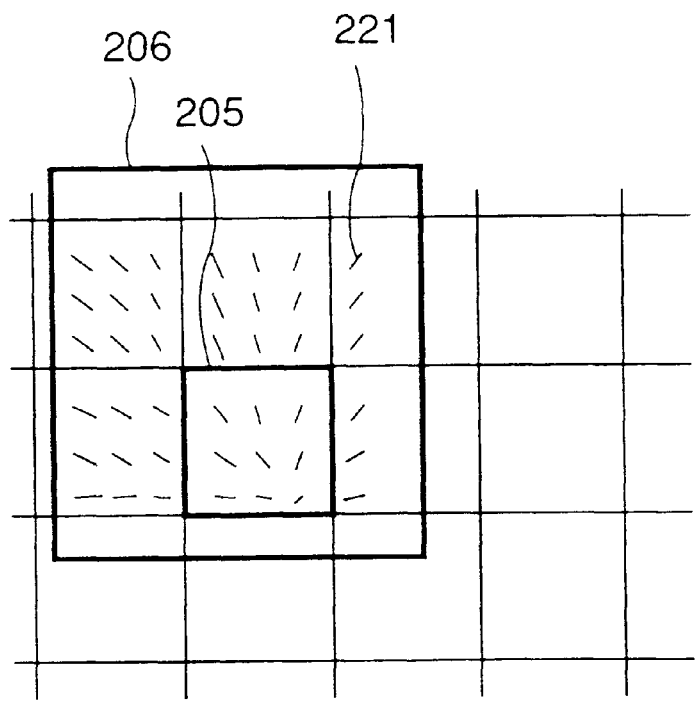
Figure 36:
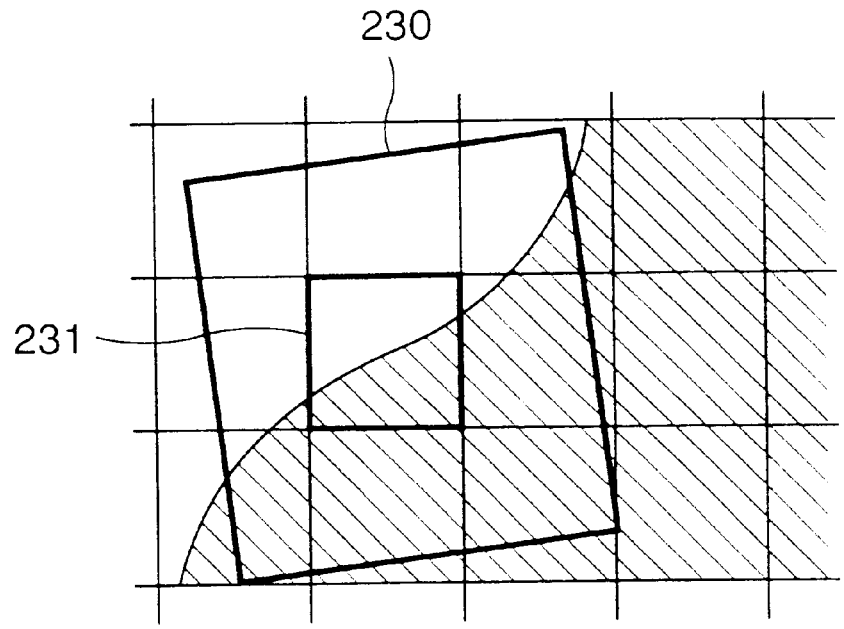
FIG. 36 is an illustration showing a similar region in the ninth embodiment of the attribute detecting apparatus according to the present invention.
Figure 37:
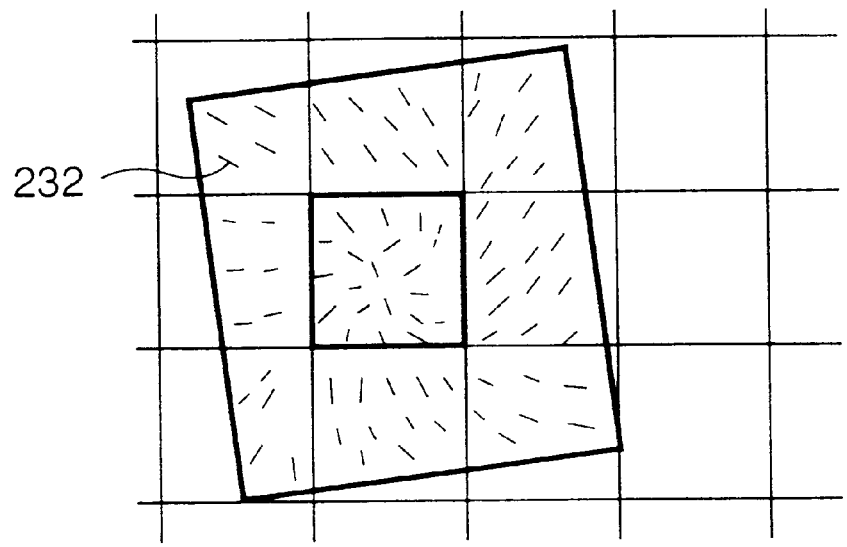
FIG. 37 is an illustration showing flow vectors in the ninth embodiment of the attribute detecting apparatus according to the present invention.
Figure 38:
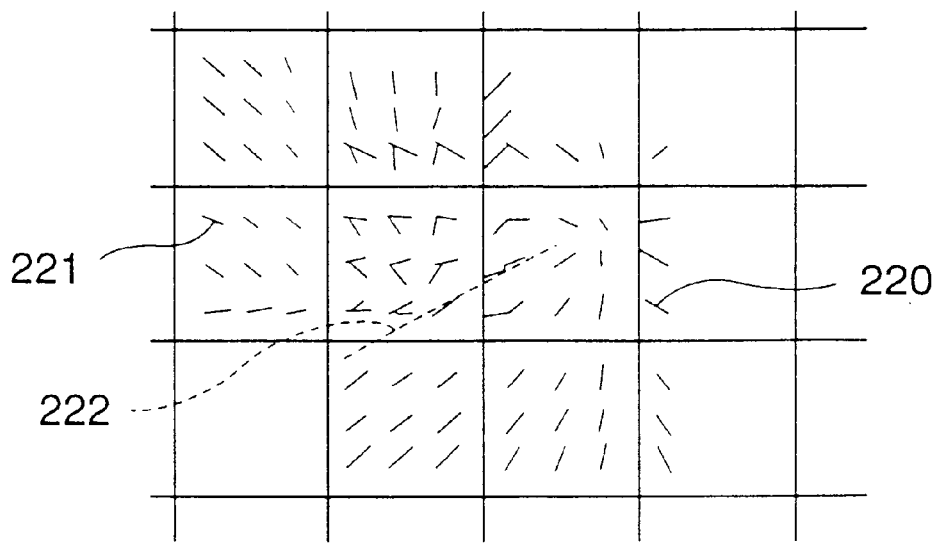
FIG. 38 is an illustration showing overlapped flow vectors in the ninth embodiment of the attribute detecting apparatus according to the present invention.

FIG. 35 shows a flow vector 221 indicative of the position transform of the block 205. Further, FIG. 34 corresponds to the already-explained example shown in FIG. 26, and FIG. 35 corresponds to the already-explained example shown in FIG. 27, respectively. Further, when the edge 231 is curved as shown in FIG. 36, in general, a revolution transform is added to the position transform of the similarity transform. In this example, the region 230 is transformed clockwise to the block 231. FIG. 37 shows the flow vector 232 of this case shown in FIG. 36. These flow vectors 220 and 221, 222 and 232 have such nature that the directions thereof are the same as the respective edge directions at the edge portions. In an example as shown in FIG. 38, when two flow vectors 220 and 221 are overlapped with each other at the edge portion, the directions of the two vectors match each other. Therefore, the position at which an absolute value of an inner product of two vectors exceeds a predetermined value can be decided as an edge.

Figure 39:
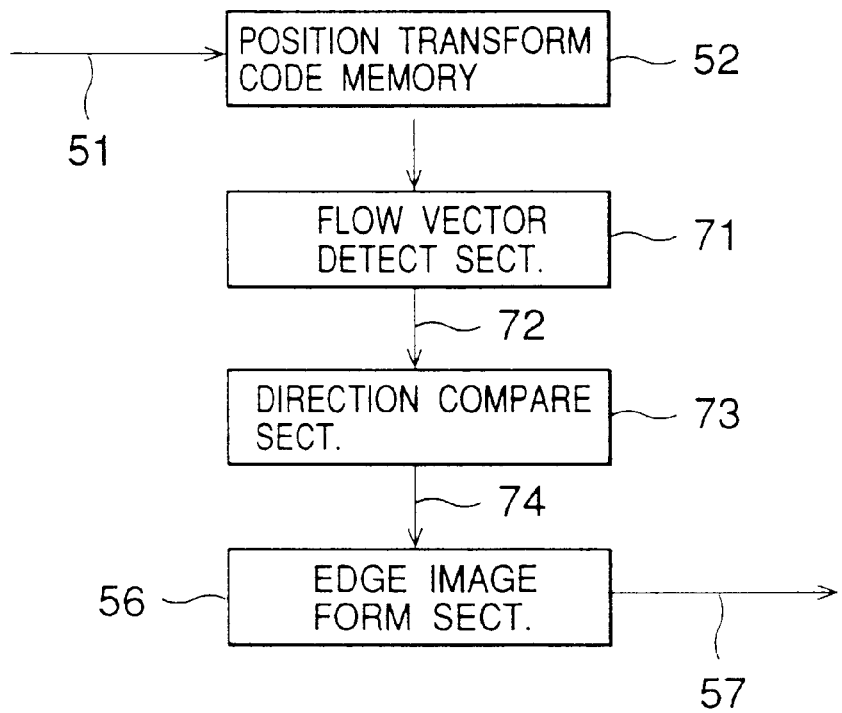
FIG. 39 is an illustration showing a construction of a modification in the ninth embodiment of the attribute detecting apparatus according to the present invention.

FIG. 39 is a block diagram showing an embodiment for obtaining an edge by use of the flow vectors. A flow vector detect section 71 detects flow vectors 72. A direction comparator 73 calculates an absolute value of an inner product of the flow vectors 72 to detect an edge 74.

Further, the ninth embodiment has been explained by taking the case only the similarity transform of two blocks, on the basis of the two examples as shown in FIGS. 26 and 27. However, when the number of the blocks is increased, it is possible to detect an edge in a wider range.

Tenth Embodiment

Figure 40:
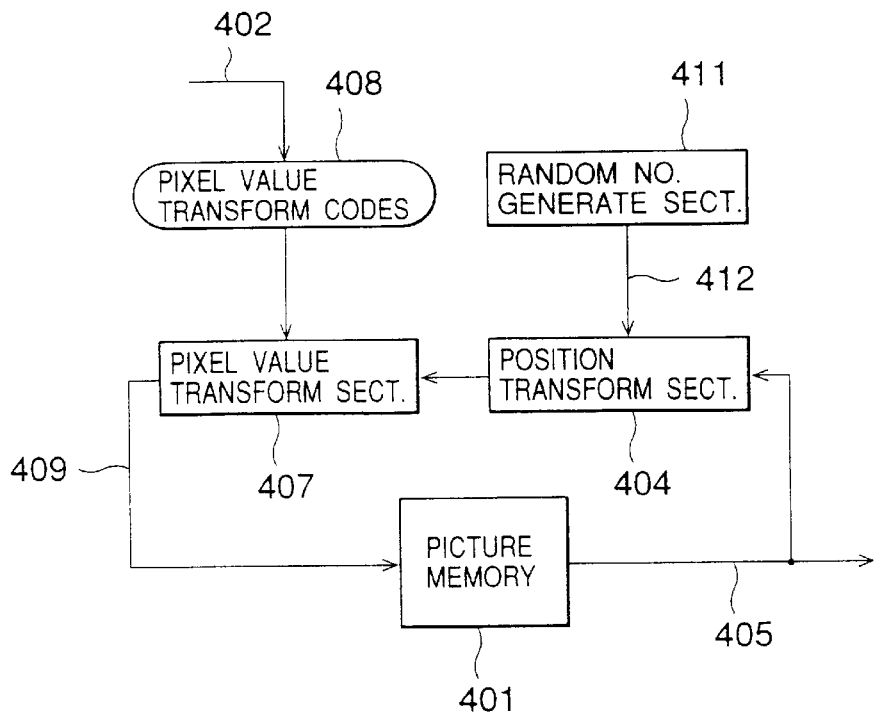
FIG. 40 is an illustration showing a construction of the decoder in a tenth embodiment of the attribute detecting apparatus according to the present invention.

FIG. 40 shows an embodiment in which position transform codes are generated on the basis of random numbers. In this embodiment, the position transform codes 412 inputted to a position transform section 404 are different from the prior art decoder shown in FIG. 5A. That is, the position transform codes 412 are set at random for each block by a random number generate section 411. For instance, with respect to the positions and sizes of the similar regions included in the position transform codes, a plurality of regions are previously set at random in the same probability. For the rotation angle is also set at random in the same way. When the position transform codes formed as described above are used, the shape of an object included in an original picture is no more reproduced. However, since the pixel value transform codes 408 of the original picture are given, it is possible to reproduce the ratio of bright portion to the dark portion of the reproduced picture and a rough bright-dark pattern. Therefore, it is possible to feel the impression or the quality of the original picture in the reproduced picture. In addition, since the position transform codes of the original picture are not required as the codes 402, it is possible to economize the capacity to such an extent as to corresponding to the position transform codes, in the case of a data base for retrieval only. Further, the transmission quantity of codes can be reduced.

Eleventh Embodiment

Figure 5A:
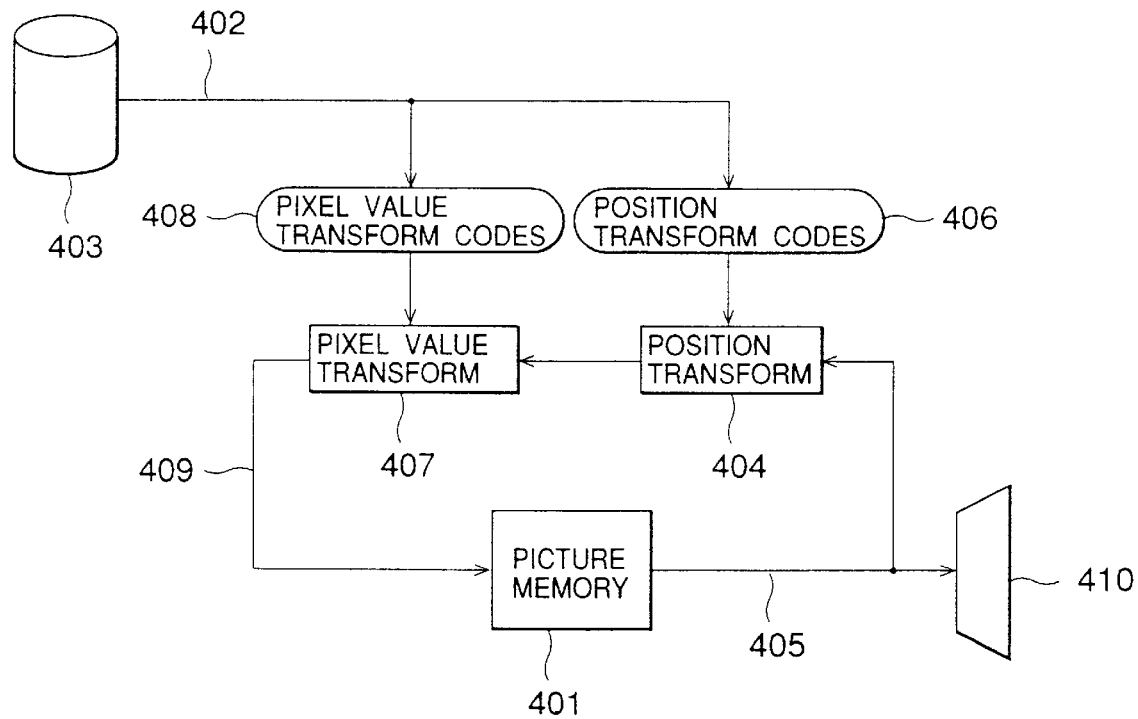
FIG. 5A is a block diagram showing another prior art fractal decoder.
Figure 41:
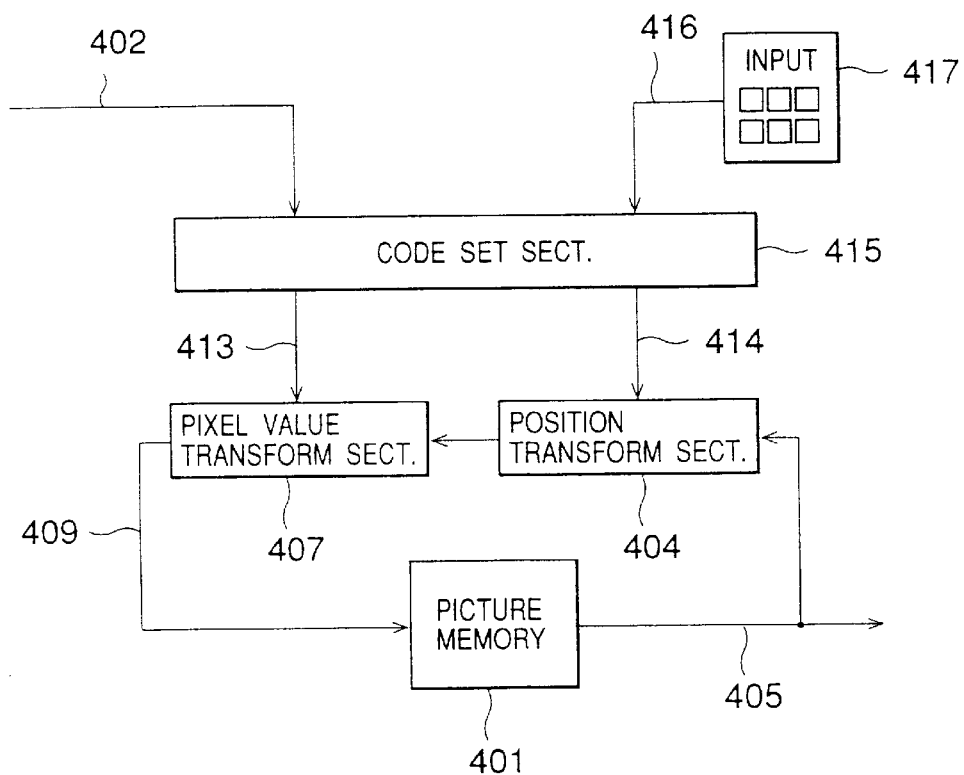
FIG. 41 is an illustration showing a construction of the decoder in an eleventh embodiment of the attribute detecting apparatus according to the present invention.

FIG. 41 is a block diagram showing the eleventh embodiment, in which the position transform codes 414 and the pixel value transform codes 413 are inputted to the position transform section 404 and the pixel value transform section 407, respectively of the prior art decoder shown in FIG. 5A. Here, the already-obtained picture codes 402 and signals 416 inputted from a code input section 417 are both inputted to a code set section 415. Further, the code input section 417 is provided with ten keys, a mouse, a touch sensor, a pen, etc, for easy manipulation by an operator.

In this eleventh embodiment, the reproduced picture can 405 can be changed by changing a part of the codes 402, when the operator operates the code input section 417.

Figure 42:
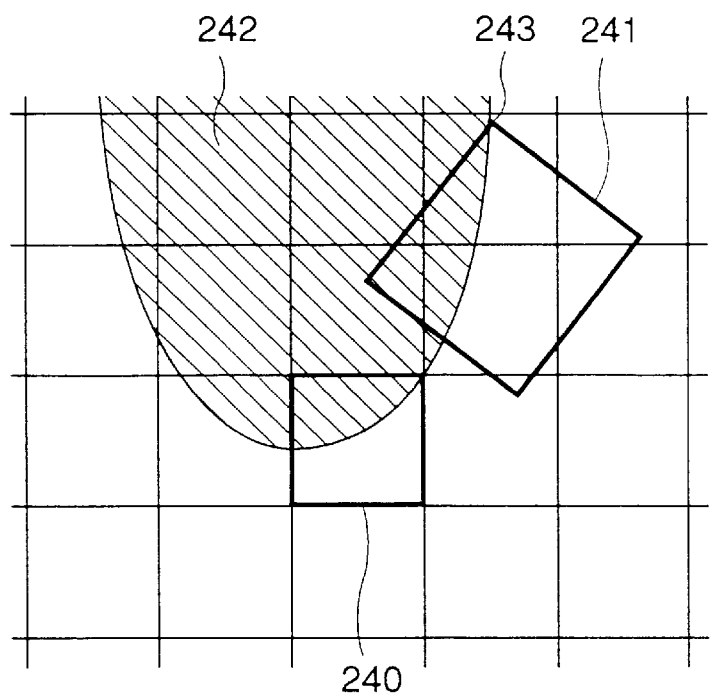
FIGS. 42 and 43 are illustrations for assistance in explaining a position change between before and after position transform by the decoder of the eleventh embodiment of the present invention.
Figure 43:
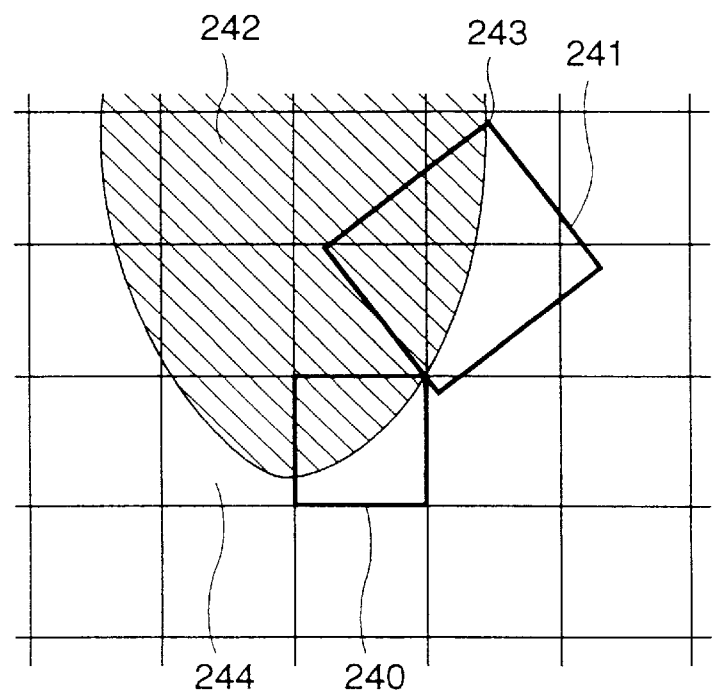

FIGS. 42 and 43 show examples in which position transform of the codes 402 are changed. In the example shown in FIG. 42, a similar region 241 and a block 240 are both given by codes 402. Although omitted for brevity, other similar regions can be given to the other blocks. In the reproduced picture at this time, an object 242 can be reproduced in the shape as shown. Here, when the region 241 is rotated a little clockwise with the point 243 as its center as shown in FIG. 43, the lower portion of the object 242 within the block 240 is a slightly elongated. In the same way, the object within the block 244 can be deformed a little slender.

Figure 44:
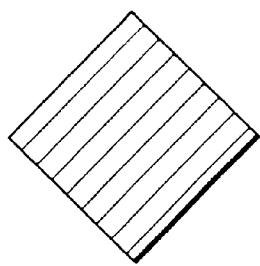
FIG. 44 is a series of illustrations showing the status where a figure is changed gradually in the eleventh embodiment of the present invention.
Figure 44:
Figure 44:
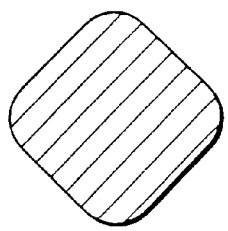
Figure 44:
Figure 44:
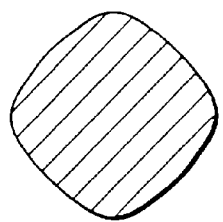
Figure 44:
Figure 44:
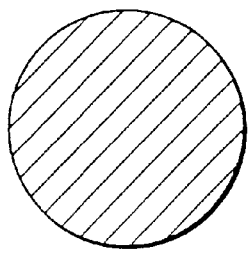

As described above, when the position transform codes are changed gradually, the shape of an object can be changed slightly as shown in FIG. 44. Therefore, in this embodiment, it is possible to execute the morphing (deforming) processing such that the contour of a human face picture, for instance can be modified gradually by changing the code level.

Figure 45:
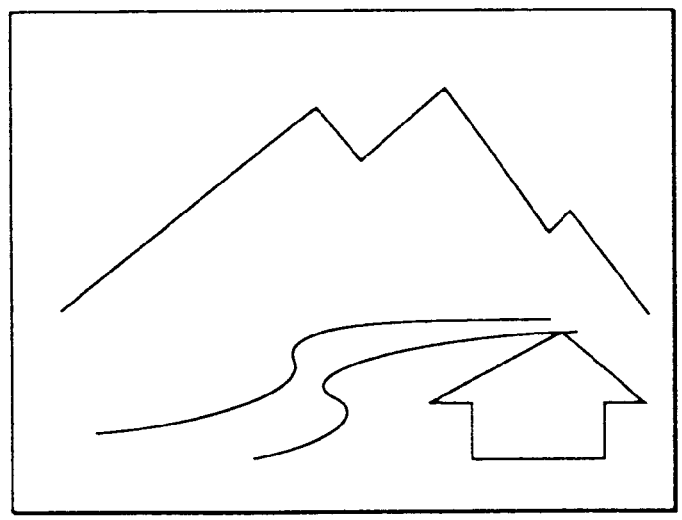
FIGS. 45 and 46 are illustrations for assistance in explaining a picture change between before and after pixel value transform by the decoder of the eleventh embodiment of the present invention.
Figure 46:
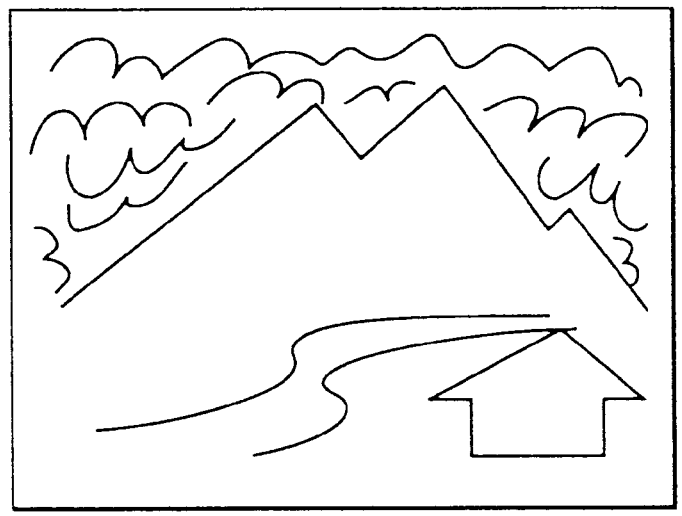

Further, FIGS. 45 and 46 show the case where the pixel value transform codes are changed. When the addition and/or subtraction value of the pixel value is small, a relatively flat texture is obtained (e.g., a blue sky shown as the background in FIG. 45). Therefore, when the addition and/or subtraction value is changed for each block, it is possible to obtain a bright and dark texture (e.g., a cloudy sky as shown in FIG. 46). That is, it is possible to process the picture on the basis of the code level.

Figure 47:
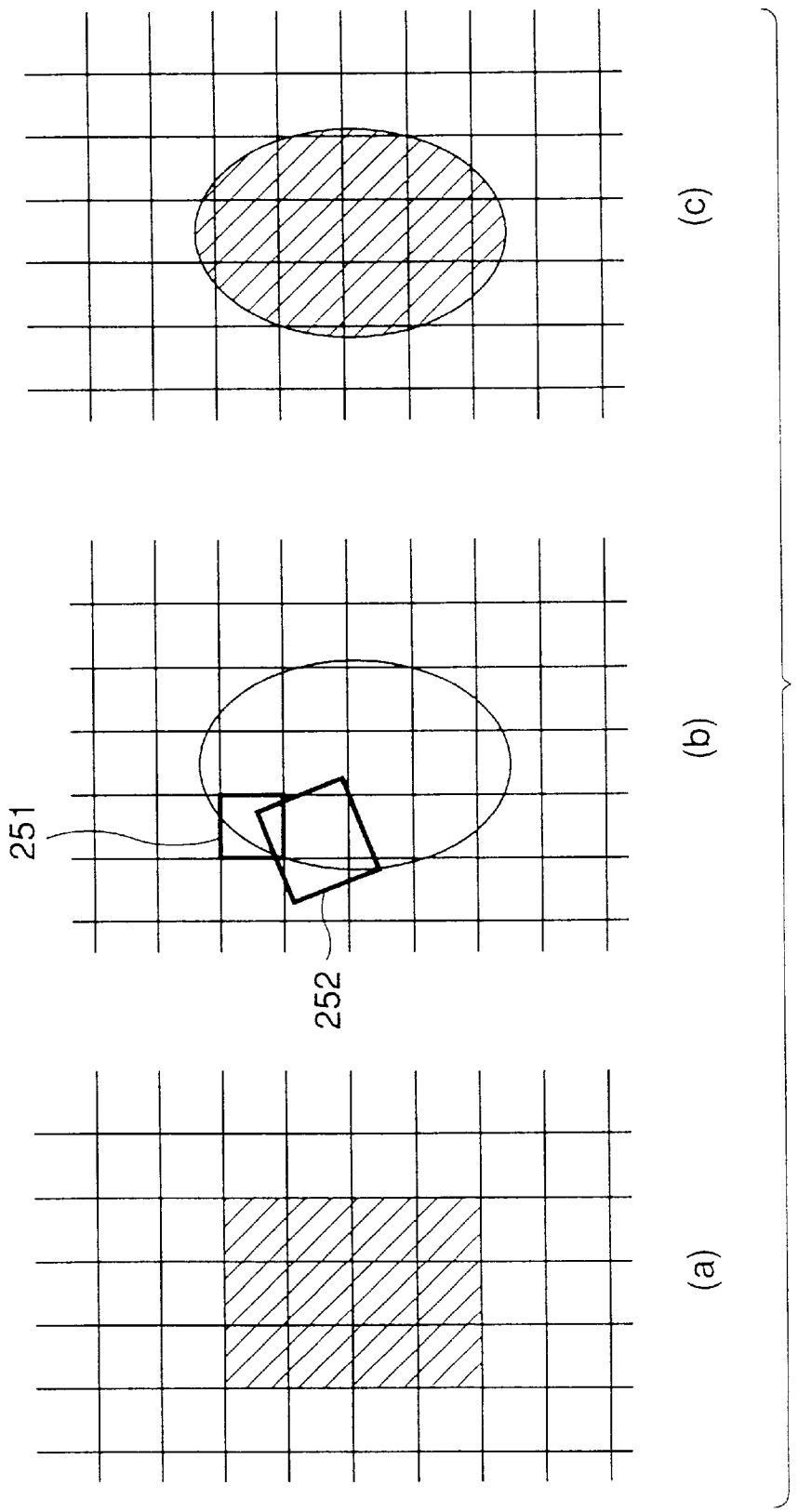
FIGS. 47(a), 47(b) and 47(c) are illustrations showing for assistance in explaining a picture formation process by giving a block average value and an edge, respectively, by the decoder of the eleventh embodiment of the present invention.

FIGS. 47(a) to (c) show an example in which all the codes are inputted to the code input section 417 without use of any codes 402 in FIG. 41. This is an example of an average value separation-type fractal coding (See "Image compression by iterative transform coding"; by Ida, Datake, 5-th Circuit and System, Karuizawa, Workshop Paper Collection, April, 1992). In this method, a block average value is used, instead of the addition and/or subtraction value of the pixel value transform codes. FIG. 47(a) shows an example in which the luminance value is roughly determined for each block. FIG. 47(b) shows an example in which the position transform is set in such a way that an egg-shaped edge can be formed. In this case, a region 252 is set for the block 251, for instance, and further the other blocks in the same way. Further, FIG. 47(c) shows an example in which a picture is formed by use of both the pixel value transform and the position transform set in FIGS. 47(a) and 47(b), respectively. As described above, it is possible to form any desired picture by giving rough luminance value distribution and the edge.

Twelfth Embodiment

Figure 4:
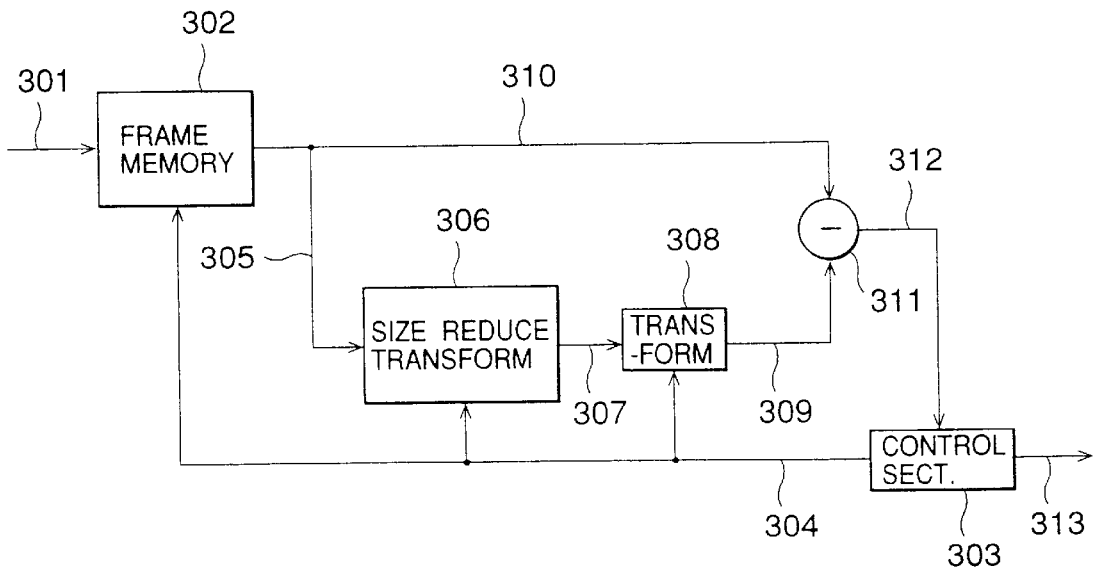
FIG. 4 is a block diagram showing a prior art fractal coder.
Figure 48:
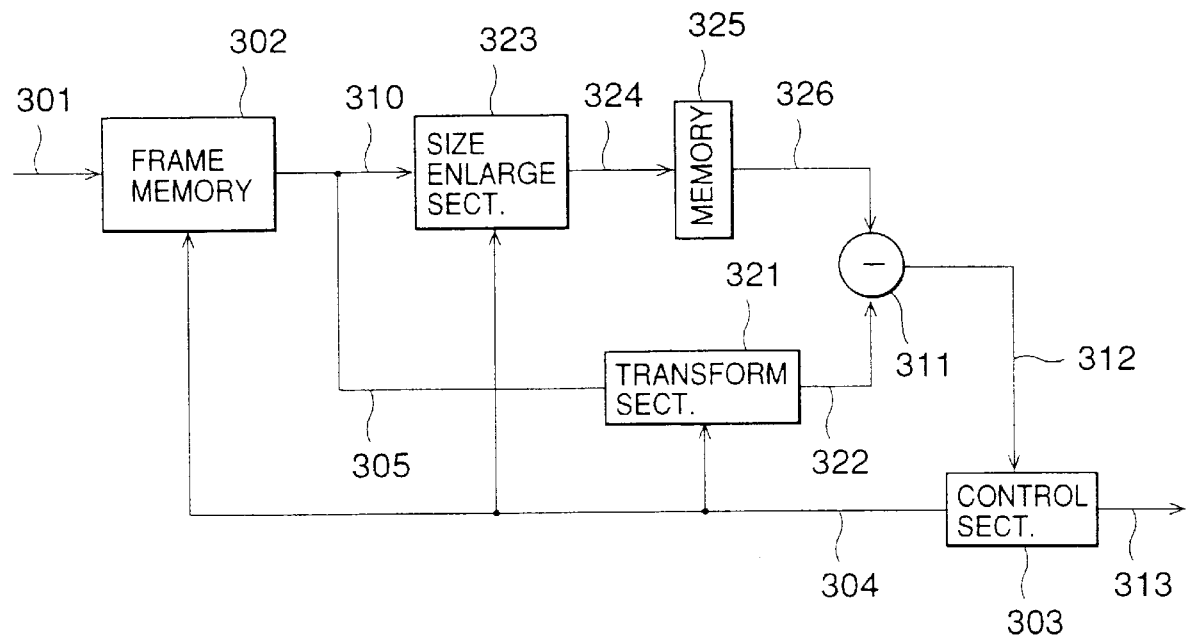
FIG. 48 is an illustration showing a construction of the coder in a twelfth embodiment of the attribute detecting apparatus according to the present invention.

FIG. 48 is a block diagram showing a twelfth embodiment, in which codes fo reproducing a picture into an enlarged shape can be obtained. In this embodiment, the processing of the region picture data 305 and the block picture data 310 are different from the prior art decoder shown in FIG. 4. The region picture data 305 are transmitted to a transform section 321 as the original size, and then processed for rotation transform, reduction and addition and/or subtraction transform in the pixel value direction. The transformed region data 322 are inputted to the difference section 311. On the other hand, a size enlarge section 323 enlarges the block picture data 310 to obtain the size and the number of pixels the same as those of the region. The obtained enlarged block data 324 are stored in a memory 325. Further, a transform section 321 transforms the region data 322. The transformed region data 322 are inputted to the difference section 311. The enlarged block data 326 read from the memory 325 and the region data 322 outputted from the transform section 321 are both inputted to the difference section 311 at the same timing. After that, the transform is executed in such a way that the error 312 outputted from the difference section 311 can be minimized, and the codes are outputted in the same way as with the case of the prior art coder as shown in FIG. 4.

In the transform section 321, several transforms (e.g., four rotation transforms in unit of 90 degrees) are executed in sequence to evaluate the errors. In this case, however, when the size enlarge transform is executed for the same block for each sequential transform, the quantity of calculation increases. In this twelfth embodiment, therefore, the data obtained by a size enlarge section 323 are stored in the memory 325, and the data for the same block are read repeatedly to reduce the quantity of calculations. Further, when the calculation quantity is not important, the memory 325 can be omitted.

As described above, in the second aspect of the present invention, it is possible to form a simple picture on the basis of simple codes, so that pictures can be processed on the basis of the code levels.

A third aspect of the present invention will be described hereinbelow, in which the feature pattern size can be detected.

Thirteenth Embodiment

Figure 49:
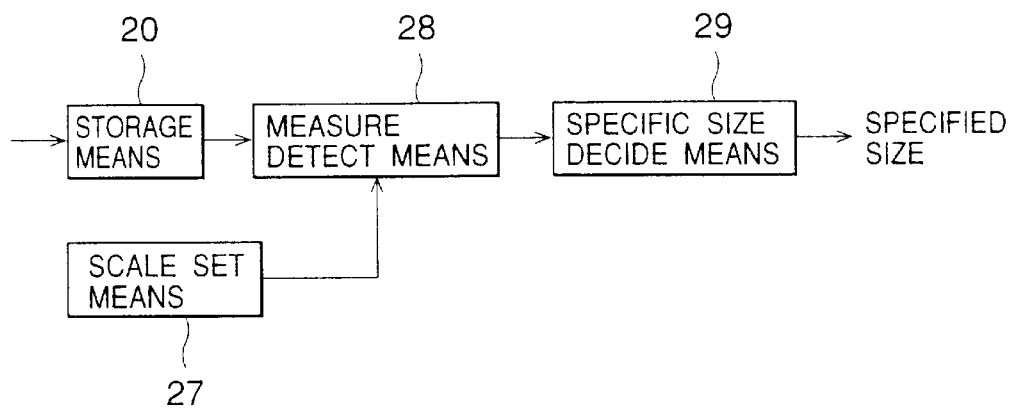
FIG. 49 is a block diagram showing the construction of a signal feature pattern size detecting apparatus of a thirteenth embodiment of the attribute detecting apparatus according to the present invention.
Figure 50:
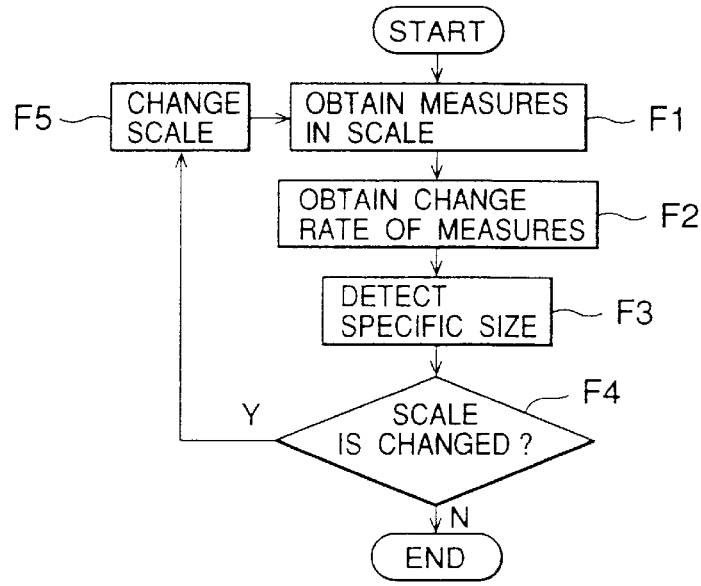
FIG. 50 is a flowchart for assistance in explaining the operation of the thirteenth embodiment of the size detecting apparatus according to the present invention.
Figure 51A:
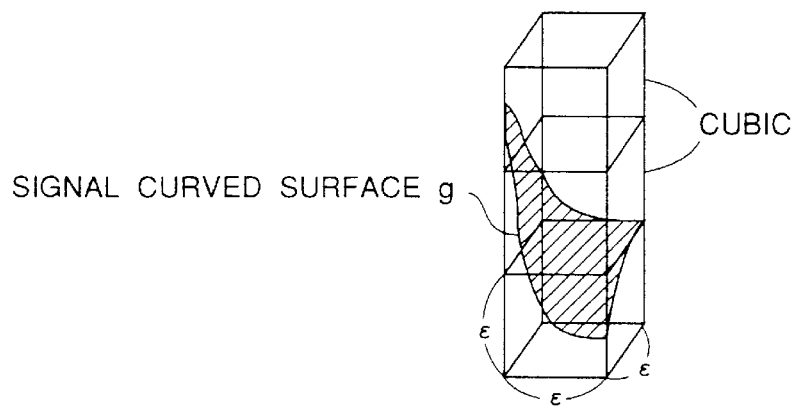
FIG. 51A is an illustration showing an example of a measure detecting method of the thirteenth embodiment.

FIG. 49 is a block diagram showing an apparatus for detecting the size of the feature pattern of signals. The size detector is composed of storage means 20, scale setting means 27, measurement detecting means 28, and specific size deciding means 29. The function of the size detector will be described hereinbelow with reference to a flowchart shown in FIG. 50. First, input signals are stored in the storage means 20. According to the input signals stored therein, a plurality of scales are set by the scale setting means 27. On the basis of the scale thus set, a measure B is detected by the measure detecting means 38 to obtain the fractal dimensions related to the input signals (in step F1 shown in FIG. 50). In the case of a signal curve g as shown in FIG. 51A, for instance, the measure B can be obtained by covering the signal curve g with a plurality of cubes having one side of scale $\epsilon$ and by counting the number of cubes. This measure detecting method is disclosed, for instance by B. B. Chaudhuri, N. Sarkar, P. Kunde; "Improved fractal geometry based texture segmentation technique" IEE Proceedings-E, vol. 140, No.5, September, 1993.

The measure detection as described above is executed on the basis of the several scales $\epsilon_i$ (i=0, 1, ...) set by the scale setting means 27. The specific size deciding means 29 detects the change rate ($\Delta$ log B) according to the scales $\epsilon$ of these measures (log B) (in step F2 in FIG. 50). The specific size deciding means 29 discriminates whether the change rate of the measures satisfies a predetermined condition or not. If satisfied, that is, if the change rate of the measures exceeds a predetermined value, the specific size deciding means 29 determines the scale $\epsilon_T$ at this time as a specific size, and outputs the determined scale to the outside (in step F3 in FIG. 50). Further, when the measures have been obtained in all the scales previously prepared, control ends the specific size detection. When the measures have been not yet obtained in all the scales, control changes the scale and repeats the same processing (in steps F4 and F5 in FIG. 50).

In this embodiment, a plurality of cubes are used to detect the measure. Without being limited thereto, however, in the case of the one-dimensional signal such as audio signals, a segment having a length $\epsilon$ can be used as the scale. Further, when the audio signals are taken into account as two dimensions of amplitude and time, the measure can be obtained by use of square areas as the scale. Therefore, the measure can be decided according to the feature pattern of the signals to be detected.

In the case of video signals, it is possible to use square areas for the two dimensional signals or cubic volumes for three dimensional signals (including the luminance value direction) as the scales. Further, the dynamic ranges and the logarithm of the signals for the scales can be used. Further, as a simplified method, it is also possible to use the number of signals which change within the square scale. Further, the prior art blanket-covering technique and the fractal dimension deciding technique can be also used. As the algorithm for measuring the measures, it is possible to use figures having the same dimension as the general dimension of the signals.

Figure 51B:
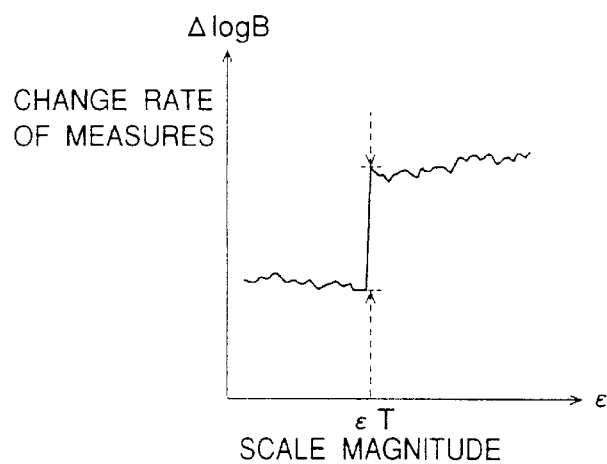
FIG. 51B is a graphical representation showing an example of specific size detecting method on the basis of the measure change rate.

When the signal measures are measured in the set scale, the scales can be cut off being overlapped with each other or the measures can be measured by overlapping the scales little by little. When overlapped, the measures are obtained by averaging the measures by use of the number of overlappings. In this case, the measure can be measured by all the possible cutting methods or at random. Further, another rule can be adopted for measurement. FIG. 51B shows the relationship between the measure change rate and the scale size.

Further, the change of the measures according to the scale can be decided on the basis of whether the change rate of the measure is positive or negative or by use of the difference and dispersion of absolute values of the change rates.

In the above-mentioned embodiment, the measures are obtained for a plurality of scales, and the specific size (the size of the signal feature pattern) has been detected on the basis of whether the change rate of these measures can satisfy a predetermined condition or not. Here, this detecting principle will be explained hereinbelow.

Figure 5B:
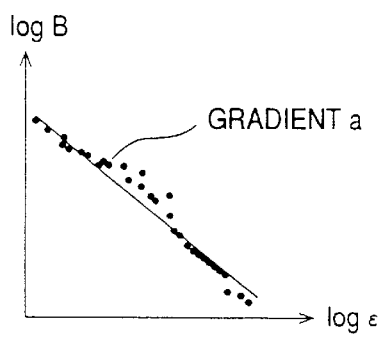
FIG. 5B is a graphical representation showing a prior art method of obtaining fractal dimensions on the basis of measures.
Figure 6:
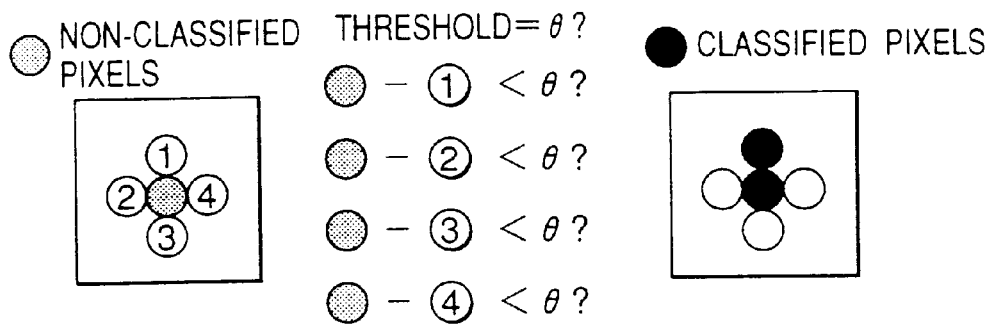
FIG. 6 is an illustration showing an example of a prior art region division.
Figure 7:
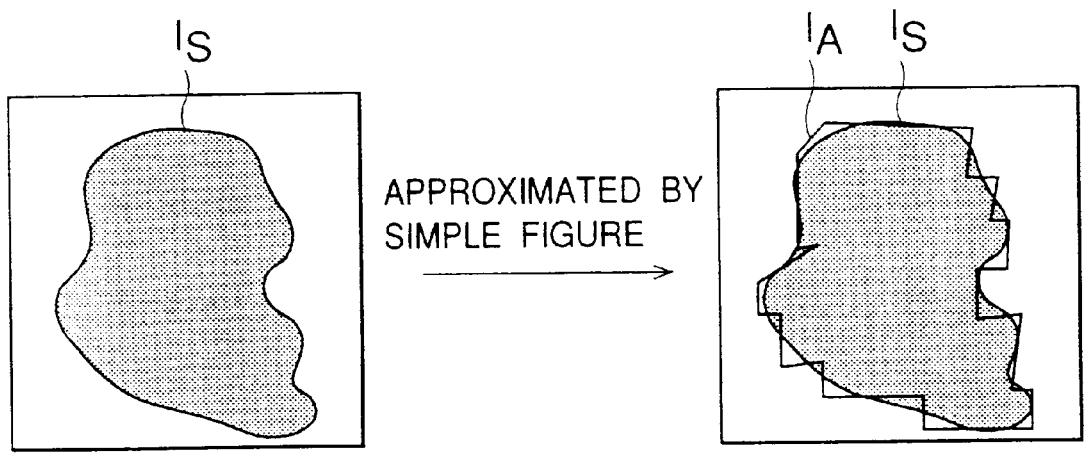
FIG. 7 is an illustration showing an example of a prior art method of representing a region shape.
Figure 8:
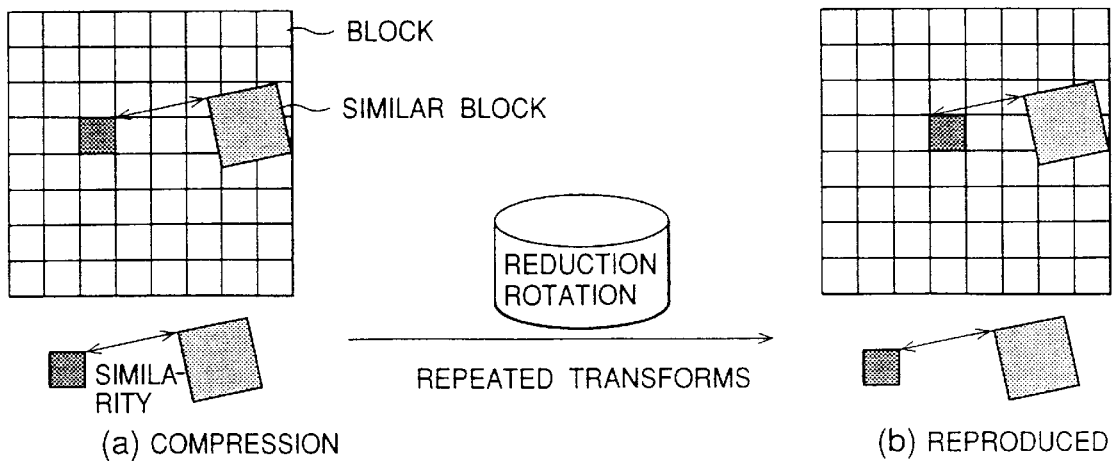
FIGS. 8(a) and 8(b) are illustrations for showing a principle of the prior art fractal compression and fractal reproduction.
Figure 9:
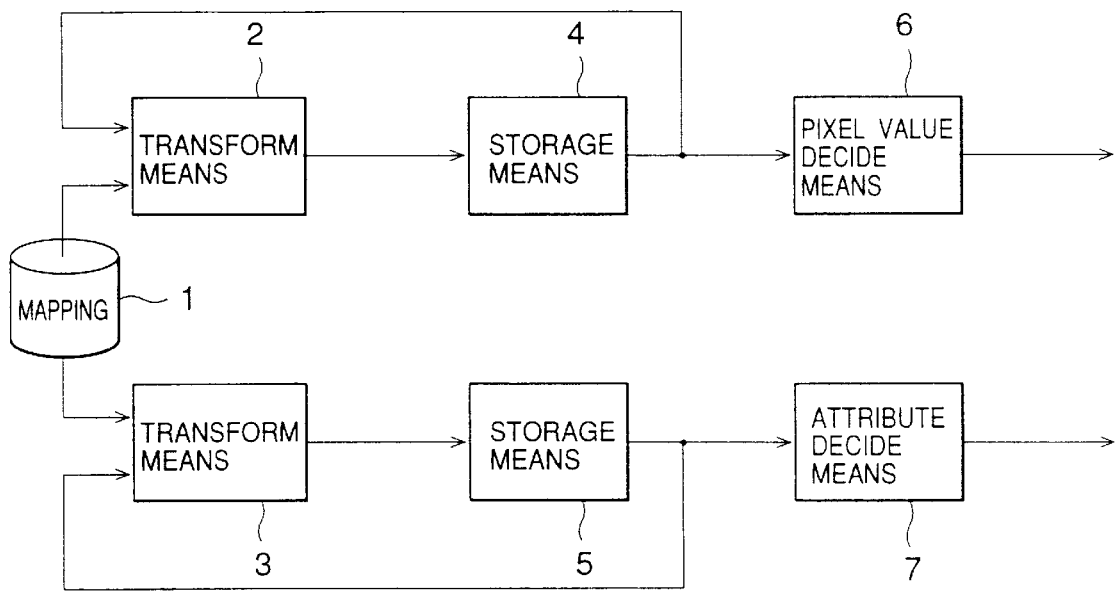
FIG. 9 is a block diagrams showing the prior art apparatus construction for reproducing the pixel values and deciding the attributes.
Figure 10:
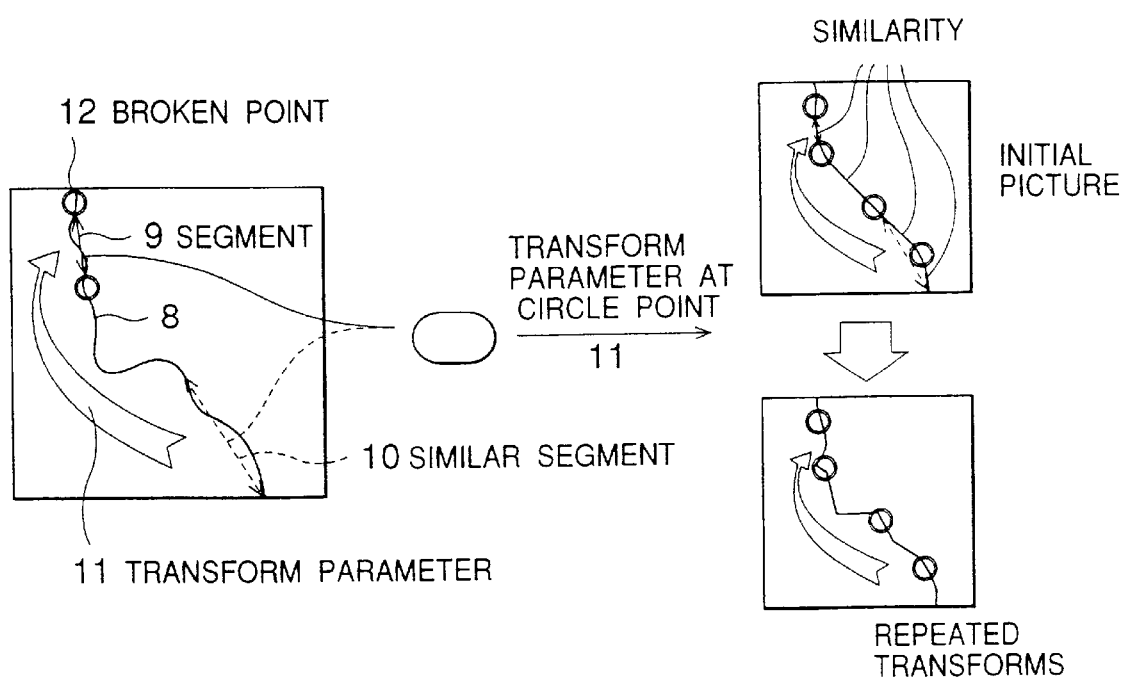
FIG. 10 is an illustration showing another prior art example of the method of representing the region boundary.
Figure 52:
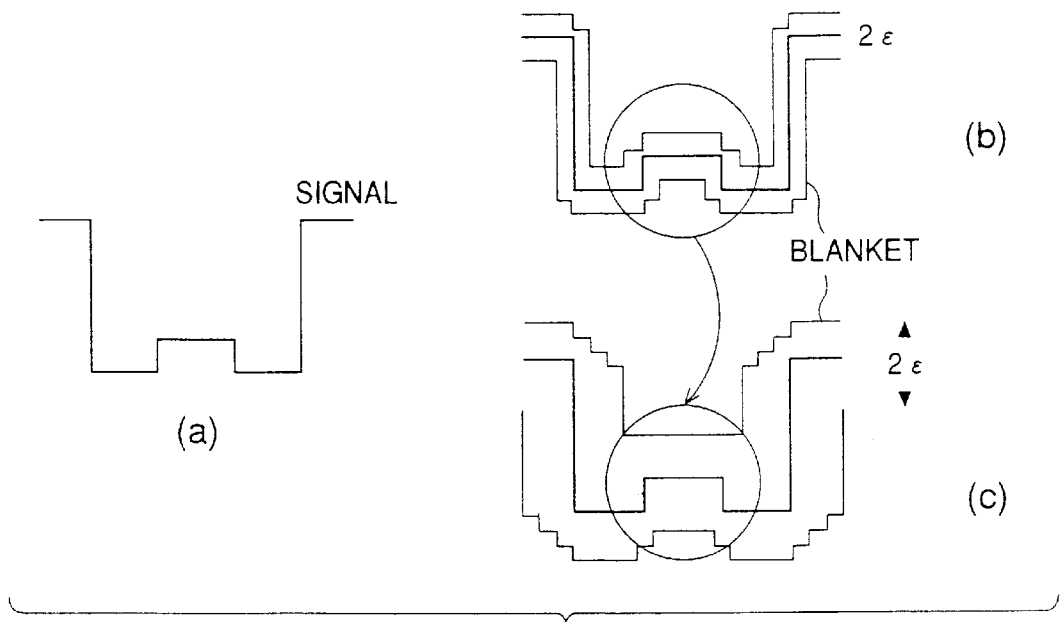
FIGS. 52(a), 52(b) and 52(c) are illustrations for assistance in explaining the principle of the specific size detecting principle.
Figure 53:
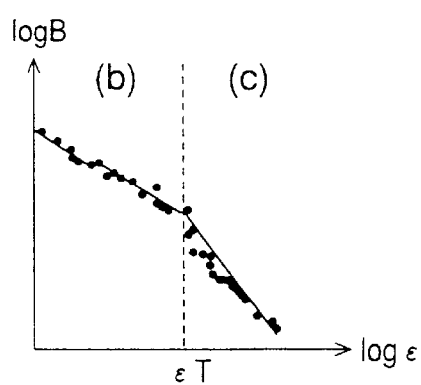
FIG. 53 is a graphic representation showing the principle of the specific size detecting principle.

Here, the assumption is made that the measure detecting means 28 is provided with a signal pattern as shown in FIG. 52(*a*). When the scale is small, this change can be obtained by use of a blanket as expressed in FIGS. 52 (*b*) and 52(*c*) However, when the scale $\epsilon_T$ exceeds a predetermined value, since the upper blanket surface and the lower blanket surface are both flattened, the change pattern of the signals are buried in the blanket. This can be expressed as shown in FIG. 53 (when expressed in the same way as shown in FIG. 5B). In the prior art fractal dimension, these changes are approximated by use of a straight line. In practice, however, $\epsilon_T$ can be observed as a broken line. In other words, when the change rate of the measures is broken at a certain scale as shown in FIG. 53, since the change rate can be observed as a broken graph, it is possible to detect the pattern size of the signal feature pattern by detecting the scale $\epsilon_T$ at which the change rate is broken.

As described above, according to the present invention, being different from the prior art technique, since it is unnecessary to divide the blocks and the regions, it is possible to easily detect the size of the signal feature pattern.

Figure 54:
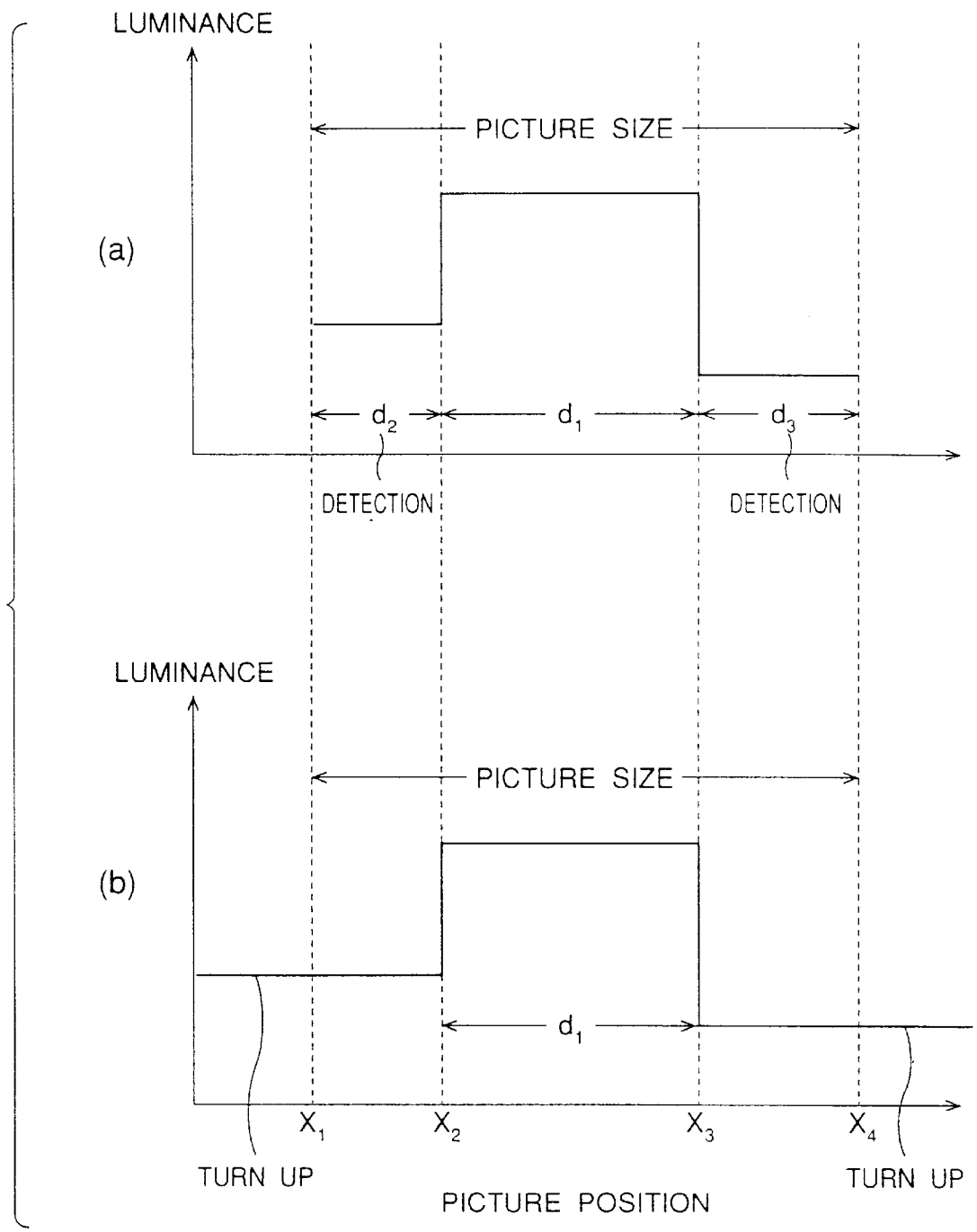
FIGS. 54(a) and 54(b) are illustrations for assistance in explaining that the distance between the picture end and any desired region can be detected by a specific size.

When the detecting apparatus as described above is used for the video signals, a distance between an end of a picture and a desired region can be detected as a specific size. This is because the measures can be obtained in the same way as when there exists a large change of the video signal on an end of the picture, as shown in FIGS. 54(*a*) and 54(*b*). Further, conversely, when the measure is obtained by turning up the end of the picture by setting the size of the given picture to the scale, since there exists no change in the video signal at the end of the picture, the distance from the end of the picture cannot be measured, so that another distance between both ends of the region in the picture can be detected. FIGS. 54(*a*) and 54(*b*) show the picture position on the abscissa and the luminance value of the video signal on the ordinate. Further, in FIG. 54(*a*), since a specific size d is detected on the assumption that the luminance value is zero within a picture position 0<x<x1, the measures are detected as that the regions changes at the positions x=x1, x2, x3 and x4, respectively. By doing this, d2 and d3 are detected as specific sizes. On the other hand, in FIG. 54(*b*), since the measures are detected by turning up the luminance value at the positions x=x2 and x4, the distance from an end of the picture cannot be detected, with the result that only the distance d1 of a specific region in the picture can be detected.

Figure 55:
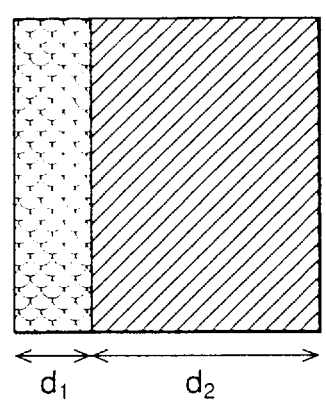
FIGS. 55(a) and 55(b) are illustrations for assistance in explaining the case where the present invention can be used as the texture analysis.
Figure 55:
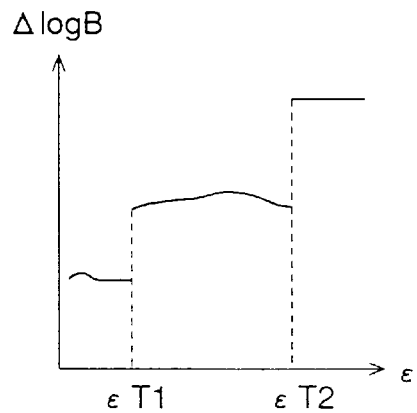

Here, an example in which the present embodiment is applied to divide a picture having mixed textures will be explained, with reference to FIGS. 55(*a*) and 55(*b*). In this example, the textures are divided. As shown in FIG. 51A, a cube having one side scale $\epsilon$ is considered for all the possible scales. The luminance surface of the stored texture picture is covered by the minimum possible number of cubes. This number is determined as the measure B($\epsilon$) for the scale. Further, the change rate (gradient) of the measures decreasing in proportion to the scale is observed to obtain the specific scale as the feature rate. In this example, the specific scales $\epsilon T_1$ and $\epsilon T_2$ represent the distance $d_1$ and $d_2$ between the picture end and the change points of the textures. Therefore, the textures can be easily separated by these distances. Further, as shown in FIG. 55(*b*), it is possible to know the complicated nature of the switched textures on the basis of the gradient of the measure change to $\epsilon T_1$ (fractal dimension), the gradient from $\epsilon T_1$ to $\epsilon T_2$ and the gradient from $\epsilon T_2$ and after.

Figure 56:
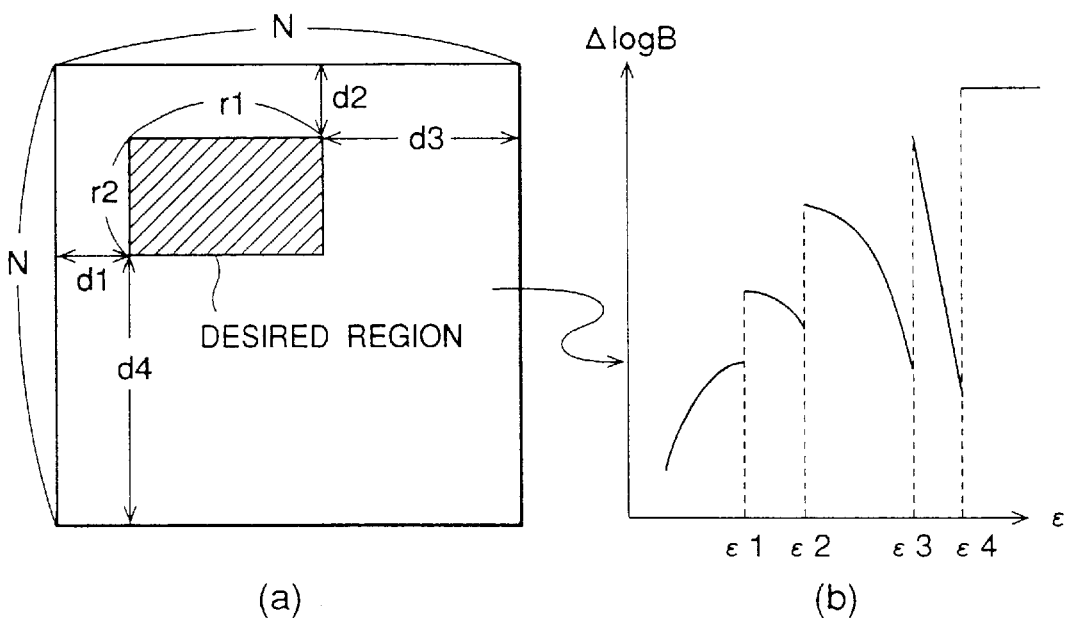
FIGS. 56(a) and 56(b) are illustrations for assistance in explaining an example in which any desired region can be detected on a picture.
Figure 57:
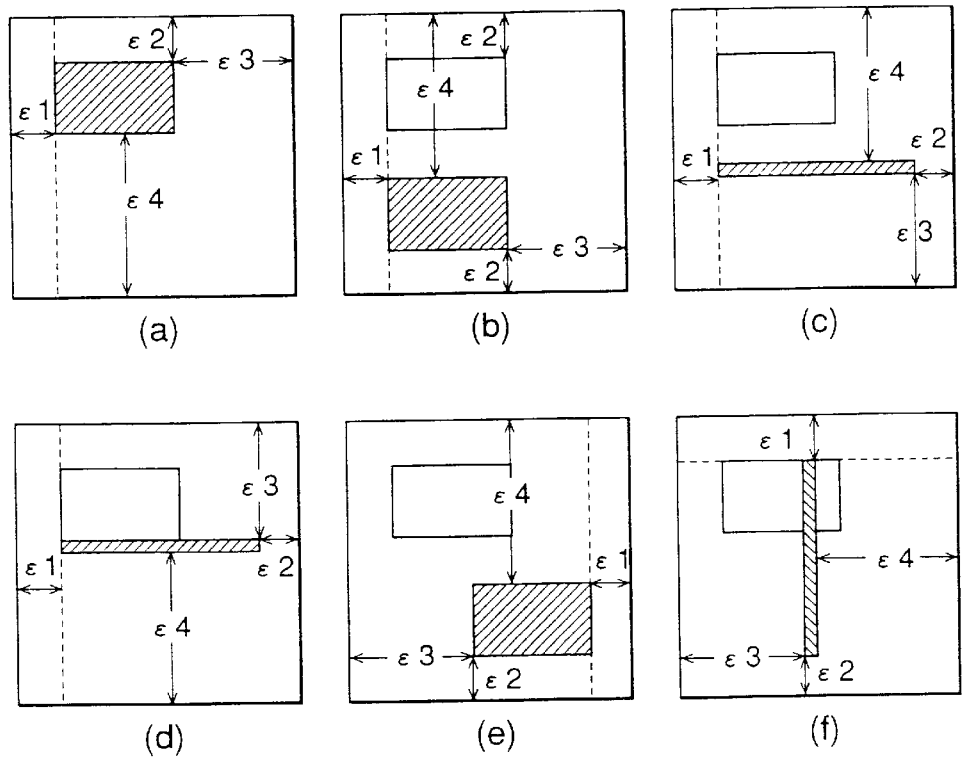
FIGS. 57(a) to 57(f) are illustrations for assistance in explaining examples in which any desired region can be detected on a picture.

FIGS. 56(a) and (b) shows an example to which the present embodiment is applied to know the size and the position of any desired region having a feature pattern. In this example, the size and the position of the region are obtained. For instance, as shown in FIG. 56(b), when the measures are obtained in the same way as with the case of the example of the above-mentioned texture division, the specific scales $\epsilon_1, \epsilon_2, \epsilon_3$ and $\epsilon_4$ of the N×N pixel size can be obtained. When the end of the picture is not turned up, these specific scales correspond to $d_1, d_2, d_3$ and $d_4$. There are some methods of knowing the corresponding relationship between two of them. For instance, in the case of the example shown in FIGS. 57(a) to 57(f), all the regions (hatched portions) of the all possible sizes decided by the obtained scales $\epsilon_1, \epsilon_2, \epsilon_3$ and $\epsilon_4$ are assumed, and the picture is partitioned by $\epsilon_1$ and further the specific scales of the remaining regions are detected again. Further, the correct positions can be decided by checking whether there exists any contradiction when the specific scales obtained as a result of re-detection are assumed. In this example, since the scales $\epsilon_2, \epsilon_3-\epsilon_1$, and $\epsilon_4$ can be detected in FIGS. 57(a), 57(b), 57(c) and 57(d), $\epsilon_1=d_1$ is determined to be correct. In the same way as above, the pictures as shown in FIGS. 57(a), 57(b), 57(c) and 57(d) are discriminated by the region partitioned by $\epsilon_2$. By repeating the above-mentioned discrimination, it is possible to obtain the correspondence between the specific sizes and the actual distances.

In the example for obtaining the above-mentioned region positions, when the method of turning up the end of the picture is used together, since the region sizes r1 and 2 (as shown in FIG. 56(a)) can be detected directly, the region positions can be specified more easily. For instance, there exists such a method of deciding the horizontal and vertical specific sizes separately, by fixing one side of the region by one of the two specific sizes and by measuring again the measure in unit of rectangle whose scale corresponds to the other side of the region.

As another method of detecting the sizes of any desired region, it is possible to use the method of obtaining the measures by use of a rectangle having a scale of $g_1$ (vertical) and $g_2$ (horizontal). When the measures are obtained by use of a rectangle having the same sizes as those of the region, the change rate changes abruptly, so that a set of two sides of the rectangle at this time are determined as the specific scales. In addition to the rectangle, a triangle, circle, any three-dimensional figures can be used where necessary.

When various patterns are mixed in the signals as described above, as far as there exists one size appearing often, this size can be detected on the basis of the change rate of the measures used as the specific scale. For instance, this is effective when the character size is detected on the basis of the character region. As the pre-processing of the character recognition, when the character region position is detected roughly by scanning the vertical and horizontal pixel values (projection) and after that when the detailed characters are detected in accordance with the present invention, it is possible to easily partition the characters accurately. Further, it is possible to use the region division technique according to the present invention for the position detection of character regions by projection. Further, as another application, it is also possible to detect the character thickness on the basis of the character picture.

Fourteenth Embodiment

Figure 58:
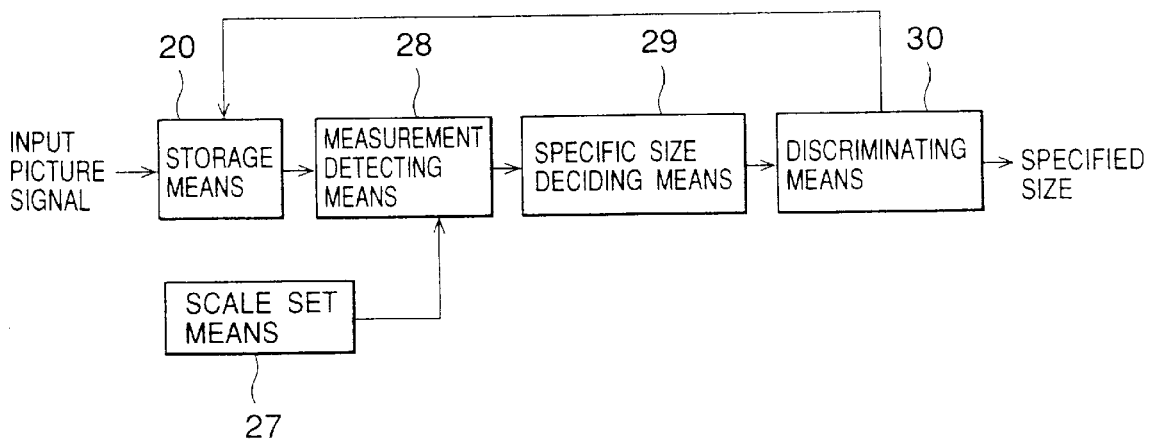
FIG. 58 is a block diagram showing the fourteenth embodiment of the signal feature pattern size detecting apparatus according to the present invention.

FIG. 58 is a block diagram showing a fourteenth embodiment of the feature pattern size detecting apparatus according to the present invention. This embodiment is different from the thirteenth embodiment shown in FIG. 49 in that discriminating means 30 is newly provided. This embodiment is effective when the input signals are video signals. On the basis of the specific sizes outputted by the specific size deciding means 29, the discriminating means 30 discriminates the number of specific sizes, whether the specific size satisfies a predetermined condition, or whether the picture block is further divided or not.

Here, if the re-division is decided, a division command of the video signals stored in the discriminating means 30 is given to the storage means 20. If re-division is not decided, the specific sizes are outputted and used to specify the edges of a picture divided into blocks. The given conditions are for instance such that whether an edge can be specified, whether an edge in a desired range can be specified, etc. which are determined according to the desired feature pattern, respectively.

Figure 59:
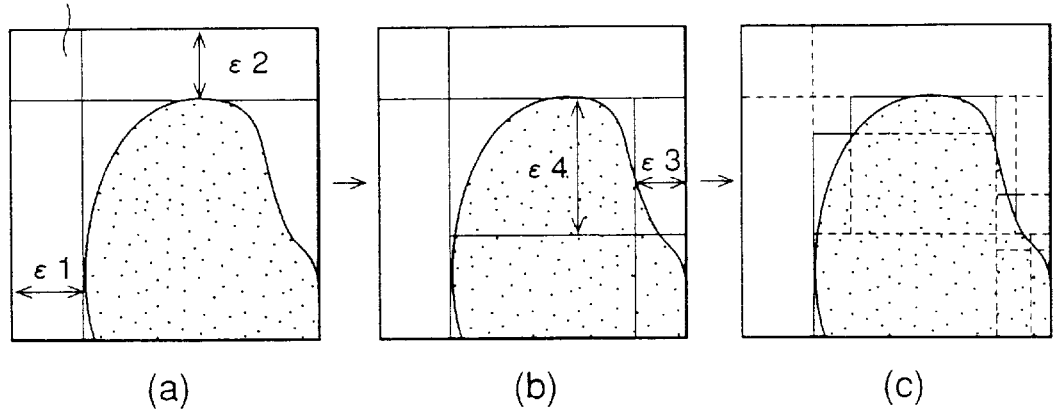
FIGS. 59(a) to 59(c) are illustrations showing an example for detecting edges on the basis of the fourteenth embodiment of the size detecting apparatus according to the present invention.

FIG. 59(a) to 59(c) show an example in which the present embodiment is applied to the region division of video signals. In FIGS. 59(a) to 59(c), the distances from the end of the picture are determined as the specific sizes. Two larger measure change rates ($\Delta \log B$ as shown in FIG. 51B) are sued as the specific sizes. First, as shown in FIG. 59(a), the specific sizes are obtained for the whole picture, and the block is divided by use of the two larger scales ($\epsilon_1, \epsilon_2$) (e.g., as with the example of detecting the region position) The specific sized are extracted again for the re-divided block as shown in FIG. 59(b). The above-mentioned procedure is repeated, until the edge can be specified as shown in FIG. 59(c). By doing this, it is possible to specify the boundary of the region included in the block in further detail. In addition, it is also possible to divide the region in accordance with the method of detecting the size and the position of the region, as explained with reference to FIGS. 57(a) to 57(f). Further, as with the example shown in FIGS. 55(a) and 55(b), it is possible to know the complication degree of the divided region on the basis of the change rate of the measures obtained before and after the specific sizes are changed.

In the above-mentioned examples, it is possible to use another simple dividing method previously determined for the re-division of the block. Further, when there exist some previous region data, any desired specific size can be selected from a plurality of specific sizes.

Further, the fourteenth embodiment is of course provided with the effect similar to that of the thirteen embodiment.

Here, the other preferred embodiments of the third aspect of the method and apparatus for dividing the picture region will be described hereinbelow in detail with reference to the attached drawings.

Figure 60:
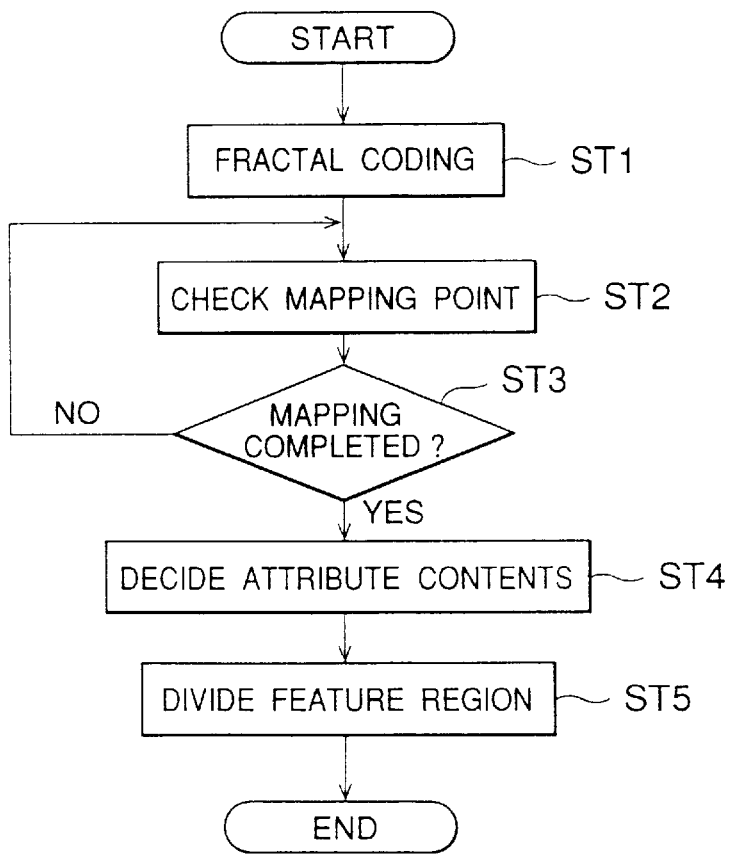
FIG. 60 is a flowchart showing a basic concept of the picture region dividing method according to the present invention.

Prior to the description of the practical embodiments, the basic concept of this third aspect of the present invention will be explained with reference to the flowchart shown in FIG. 60.

In step ST1, control divides one picture into a plurality of blocks, and mappings are obtained for the respective similar regions corresponding to the respective blocks (fractal coding step).

In step ST2, a plurality of mapping points $a_n$ (n=1, ..., N) are obtained by repeating the transform N-times in accordance with an attribute, beginning from an initial point defined as a specific point on the coordinates on the basis of a predetermined attribute (mapping point deciding step). Here, the attribute implies a pixel position or luminance value, for instance. Further, the specific point on the coordinates indicates a point within an X-Y-Z space, when the positions are determined on an X-Y plane and the luminance value is determined on the Z axis.

In step ST3, a region corresponding to a plurality of the blocks having the respective points $a_m$ (m=0, ..., N−1) transformed at a plurality of the mapping points $a_n$ (n=1, ..., N) is obtained as mapping (mapping discriminating step). This step ST3 are repeated until all the mapping points are decided (in step ST2), and the mapping decisions end.

In step ST4, the contents of the predetermined attributes at the initial point an are obtained by use of at least two mapping points of a plurality of mapping points $a_n$ (n=1, ..., N) (attribute content deciding step).

In step ST5, the region corresponding to the mapping is divided as the specific feature regions on the picture, in accordance with the predetermined attributes obtained in the attribute content deciding step (feature region dividing step).

The procedure of obtaining the mapping points by use of the mapping point deciding step and the mapping point discriminating step will be explained hereinbelow with reference to FIGS. 61(a) to 61(c).

Figure 61:
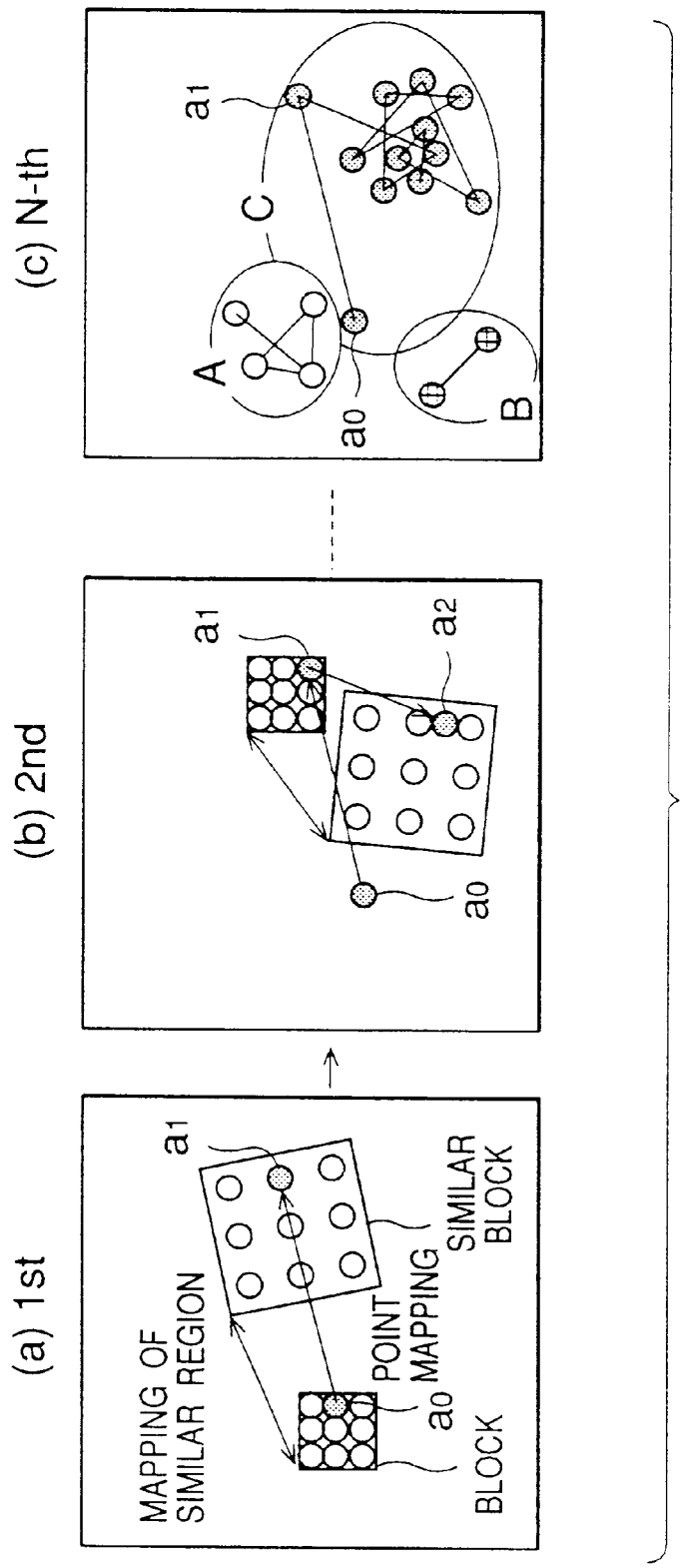
FIGS. 61(a) to 61(c) are illustrations for assistance in explaining the motion of the mapping points due to point coordinate transform by the picture region dividing method according to the present invention.
Figure 61A:
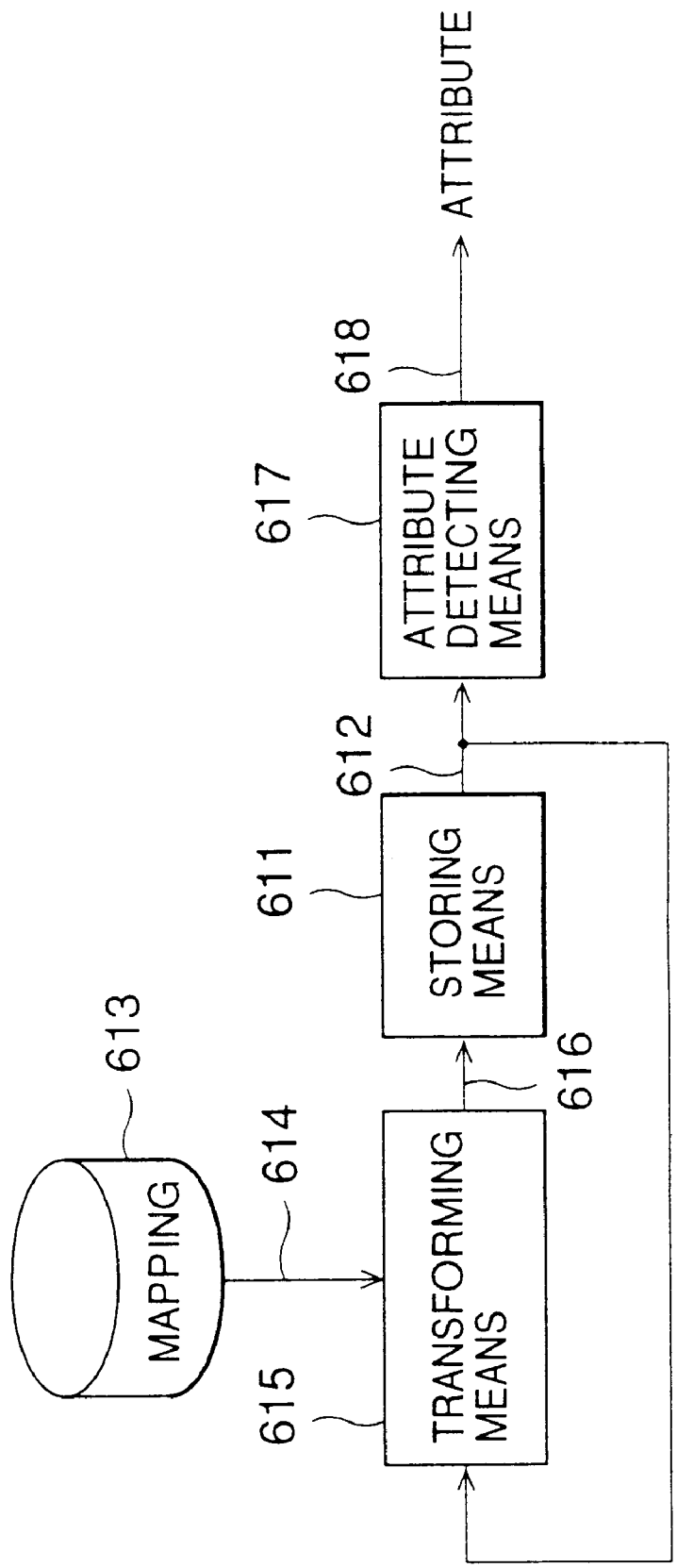

An initial point $a_0$ is included in a block in FIG. 61(a). Further, a mapping to a similar block obtained in accordance with the fractal coding step is allowed to correspond to this block. Therefore, a mapping corresponding to the pixel point included in the block can be known by this mapping, so that the initial point $a_0$ is transformed to the mapped point $a_1$ by this mapping (mapping point deciding step).

Then, in FIG. 61(b), the transformed mapping point $a_1$ is included in another block again. A mapping to a similar block is allowed to correspond to this block in the same way as with the case shown in FIG. 61(a). In the mapping discriminating step, a block having the mapping point $a_1$ is obtained on the basis of the position of the mapping point $a_1$, to discriminate the corresponding mapping. This mapping point $a_1$ is transformed again to another mapping point $a_2$ in the mapping point deciding step.

FIG. 61(c) shows the attribute content deciding step. By repeating the above-mentioned steps N-times, the mapping points $a_0$ to $a_N$ are obtained to obtain the mapping track. For instance, a track of the mapping points obtained beginning from one initial point is enclosed by a range A, B and C, respectively, and each of these regions is decided as an attribute content deciding region.

FIG. 61A is a block diagram showing an image segmenting apparatus according to the present invention. In FIG. 61A, coordinates 612 at a mapped point stored in storing means 611 and mapping parameters 614 obtained on the basis of a given mapped point 613 are inputted to transforming means 615. The coordinates 616 at the mapped point outputted from the transforming means 615 are stored in the storing means 611. The coordinates 612 at the mapped point outputted from the storing means 611 are inputted to attribute detecting means 617 to obtain a result 618 of attribute decision.

Figure 69:
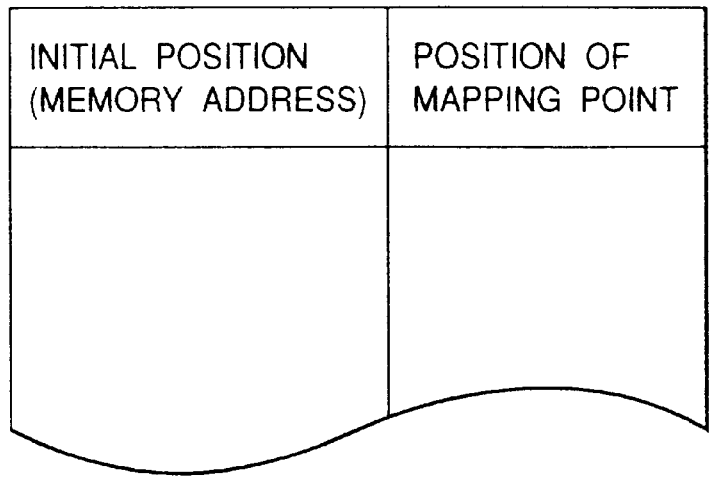
FIG. 69 is an illustration showing an example of the data stored in the memory in the picture region dividing apparatus according to the present invention.

As shown in FIG. 69, an initial position of a set point and the position of the mapped point position are both stored in the storing means 611. Therefore, the set point can be transformed by the transforming means 615 on the basis of the mapping parameters 614 to realize the affine transform defined at the set point, and then stored in the storing means 611. The above-mentioned processing is reiterated N times. By use of the N-time mapped points 612 at all the points, the attribute detecting means 617 clusters the N-time mapped points corresponding to the respective set points. Being labeled by the cluster belonging to the N-time mapped points, the obtained label 618 is outputted as an attribute.

As the initial point for deciding the attribute content deciding regions, all the pixel points in the picture can be used. Or else, some of them can be used as the representative values.

Figure 62:
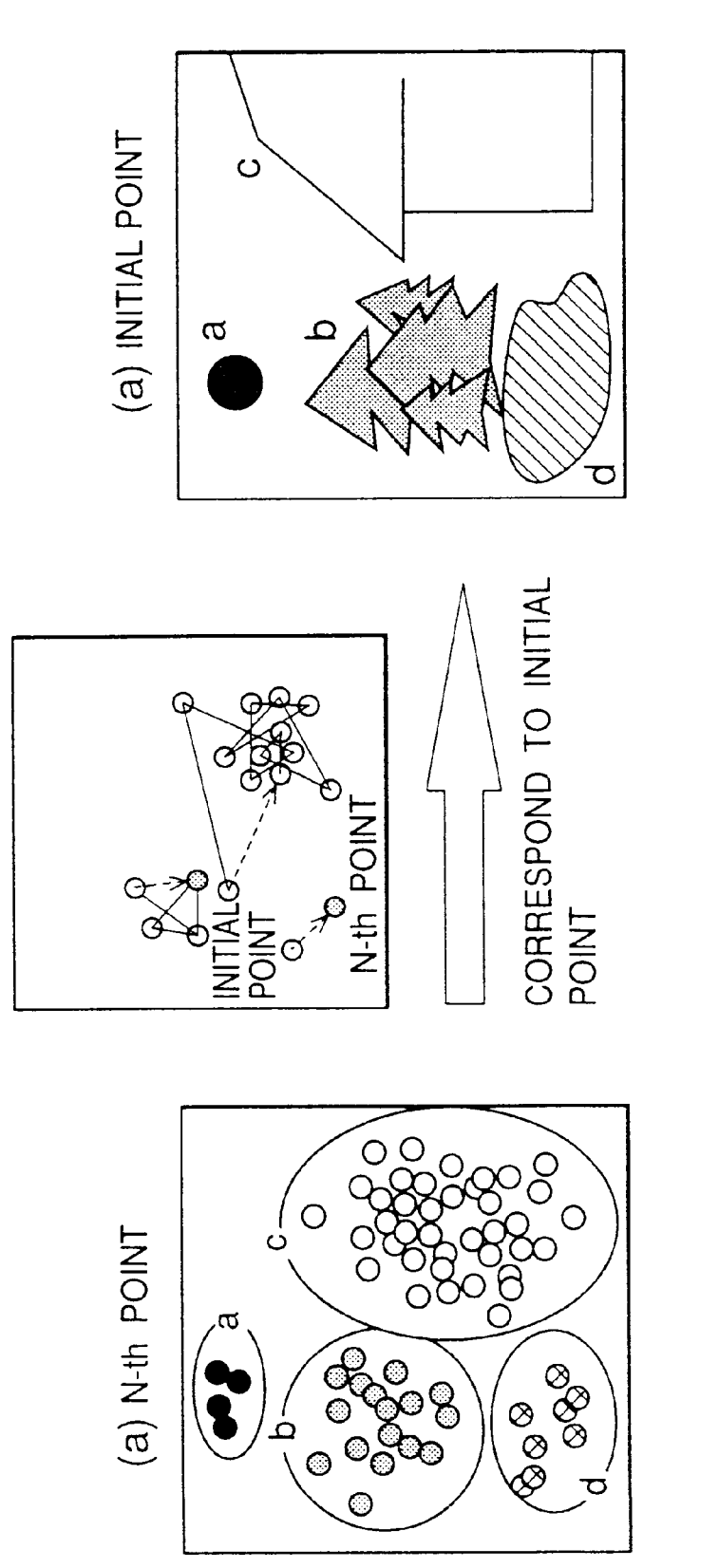
FIGS. 62(a) and 62(b) are illustrations for assistance in explaining the principle of the picture region dividing method according to the present invention.

FIG. 62(a) to 62(b) are illustrations for explaining the feature region dividing step for dividing the feature regions on the basis of the attribute content deciding regions.

In FIG. 62(b), the regions a, b and c for deciding the attribute contents are decided. For instance, these regions are decided by use of some initial point as the representative points in the attribute content deciding step as explained in FIG. 61(c). The attributes of the initial points other than the representative points can be decided on the basis of the in which regions a, b, c, and d the respective N-time mapping points are included.

For instance, color is decided for each attribute in which N-time mapping points are included, and further when this color is displayed at the initial point, as shown in FIG. 62(b), it is possible to color the feature region included in the picture. In other words, when N-time mapping points are included in the region a in FIG. 62(a), the initial point lies in the region a shown in FIG. 62(b); and when N-time mapping points are included in the region b in FIG. 62(b), the initial point lies in the region b shown in FIG. 62(b); and the same can be applied to the regions c and d.

Therefore, since the attribute of the N-time mapping points can be decided for each feature region in the picture, it is possible to divide the feature regions by deciding the attribute of the N-time mapping points.

Fifteenth Embodiment

Figure 63:
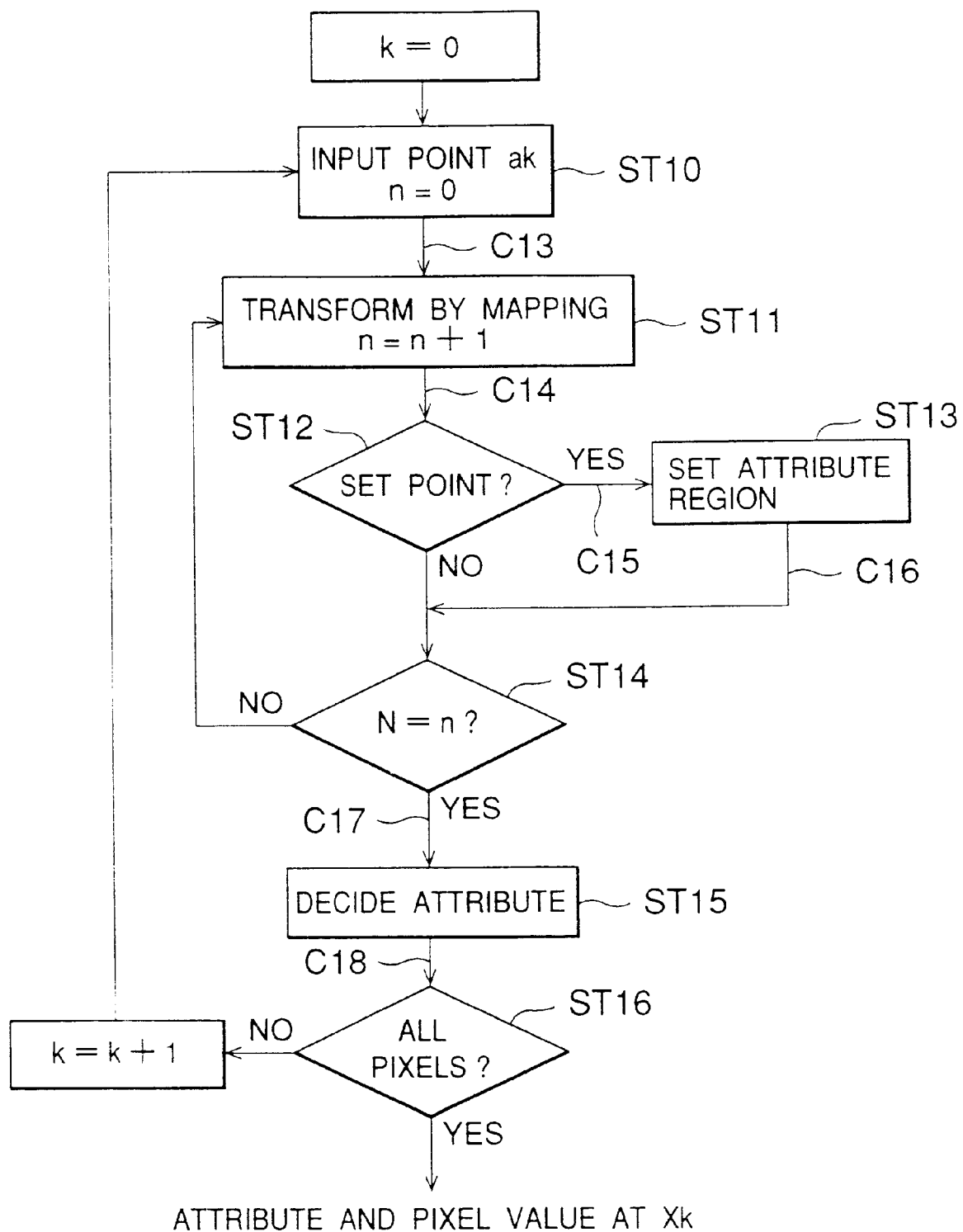
FIG. 63 is a flowchart showing an algorithm of a fifteen embodiment of the picture region dividing method according to the present invention.

FIG. 63 is a flowchart for assistance in explaining the fifteenth embodiment, in which the procedure of the picture region dividing method is shown.

Control first inputs all the pixel point coordinates in sequence (in step ST10). Then, control transforms the inputted pixel coordinates C13 on the basis of the predetermined mapping data (in step ST11), and further discriminates whether the transformed coordinates C14 are used for the clustering point (in step ST12). The cluster point is referred to as a set point. Further, the attribute region decided by the set point is referred to as an attribute region. The point obtained after the points have been transformed n times (n=1, 2, ..., N) is referred to as n-time mapped point. In step S12, if at the set point, control inputs the coordinates C15 at the set point (in step ST13), to decide the coordinates C16 of the attribute region by use of at least two of the n-time mapped points (n=1, ..., N) Control discriminates whether the N-time (the number of settings) transforms have been executed (in step ST14), and outputs the coordinates C17 at the mapped point. Control decides the attribute by labeling (classifying) the attribute regions, to which the N-time mapped points of the initial points belong, on the basis of the coordinates C17 of the mapped points and the coordinates C18 of the attribute region obtained in step ST13, and outputs the coordinates C18 of the decided result (in step ST15). Finally, control discriminates whether the attributes have been obtained for all the pixels, completing the procedure (in step ST16).

Figure 63A:
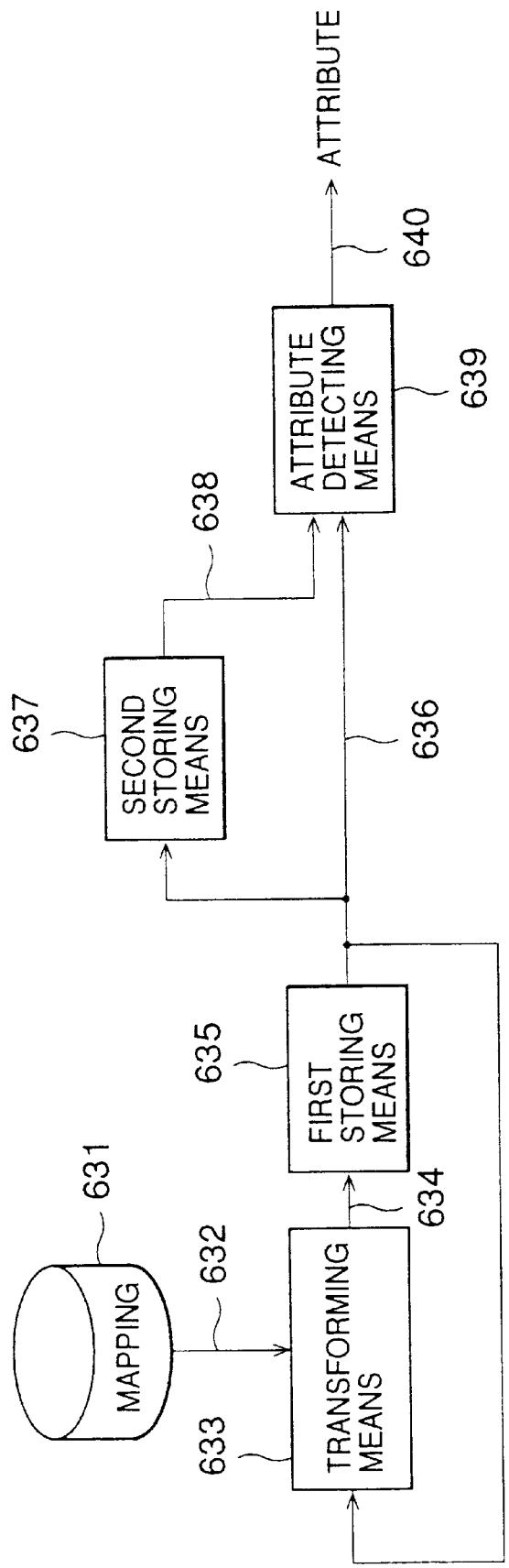
FIG. 63A is a block diagram showing an image segmentation apparatus according to the present invention.

FIG. 63A is a block diagram showing an image segmenting apparatus according to the present invention. In FIG. 63A, coordinates 636 at a mapped point stored in storing means 635 and mapping parameters 632 obtained on the basis of a given mapped point 631 are inputted to transforming means 633. The coordinates 634 at the mapped point outputted from the transforming means 633 are stored in the storing means 635. The coordinates 636 at the mapped point outputted from the storing means 635 are inputted to second attribute storing means 637. The coordinates 636 at the mapped point outputted by first storing means 635 and the coordinates 638 at the mapped point outputted by the second storing means 637 are inputted to attribute detecting means 639, to obtain a result 640 of attribute decision.

As shown in FIG. 69, an initial position of a set point and the position of the mapped point are both stored in the first storing means 635. Therefore, the set point can be transformed by the transforming means 633 on the basis of the mapping parameters 632 to realize the affine transform defined at the set point, and then stored in the first and second storing means 635 and 637. The above-mentioned processing is reiterated N times. The positions of n-time (n=0, . . . , N−1) mapped points of the different reiterative number obtained midway during the N-time reiterative mappings of the set point are stored in the second storing means 637. By use of the N-time mapped points 636 at all the points and further the positions 638 of the n-time (n=0, . . . , N−1) mapped points, the attribute detecting means 635 clusters the mapped points corresponding to the respective set points. Being labeled by the cluster belonging to the mapped points, the obtained label 640 is outputted as an attribute.

To decide the attribute region, it is not necessarily check the all the pixel positions as the set points. The set points can be replaced with some representative points appropriately selected from the pixel points on the plane. Further, when the rough position of the desired region can be known, only a single initial point can be set within the desired region.

Figure 64:
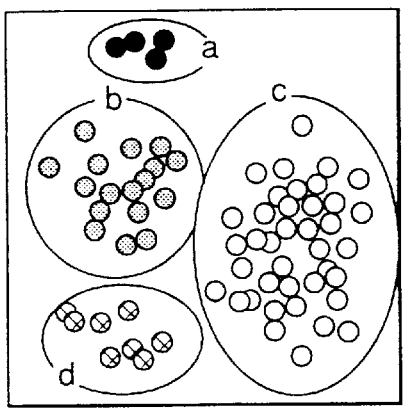
FIGS. 64(a) to 64(d) are illustrations showing examples of clustering in the fifteenth embodiment of the picture region dividing method according to the present invention.
Figure 64:
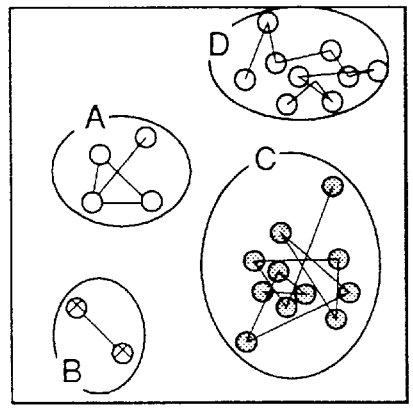
Figure 64:
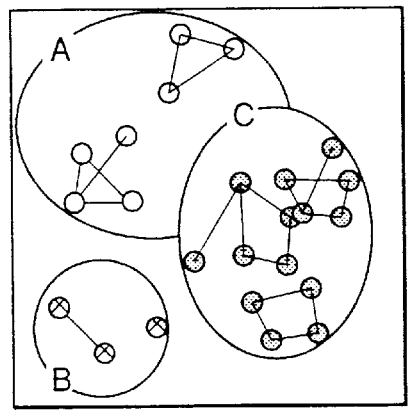
Figure 64:
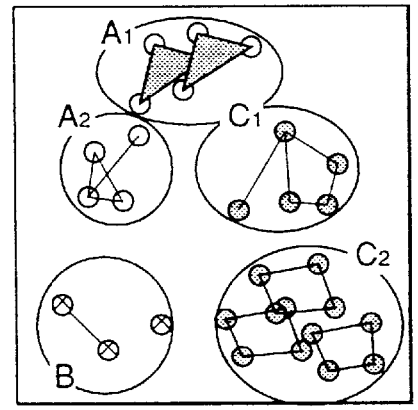

Further, it is possible to cluster by deciding the attribute regions, without previously setting the set points. For instance, all the pixel coordinates on the picture are inputted in sequence. As shown in FIG. 64(*a*), when the track of the N-time mapped points belongs to another attribute region, the attribute at that point $a_k$ can be decided by its attribute region. After the N-time transforms, if the mapped points do not belongs to any other attribute regions, the point is a new set point of the attribute region. Therefore, the set point of the attribute region is a point at which the first transform is executed, without belonging to the other attribute regions.

Sixteen Embodiment

In this embodiment, the attribute region is decided by using some representative set points.

The transform is executed to represent a picture by three dimensions, in which the pixel plane is represented by (x, y) and the luminance value is represented by z. The previously predetermined mappings are allowed to correspond to each block obtained by dividing a picture into a plurality of blocks. The mappings are to transform the x and y directions of the set point and the z direction of the luminance value. In the mapping which transforms a point, the mapping corresponding to the block (to which the transformed point belongs) is used. For instance, when transformed to a mapping point (X, Y, Z) by mapping defined by a set point (x, y, z), the mapping transform can be defined by the following affine transform as $$\begin{pmatrix} x \\ y \\ z \end{pmatrix} = \begin{pmatrix} a & b & 0 \\ c & d & 0 \\ 0 & 0 & e \end{pmatrix} \begin{pmatrix} x \\ y \\ z \end{pmatrix} + \begin{pmatrix} f \\ g \\ h \end{pmatrix} \qquad (3)$$

In this affine transform, the mapping is executed in such a way that the reduction and rotation in both the x and y directions can be made according to coefficients a, b, c and d; the reduction in the z direction can be made according to e; and the shift in the x and y directions are made according to f, g and h.

The transform at the set points by mapping is executed by the transform in the x and y directions or by only in the z direction. Or else, the transform is executed in all the X, Y, Z directions. The method of classification is selected according to what are transformed at the set points.

The x and y direction transform will be described in detail hereinbelow on the basis of an example, when the affix transform is used as $$\begin{pmatrix} x \\ y \end{pmatrix} = \begin{pmatrix} a & b \\ c & d \end{pmatrix} \begin{pmatrix} x \\ y \end{pmatrix} + \begin{pmatrix} f \\ g \end{pmatrix} \qquad (4)$$

First, as shown in FIG. 64(*b*), the method of using a range in which the mapping points move will be explained. For instance, the positions of at least n-time mapping points obtained midway during the N-time mapping points can be clustered by enclosing them by a rectangle. Without being limited only to a rectangle, the positions can be enclosed by any shape. In this method, it is possible to classify the mapping positions more accurately according to the given mapping points.

Figure 65:
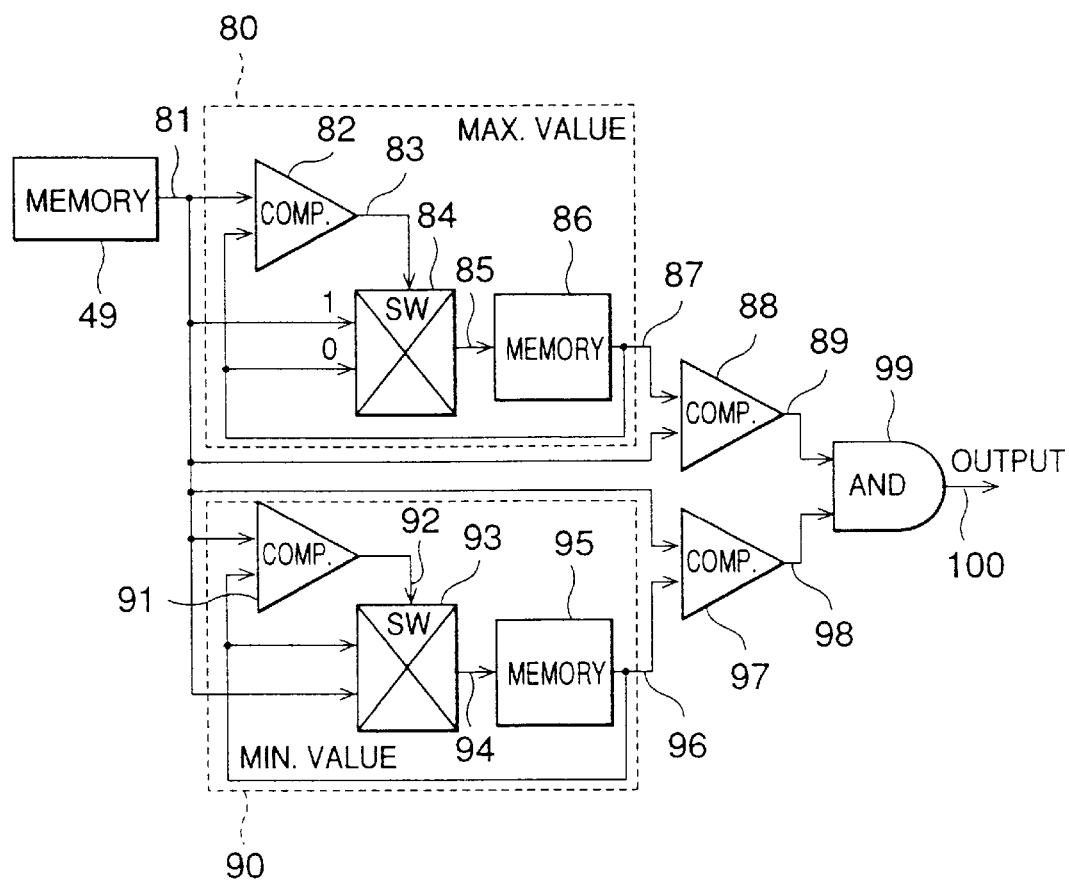
FIG. 65 is a block diagram showing an example of the fifteenth embodiment of the picture region dividing method according to the present invention.

FIG. 65 is an example of a circuit for obtaining the range in which the mapping points move in the x direction and for deciding whether the other points belong to the attribute represented by the mapping. The range in which the mapping points move in the y direction can be obtained in the similar circuit. Further, it is possible to set a rectangular region by ANDing both the ranges in the x and y directions.

In FIG. 65, a comparator 82 outputs "1" when the upper side input thereto is larger than the lower side input thereto, and "0" in the other case. A portion 80 enclosed by dashed lines is a circuit for obtaining a maximum value; and a portion 90 enclosed by dashed lines is a circuit for obtaining a minimum value. A memory 49 stores the coordinates of the N-time mapping points. Here, when the maximum value at the current x point is denoted by $$x_{k-1}^{max}$$

the comparator 82 compares this maximum value 87 with the coordinate $x_k$ of a newly inputted point x. If the coordinate $x_k$ of newly input point x is larger, the comparator 82 outputs "1" (as 83) In the case other than that, the comparator outputs "0" (as 83). A switch 84 switches the output 85 to the upper side input point $x_k$ if the output 83 is at "1" and to $$x_{k-1}^{max}$$

in the case other than that. The output result 85 is stored in a memory 86 as $$x_k^{max}$$

The above-mentioned operation is repeated by N-times. Finally, a memory 86 stores the maximum x-direction value of the attribute region as $x_N^{max}$ A comparator 88 compares the coordinate of a point $x_{now}$ whose attribute is required to be checked with the maximum value 87 of the x-coordinate in sequence. When the maximum value 87 is larger, the comparator 88 outputs "1". In the same way, the minimum value 96 of the x coordinate value can be obtained. When the coordinate of the point $x_{now}$ is larger than the output 96 of the memory 95, a comparator 97 outputs "1". Finally, the two outputs 89 and 98 are inputted to an AND circuit 99, and the AND circuit 99 outputs an output 100 when $x_{now}$ is included in the following range between:

$x_N^{max}$ and $x_N^{min}$

The second method is to use the number of periods. A track of the motion of the N-unit mapping points obtained from the first mapping to the N-time mapping with respect to one set point is referred to as a track of the mapping points for the set point. The track of the mapping points for the set point describes sometimes a periodic track, after a certain number k of mappings, where (k∈{1, 2, . . . , N})

This implies that the mappings are clustered by use of a number mapping points describing a periodic track (orbit). Therefore, the standard of the clustering for attribute decision can be determined as the number of periods of the periodic track described for each set point. In this case, as shown in FIG. 64(c), the mapping points can be clustered. In this method, it is possible to classify the regions by taking into account a regular pattern of the texture.

Third method is to use the shape of the periodical track, as shown in FIG. 64(d). In this method, since the mapping points are clustered by use of the shape of the periodic track in addition to the periodic number, it is possible to classify the regions under consideration of the shape of the region.

Figure 66:
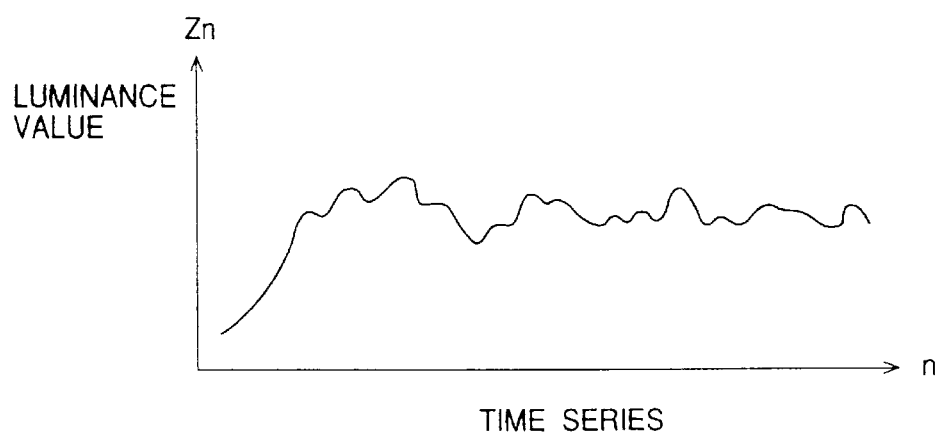
FIG. 66 is a graphical representation showing the change of the luminance value in the picture region dividing method according to the present invention.

When the pixel value at the set point is transformed, the transformed results in the z direction are observed as the time series data. Further, as shown in FIG. 66, it is possible to classify the points on the basis of the dispersion of the observed waveform and the fractal dimensions. Further, the above-mentioned three methods can be adopted for the change in the luminance value (in the z direction), instead of the positions (x and y directions) of the N-time mapping points. When the position and the luminance value are both transformed, the above-mentioned three methods can be adopted for both. Further, after the clustering has been made on the basis of the results of transform in both the x and y directions, the texture can be analogized from the time-series waveform in the z direction, as shown in FIG. 66. Further, it is possible to analogize the texture and the luminance value of the region corresponding to the cluster on the basis of the n-time mapping point $z_n$ in the z-direction of the mapping points belonging to the cluster.

In the above-mentioned embodiments, when the cluster (attribute region) to which the pixels $a_k$ belong is decided, N-time mapping points of the pixels $a_k$ are used. However, it is also possible to decide the attribute of the pixel $a_k$ when n-time mapping points (midway obtaining the N-time mapping points) are transformed to a certain attribute region. In this case, since it is not necessarily execute the N-time transforms, the quantity of calculations can be reduced.

When the regions are clustered by use of some representative points, without selecting all the pixels at the set points, there exist some pixels which have N-time mapping points belonging to none of the attribute regions of the set points. In this case, the non-decided pixel can be decided as belonging to the cluster (the attribute region) whose distance is the nearest from the coordinate of the non-decided pixel. Further, the non-decided pixel can be decided as belonging to the cluster (the attribute region) whose pixel is the nearest from the initial coordinate of the non-decided pixel.

Figure 67:
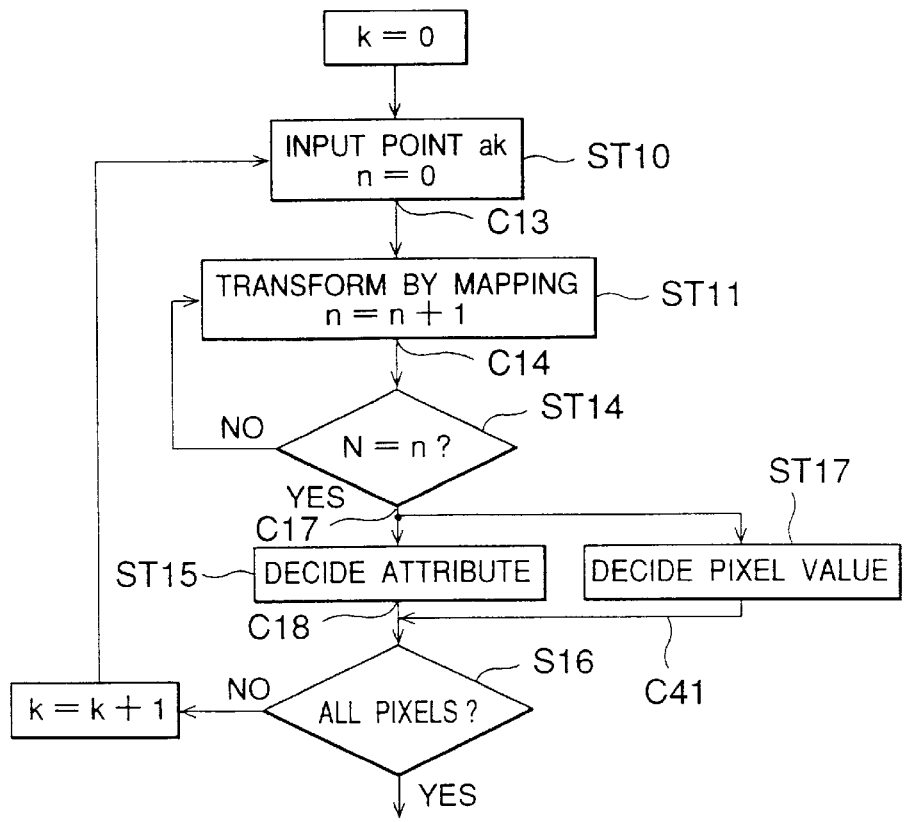
FIG. 67 is a flowchart showing an algorithm for the picture region dividing method according to the present invention.

FIG. 67 is a flowchart showing the method of dividing the pixel region according to the present invention.

The coordinates of all the pixels are inputted in sequence (in step ST10). Control transforms the coordinates C13 of the inputted pixels on the basis of the given mapping data (in step ST11). Further, control discriminates whether a predetermined number of settings are transformed (in step ST14). If yes, control outputs the coordinates C17 of the mapping points. Control decides the attribute of the pixel point on the basis of the coordinate C17 of the mapping point, and outputs the decided result C18 (in step ST15). Further, control decides the pixel value on the basis of the coordinates C17 of the mapping point, and outputs the decided result C18 (in step ST17). Finally, control discriminates whether the attributes and the pixel values are obtained for all the pixels (in step ST16), ending the procedure.

Figure 68:
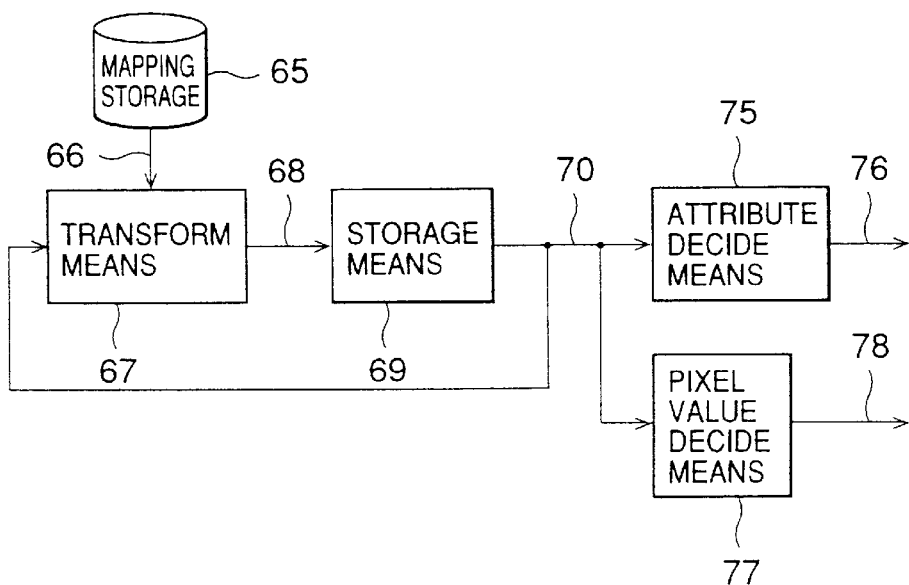
FIG. 68 is a block diagram showing a construction of the picture region dividing apparatus according to the present invention.

FIG. 68 is a block diagram showing an apparatus for dividing the pixel region according to the present invention. The point coordinates 70 stored in storage means 69 and the mapping parameters 66 stored in other storage means 65 are inputted to transforming means 67. The coordinates 68 of the mapping points are stored in storage means 69. Further, the point coordinates 70 are inputted to attribute deciding means 75 to obtain the attribute decision result 76. Further, the point coordinates 70 are also inputted to pixel value deciding means 77 to obtain the pixel value 78.

The storage means 69 stores the initial positions of the set points and the positions of the mapping points, as shown in FIG. 69. The set point is transformed by the transform means 67 on the basis of the mapping data 65 for realizing the similarity transform defined at the set point. The transformed result is stored in the storage means 69. The above-mentioned processing is repeated by predetermined N-times. By use of the N-time mapping points 70 for all the set points, the attribute deciding means 75 clusters the N-time mapping points for each set point. The pixel points are labeled by the cluster (attribute region) belonging to the N-time mapping points. The obtained labels 78 are outputted. Further, the transforming means 67 repeats the transforms by a predetermined number N of times. Further, the pixel value deciding means 77 obtains the transformed luminance values (not dispersed) by use of the luminance transform of the N-time mapping points 70 at the initial points, and outputs the obtained values as the pixel values 78. As a result, by use of the same transform results 70, the region division and the reproduced picture can be both obtained. That is, since the region division can be made while reproducing the picture, it is possible to reduce the amount of calculations required for region division.

Here, the set points stored in the storage means 69 are initial points arranged at all the pixel positions on the picture plane. However, as already explained in the description of the fifteenth embodiment, the setting points can be selected in the other ways. Further, the transform means 67 can be set in the same way as with the case of the fifteenth embodiment.

In the clustering of the attribute deciding step ST15 shown in FIG. 67, the near N-time mapping points can be classified into one cluster, on the basis of the positions of the N-time mapping points at all the set points, as shown in FIG. 64(a). The clustering method can be automatized by use of the well-known median method. The other clustering methods and the already-explained three methods as explained in the fifteenth embodiment with reference to FIGS. 64(b), 64(c) and 64(d) can be used. In any method, it is necessary to store at least two mapping points as the n-time mapping points, to decide the attribute region.

The criterion and the method of clustering can be selected, according to the characteristics of the video signals and the use of the region division. Further, it is also possible to select any desired regions adaptively.

Figure 70:
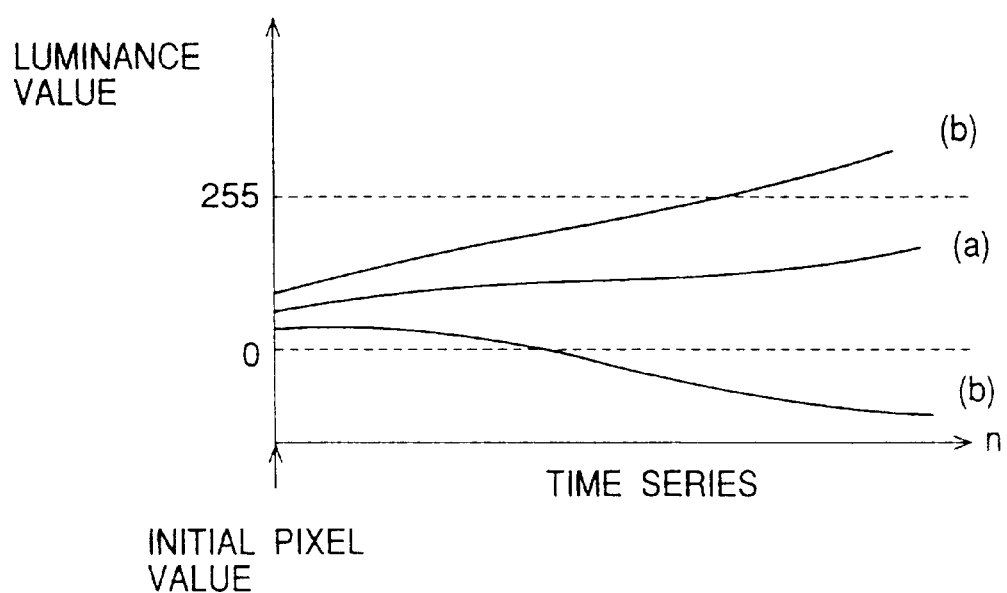
FIG. 70 is a graphical representation showing the principle of deciding the luminance value in the picture region dividing method according to the present invention.

The pixel value at each pixel can be decided by transforming the pixel value at the mapping point. Any initial pixel value is given and the pixel value is transformed on the basis of the mapping given according to the pixel position. The pixel value obtained after n-time transforms is referred to as an n-time mapping pixel value. The n-time mapping pixel value can be obtained by transforming the (n−1) mapping pixel value in the mapping as defined in the n-time mapping points. When first given initial pixel value is equal to the actual pixel value as shown by (a) in FIG. 70, the n-time mapping pixel value will not diverse ever after having mapped many times. For instance, when the actual pixel values lie between 0 and 255 values, the n-time mapping pixel values also ranges from 0 to 255. In contrast with this, when first given initial pixel value is different from the actual pixel value, the n-time mapping pixel value diverges after having mapped many times. For instance, when the actual pixel values lie between 0 and 255 values, the n-time mapping pixel values lie out of the range from 0 to 255, as shown by (b) in FIG. 70. Therefore, in order to obtain the correct pixel values, it is necessary to obtain an initial pixel value in such a way that the n-time mapping pixel value will not diverse (because n-time mapping pixel values can be transformed only within the actual range of the pixel values). The transform of the pixel value is given according to the mapping point position. Therefore, it is possible to decide the pixel value by utilizing the transform, as it is, used for the attribute deciding means. Further, in case one pixel value cannot be decided after the given N-time mappings and therefore a plurality of candidates exist as the reproduced pixel values, an average value or any one of them is decided. Further, the transforms can be repeated until only one pixel value can be decided. Since the repetitive transforms for deciding the pixel value can be used in common for the transform for deciding the attribute, it is possible to reduce the quantity of calculations, as compared with the prior art case where the two transforms are calculated separately.

Further, it is unnecessary to always execute both the picture reproduction and the region division. According to the necessity, any one of both can be executed. For instance, when an original picture has been already obtained, only the region division is sufficient. Therefore, when there exists any one of the apparatus according to the present invention, it is possible to use the apparatus as the picture reproducing apparatus and as the picture region dividing apparatus, separately.

Figure 71:
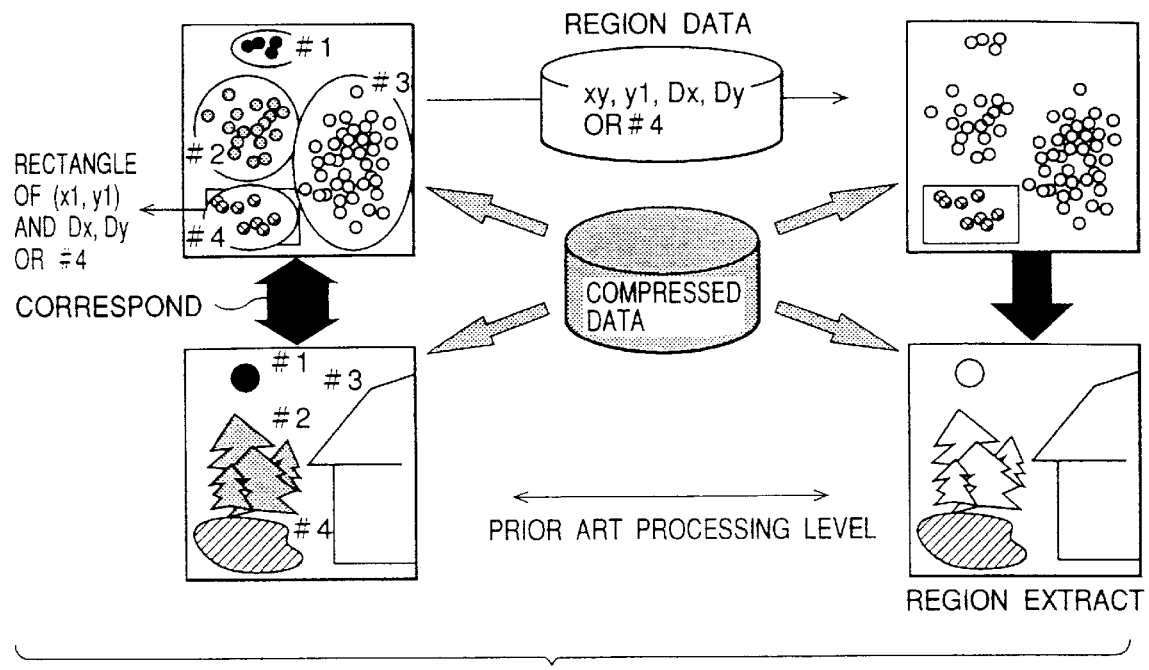
FIG. 71 is an illustrations showing a picture communications system using the picture region dividing method according to the present invention.

FIG. 71 shows an example of a transmitter-receiver for simply informing the receiver side of a region in a picture. Form the original picture on the transmission side, the relationship between the region to be shown and the cluster is checked. As a result, the region to be shown and the shape of the corresponding cluster are represented by a simple graphic form, and the graphic form and the position are transmitted. Or else, when the labeling method of the clusters is previously determined, only the labeling can be transmitted. In this labeling method, for instance, when the pixels are scanned from the upper left side, it is possible to use the sequence of appearances of the clusters to which the pixel values belong.

In the example shown in FIG. 71, a graphic form and its position are transmitted on the basis of only the upper right side coordinates of a rectangle which encloses the cluster and the vertical and horizontal lengths of the rectangle, or a cluster label (e.g., #4) is transmitted. In this example, when the enclosed graphic form is limited to a square, the data quantity can be further reduced. Further, when enclosed by a circle, it is sufficient when only a central coordinate and a radius thereof are transmitted. On the reception side, it is possible to know what the region is, on the basis of the position and the size of the obtained graphic form and the arrangement pattern of the N-time mapping points.

Figure 72:
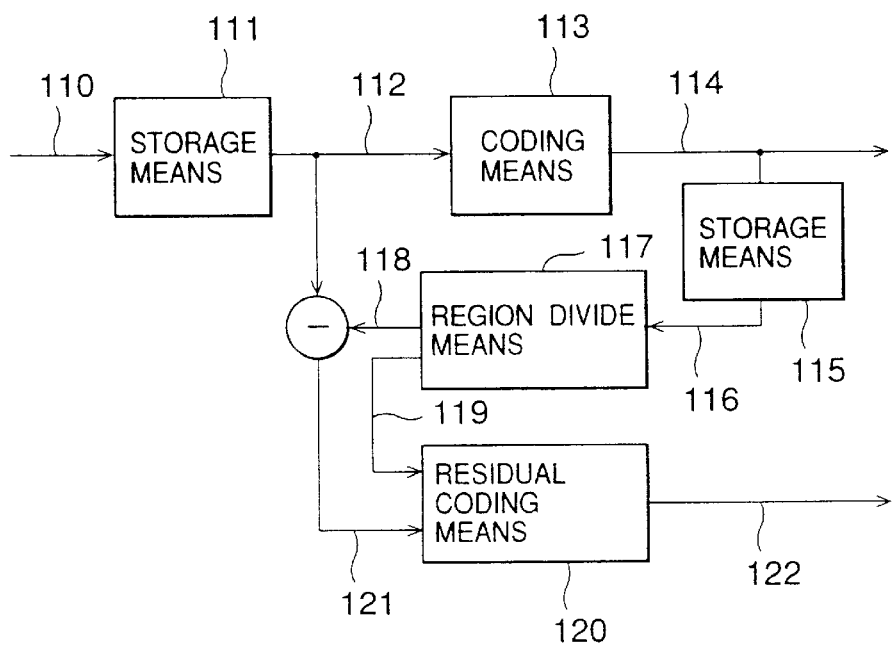
FIG. 72 is a block diagram showing the construction of the picture coder apparatus using the picture region dividing method according to the present invention.
Figure 73:
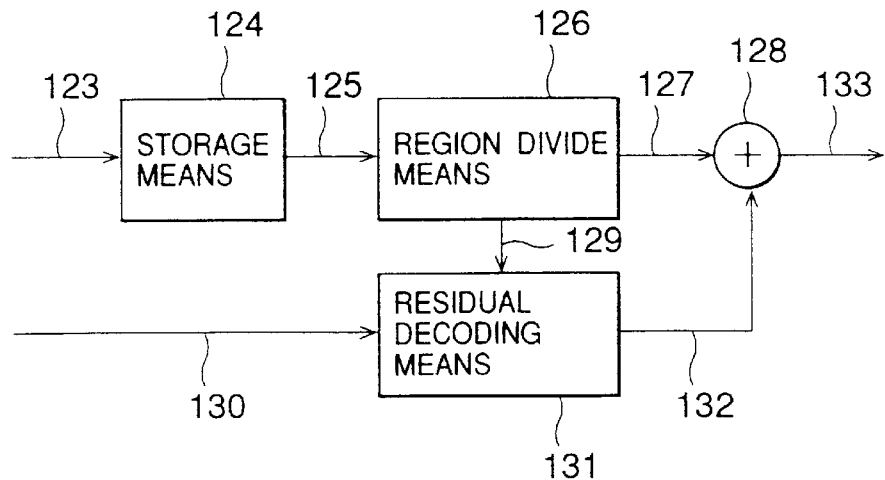
FIG. 73 is a block diagram showing the construction of a picture reproducing apparatus using the picture region dividing method according to the present invention.

FIG. 72 shows an example for coding a picture. Inputted video signals 110 are stored in storage means 111. The video signals 112 outputted by the storage means 111 are inputted to coding means 113 for fractal coding. The coded data 114 are outputted from the coding means 113. Further, coded data 114 are stored in storage means 115, and then inputted to region dividing means (the gist of the present invention) 117 as the given mapping data 116. The region dividing means 117 reproduces the one pixel value and outputs it as the reproduced picture value 118. Further, the region dividing means 117 outputs the region division result 119 of one pixel at the same time to difference coding means 120. The reproduced pixel value 118 outputted by the region dividing means 117 and the difference value 121 outputted by the storing means 111 are both inputted to difference coding means 120. The differential signal 121 is coded by the difference coding means 120 on the basis of the region division result 119, and outputs it as the coded data 122. The region division result 110 are used as the control signals for coding the difference. For instance, since there exists such a nature that the difference signal becomes large in the region of a complicated texture but small in a flat region, when the texture region and the flat region are classified by utilization of the nature and further the different coding methods are adopted respectively, the picture quality of the reproduced picture can be improved. Further, in this example, since the processing of all the means (except the fractal coding means) can be executed in unit of pixel, no memory is necessary. However, when the difference coding means is required to be executed in unit of several pixels, a corresponding memory is necessary. As described above, when the method according to the present invention is adopted, it is possible to realize the method and apparatus for coding pictures adaptively.

Figure 74:
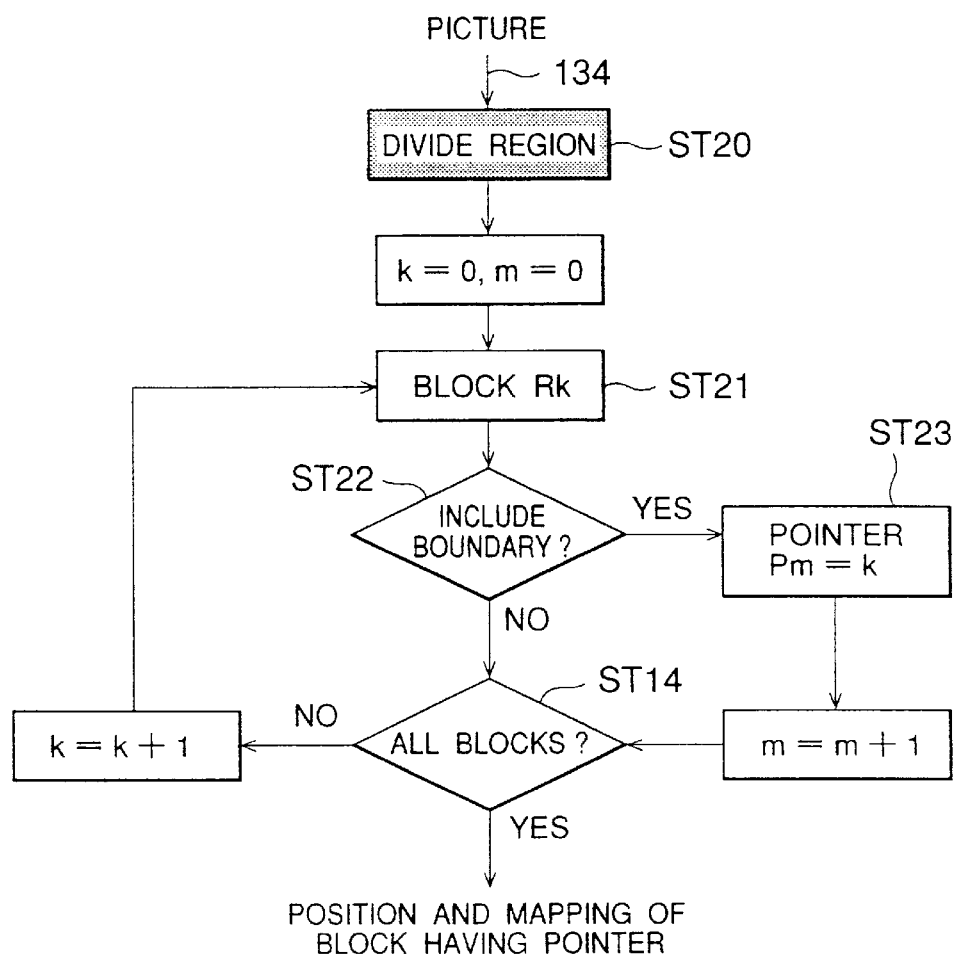
FIG. 74 is a flowchart showing an algorithm of the picture region boundary representing method according to the present invention.

FIG. 74 is a block diagram showing a decoder for decoding the data coded by the coder as shown in FIG. 72. The coded data 123 outputted from the coding means are inputted to storage means 124. The coded data 125 outputted from the storage means 124 are inputted to region dividing means (the gist of the present invention) as the given mapping data. The pixel value 127 reproduced by the region dividing means 126 are outputted to an adder 128. Further, the region division result 129 of the region dividing means 126 and the difference codes 130 coded by the difference coding means (not shown) are inputted to difference decoding means 131 to reproduce the difference value 132. The reproduced difference value 132 and the fractal-reproduced pixel value 127 are given to an adder 128, to obtain the final reproduced pixel value 133.

The embodiments of the present invention will be described hereinbelow with reference to the attached drawings.

FIG. 74 is a flowchart showing the procedure of the method of representing the region boundary of the picture according to the present invention. In step ST20, control inputs picture data 134 and then divides them into regions. After that, control inputs all the blocks in sequence. In step ST21, control takes a block $R_k$. In step ST22, control discriminates whether a desired region boundary exists in the block $R_k$. If exists, in-step ST23, control gives the block number k to a pointer $P_m$, and proceeds to step ST24. If the region boundary dose not exist or after the pointer has been attached to the block having the region boundary, control discriminates whether the boundary discrimination has been completed for all the blocks in step ST24. If not yet completed, control repeats the same procedure beginning from the stp ST21. If completed, control outputs the pointed area position and the mapping data, ending the procedure.

Figure 75:
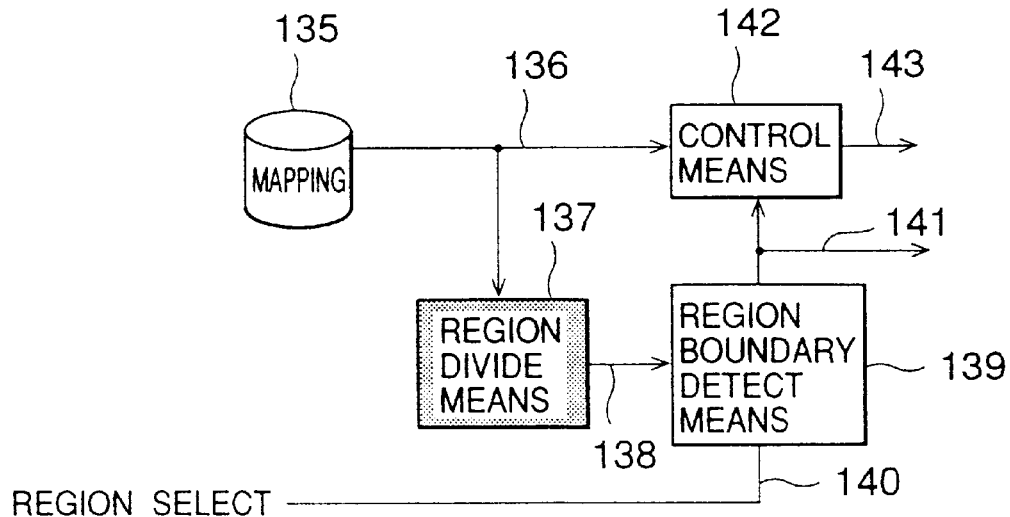
FIG. 75 is a block diagram showing the construction of the picture region boundary representing method according to the present invention.

FIG. 75 is a block diagram showing a picture region boundary representing apparatus according to the present invention. The mapping parameter 136 are inputted from a given mapping memory 135 to region dividing means 137 for region division processing. The region division result 138 are inputted to region boundary detecting means 139, to detect a block having the region boundary corresponding to the required region 140. The position 141 of the detected area including the region boundary is outputted from the region boundary detecting means 139. Further, the position data 141 and the mapping parameter data 136 are inputted to control means 142, to output the mapping parameter data 143 allowed to correspond to the block having the desired region boundary.

Figure 76:
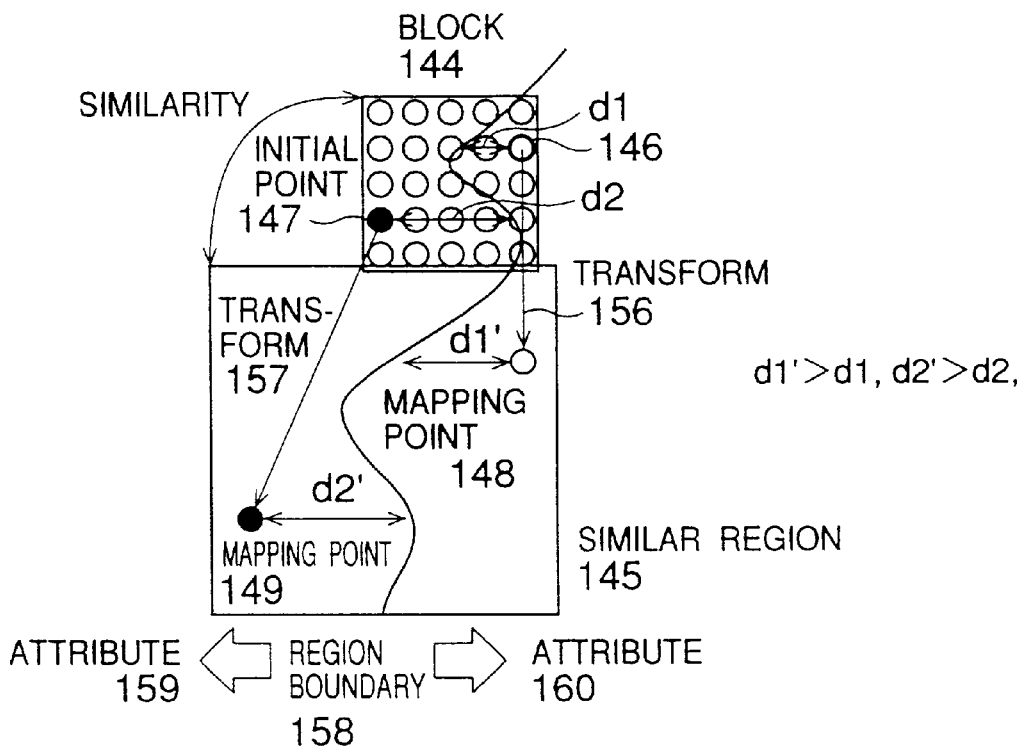
FIG. 76 is an illustration showing mapping of points in a block having the region boundary in the picture region boundary representing method and apparatus according to the present invention.

Here, the movement of the coordinate point in the block having a region boundary will be explained. In FIG. 76, the mapping between the block 144 and the similar region 145 is so selected that the attributes 159 and 160 at points in the block 144 match each other. When two initial points 146 and 147 in the block 144 are transformed to the mapping points 148 and 149 by mapping processing 156 and 157, the distances d1' and d2' between the mapping points 148 and 149 (after transformed) and the boundary 158 are larger than the distances d1 and d2 between the two initial points 146 and 147 (before transformed) and the region boundary 158. In other words, the mapping points move gradually away from the boundary by transforms. This phenomenon continues, until the coordinates of the mapping point moves to the block which does not have the region boundary 158. Therefore, when the transforms are repeated, the mapping points of all the initial points in the block 144 having the region boundary 158 are transformed to the block having no region boundary sooner or later.

Figure 77:
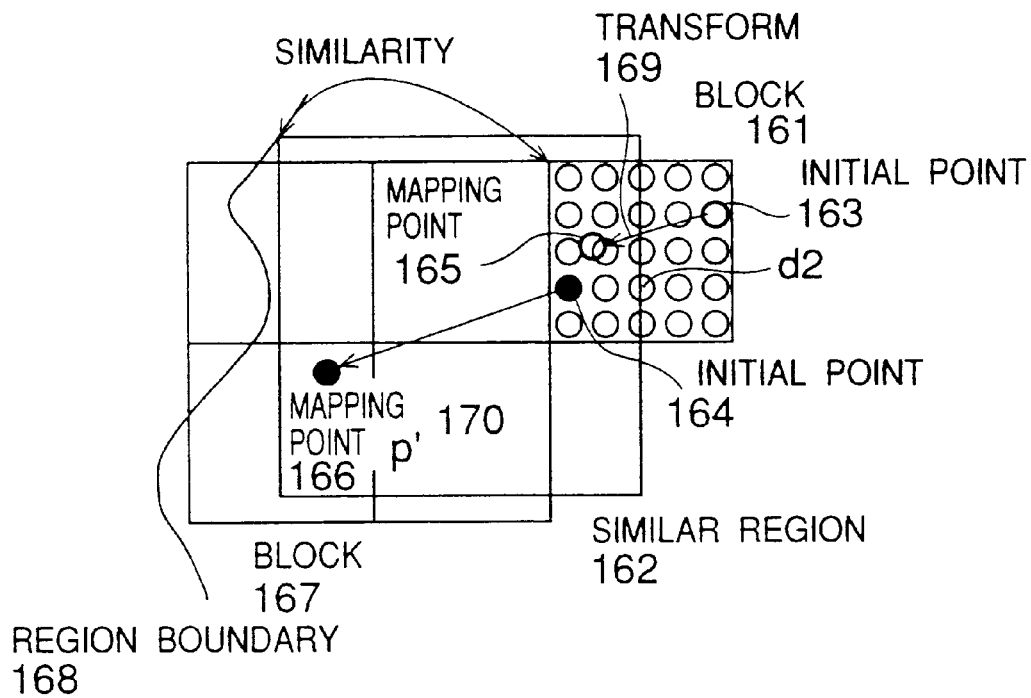
FIG. 77 is an illustration for assistance in explaining the point mapping in a block having no region boundary in the picture region boundary representing method and apparatus according to the present invention.

Further, the movement of the coordinates of a point in a block having no region boundary will be explained with reference to FIG. 77. In this case, the relationship between the block 161 and the similar region 162 is so selected that the boundary 168 is not included. Therefore, the points 163 and 164 in the block 161 are transformed to the mapping points 165 and 166 by the mapping processing 169 and 170. Here, although the coordinates of the mapping point 164 are transformed into the point p' 166 in the block 167 having the region boundary 168, as explained in FIG. 76, the mapping point is transformed in a block having no region boundary sooner or later.

As described above, there occurs a phenomenon such that a point in one region moves around in a limited range in the region. The attribute of an initial point can be decided by clustering this range, and further the range can be divided for each region. Further, the region boundary can be found by dividing the region.

Figure 78:
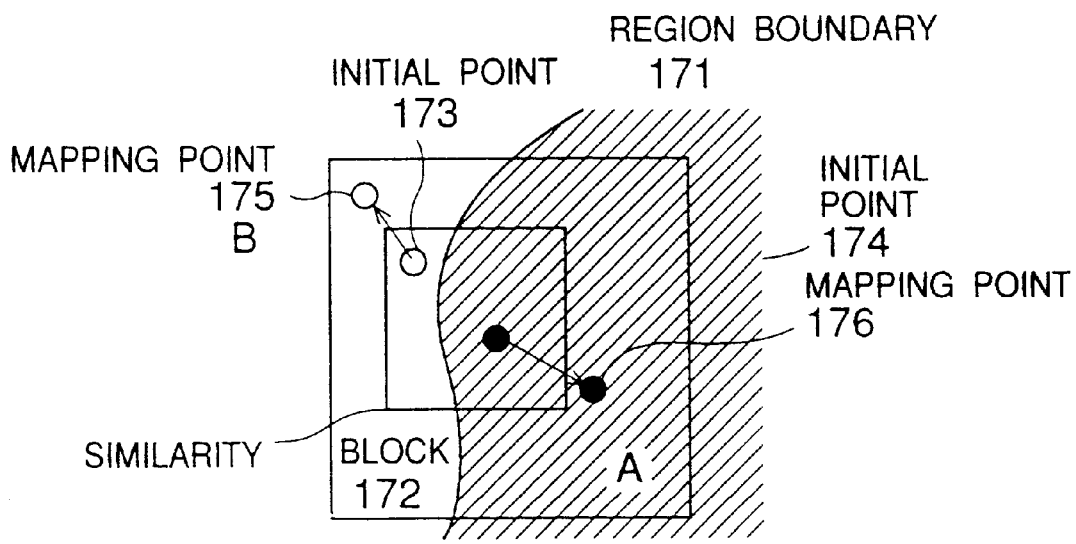
FIG. 78 is an illustration for assistance in explaining the point mapping in a block having a region boundary in the picture region boundary representing method and apparatus according to the present invention.

To represent the region boundary divided as described above, the mapping allowed to correspond to the block having the region boundary is used. As already explained, in FIG. 78, the two mapping points 175 and 176 of the two initial points 173 and 174 in the block 172 having the region boundary 171 are transformed out of the block having the region boundary sooner or later. Therefore, when the inside of the region boundary 172 is determined as an attribute A and the outside of the region boundary 172 is determined as an attribute B, as far as only the initial point in the block having the region boundary 171 is decided as A or B, it is possible to obtain a detailed region boundary 171.

In the following description, in correspondence to the fractal coding, the area is referred to as the block, and the similar block allowed to correspond to each block is referred to as each similar block for unification. In this case, the blocks are never overlapped with each other (the intersection is an empty set), and further a picture is covered with all the blocks (the coupled blocks form an overall picture plane). Although not specified, the shape is determined as a square in the following description, for instance.

Since the transform in the method of detecting the parameter of the region boundary can be expressed by the same formula (3) as already explained, the formula (4) (affine transform) will be explained in detail on the basis of an embodiment. Further, in the following description, mapping is referred to as region boundary parameter.

By use of the region boundary parameter, the region is divided, and a desired region is selected as a result of the region division. Further, a block (referred to as a boundary block, hereinafter) having a boundary portion is detected in the selected region. The position of the boundary block and the parameter (referred to as region boundary parameter, hereinafter) of the boundary block are coded, and used as the region boundary data.

As the retrieval range of the similar block, all the picture or a limited range thereof can be used. Further, the retrieval range can be set around the block. The similar block can be decided by selecting a similar block having the least square error or a similar block having a square error less than a threshold level or by use of the fractal dimension or dispersion. When the threshold value is set, it is possible to reduce the amount of calculations for retrieving the similar block. In the following description, the retrieval block is set to a limited range in the periphery of the block, and the case where the square (the second power) error is used as a scale will be explained.

On the other hand, the some conditions can be set so that an unclear boundary can not be detected and, as a result, a similar block will not be decided from a different region. For instance, in FIG. 79, the case where the square errors between the block 177 of a flat region A and a block D4 of another region B becomes the minimum values in the retrieval range is taken into account. The square error becomes smaller in the order of the blocks of D4<D1<D2<D3.

Figure 79:
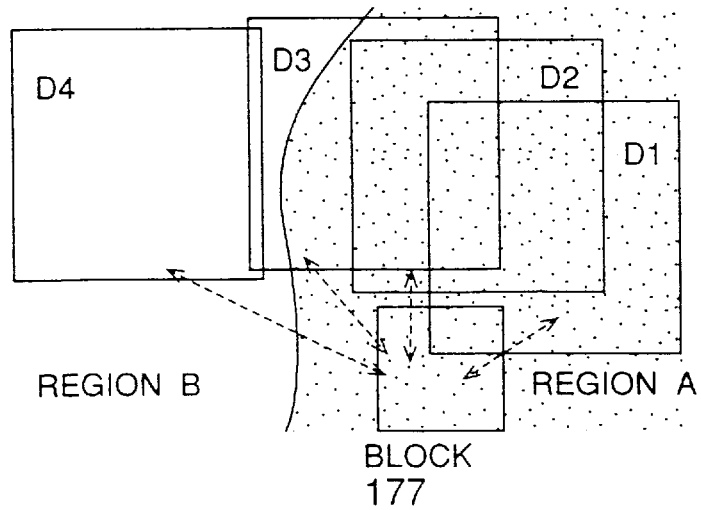
FIG. 79 is an illustration for assistance in explaining an example of how to obtain a similar region in correspondence to each block in the picture region boundary representing method and apparatus according to the present invention.

In the flat region A, since the square error is small during the retrieval, the similar block is not selected from another region so easily. However, when a difference in luminance is small and therefore the region boundary 178 is not clear as shown in FIG. 79, since the luminance of another adjacent region B is similar, a similar block D4 can be selected from another region B having the minimum square error. When retrieved from the periphery of the coded block 177 shown in FIG. 79 in the order of 1 to 4, the square error of the block D3 having the region boundary increases, as compared with the square error of the block D2 having no region boundary, so that the this status can be detected by the following two conditions:

the square error between the block and the similar block is equal to or less than a threshold value Th, and further the square error between the current block and the similar block increase abruptly in comparison with the square error between the preceding block and the similar block.

Therefore, since the square can be detected on the basis of the above conditions, the retrieval is completed when these conditions have been satisfied, and the block having the minimum square error before now is decided as the similar block D1.

Figure 80:
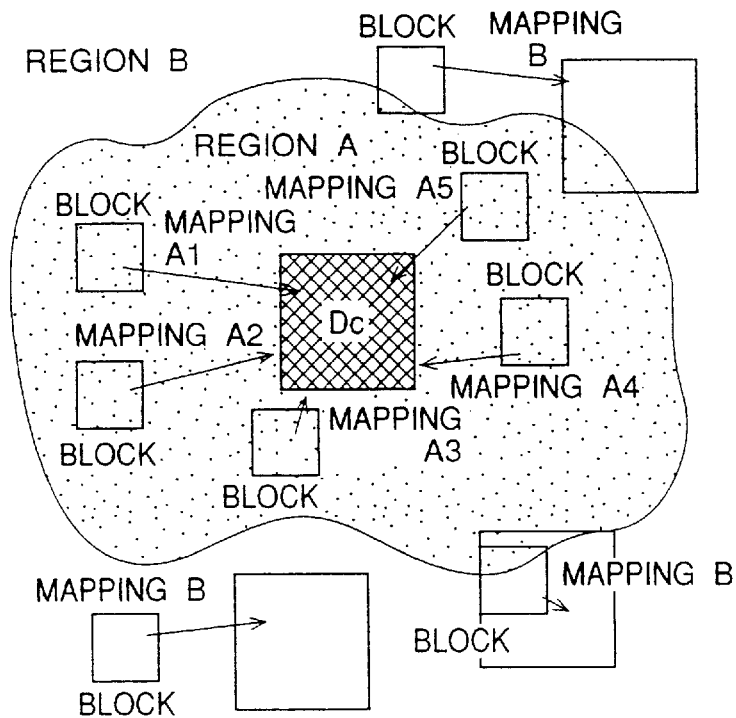
FIG. 80 is an illustration for assistance in explaining another example of how to obtain a similar region in correspondence to each block in the picture region boundary representing method and apparatus according to the present invention.

On the other hand, there exists such a method that a similar block representative of a flat region is previously set to facilitate of deciding the attribute. This method will be explained with reference to FIG. 80.

Before the peripheral coded blocks are retrieved, a difference in the square error between each block and the similar block $D_c$ (representative similar block in the previously set region A) is obtained. When this error is smaller to some extent, the blocks are considered to belong to the same region A, and the mapping A1 to A5 to the representative block $D_c$ are executed as the mapping to the block. Therefore, since the mapping points transformed in this method can be collected effectively in the set similar block $D_c$, the clustering can be executed easily.

Figure 81:
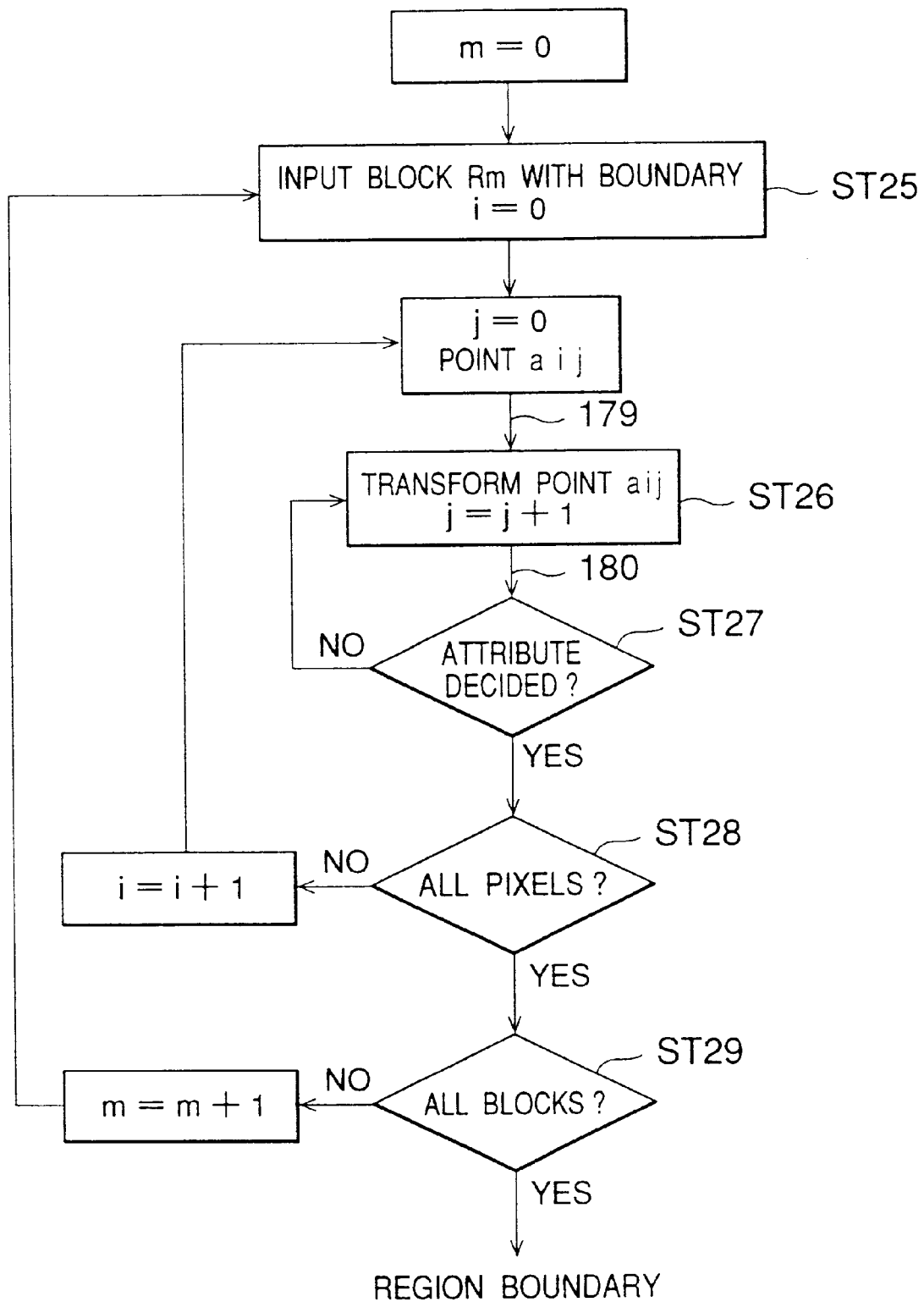
FIG. 81 is a flowchart showing an algorithm of a region boundary reproducing method for reproducing the region boundary represented by the picture region boundary representing method and apparatus according to the present invention.

FIG. 81 is a flowchart showing the procedure of a method of reproducing the boundary represented by the picture region boundary representing method according to the present invention.

First in step ST25, control inputs a desired region boundary block $R_m$. Further, control inputs the pixel $a_0$ (179) in the region $R_m$. In step ST26, control transforms the pixel $a_0$ in accordance with the mapping allowed to correspond to $R_m$. In step ST27, control discriminates whether the transformed mapping point $a_{ij}$ (180) lies in a desired region or not. Since the data for deciding the outside and the inside of the boundary block in the desired region can be given together with the position data, when the mapping point $a_{ij}$ moves out of the boundary block, control discriminates this, so that control proceeds to step ST28. If staying in the boundary block, since cannot be discriminated at this time, control obtains the mapping point $a_{ij}$ repeatedly in steps ST26 and 27, until the pixel goes out of the boundary block. In step ST28, control discriminates whether the attribute of all the pixels in $R_m$ can be decided. If all the pixel attributes are decided, control proceeds to step ST29. If not decided yet, control repeats the steps ST26 to ST28 to execute the similar processing for the succeeding pixel. In step ST29, when the region boundary has been obtained for all the designated blocks, control ends. If not yet obtained, control repeats the procedure for the succeeding coded block beginning from the step ST25.

Figure 82:
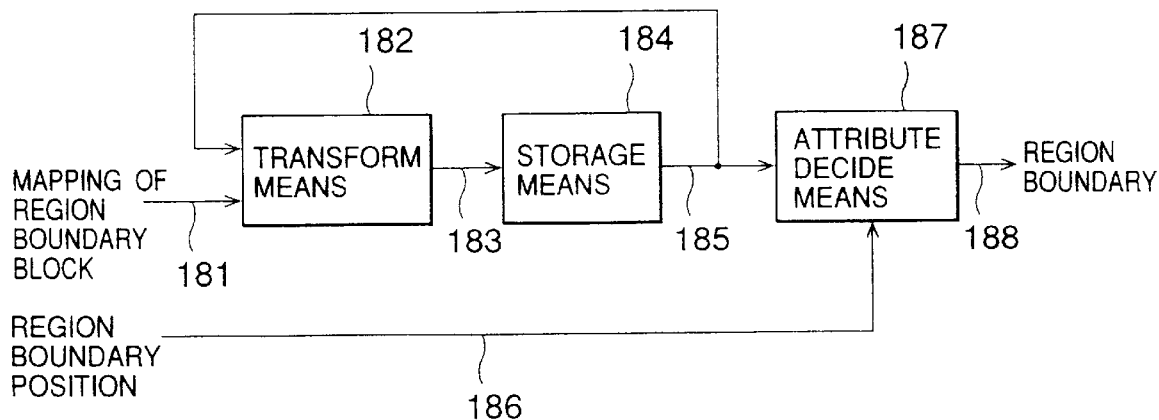
FIG. 82 is a block diagram showing a region boundary reproducing apparatus for reproducing the region boundary represented by the picture region boundary representing method and apparatus according to the present invention.

FIG. 82 is a block diagram showing an apparatus for reproducing the boundary represented by the picture region boundary representing apparatus according to the present invention.

The mapping data 181 of the desired region boundary block are inputted to transform means 182. The mapping points 183 transformed by the transform means 182 are stored in the storage means 184. The stored mapping point 185 and the region boundary position data 186 are inputted to attribute deciding means 187 to decide the attribute of the mapping point 185 (i.e., whether the mapping point lies outside or inside a designated region). Further, if the attribute cannot be decided, the mapping point 185 is inputted again to the transform means 182, repeating the similar processing. If the attribute can be decided, the attribute deciding means 187 outputs the region boundary 188 as the final output.

When the region boundary is reproduced, only the pixels within the boundary block are transformed on the basis of the position data of the boundary block. The attribute decided at this time is either one of the inside and the outside of the boundary. After the attributes of all the pixels in the boundary block have been decided, the detailed boundary of the region can be reproduced.

When the boundary block position and the mapping are coded in variable length, these data can be represented by a smaller number of bits. At this time, in the present invention, the variable-length coding means (or method) is added to the final output of the image boundary representing apparatus (or method), and the decoding means (or method) is added to the input of the reproducing apparatus (or method).

The coding/decoding can be coded together by using the parallel shift parameter and the position data as one data source, or separately. For instance, Huffman coding can be considered for the parallel shift parameter, and run-length coding or chain coding can be considered for the position data.

When attribute numbers are used as one of the used data, instead of the boundary block position, it is possible to reduced the total region boundary data. In the reproduction case, the attributes are decided for all the pixels of the picture, and the region boundary can be obtained by the decided attribute numbers.

There exists such a case that other data can be inputted, instead of the selection of any desired region.

For instance, the first case is as follows: although the region previously required to be transmitted is extracted in unit of block, the region boundary is required to be represented in more detail beyond the block unit. In this case, the region dividing method and apparatus as proposed in the present invention are not necessary. Further, since the retrieval range of the similar block to the boundary block of the previously given region can be limited in a previously extracted region, the quantity of calculations can be reduced. Further, since the other unnecessary regions are almost not included in the retrieval range, the possibility that the similar block is selected from another region erroneously becomes low.

The second case is as follows: a boundary block previously required to be transmitted is given. In this case, the retrieval range of the similar block can be limited and further the boundary block is not required to be detected, as already explained. In addition, the quantity of calculations can be reduced.

Figure 83:
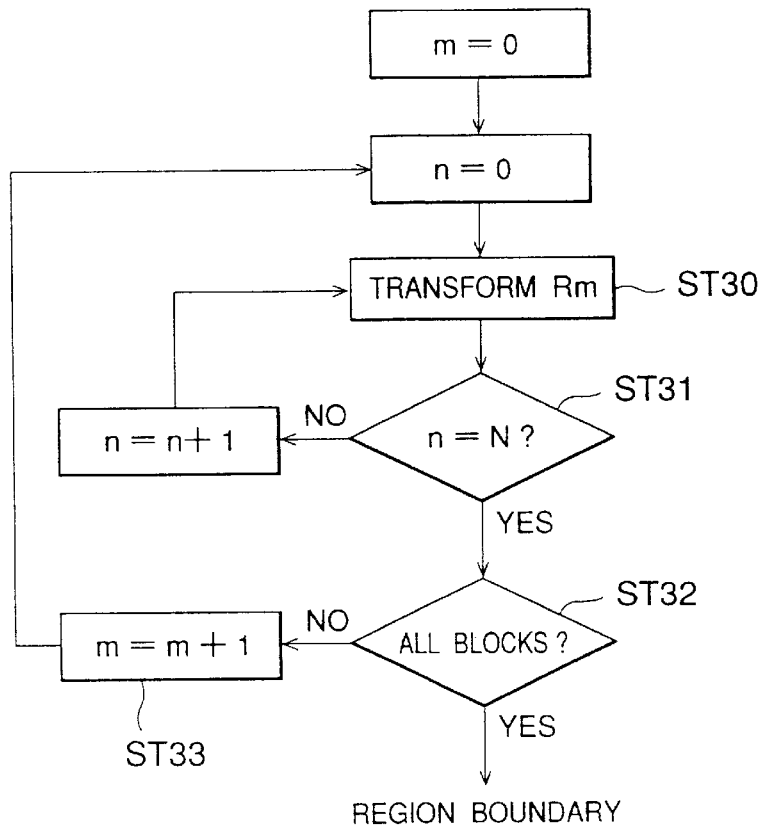
FIG. 83 is a flowchart showing another algorithm of a region boundary reproducing method for reproducing the region boundary represented by the picture region boundary representing method and apparatus according to the present invention.

FIG. 83 is a flowchart showing another method of reproducing the region boundary, which is different from that already explained with reference in FIG. 81.

In step ST30, control transforms pixels in the desired region boundary block $R_m$ inversely on the basis of parameter of the desired region boundary block $R_m$. In other words, the pixel of the similar block corresponding to each pixel of the block is transformed and specified, and then the block pixel is replaced with a specified pixel. This transform step is repeated by a predetermined N-times. In step ST31, control discriminates whether the N-time transforms has been completed, and proceeds to step ST32. In step ST32, control discriminates whether all the designated region boundaries have been inversely transformed. If yes, control ends the procedure. If not, control proceeds to the succeeding step to repeat the inverse transform beginning from the step ST30.

Figure 84:
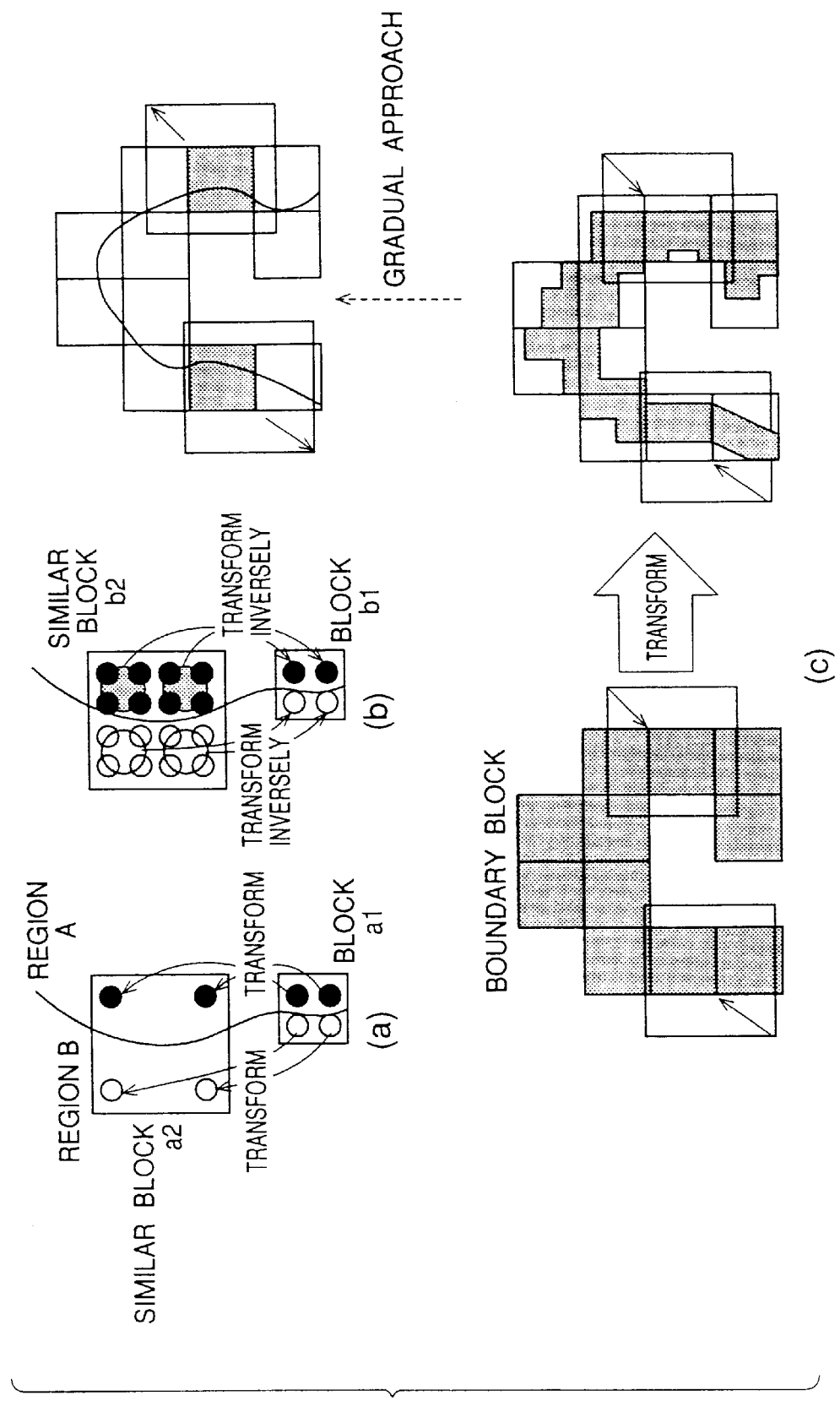
FIGS. 84(a) to (c) are illustrations for assistance in explaining the principle of another algorithm of the region boundary reproducing method for reproducing the region boundary represented by the picture region boundary representing method and apparatus according to the present invention.

The principle of this will be explained with reference to FIG. 84. In the reproduction principle as already explained, since the mapping is made by transforming a block $a_1$ to a similar block $a_2$ larger than the block $a_1$, the distance between the mapping point and the boundary increases as shown in FIG. 84(a), the phenomenon that the mapping points can be gathered on the inside of the region A is utilized. In this case, however, the reproduction method uses the inverse transform of the same mapping. In other words, as shown in FIG. 84(b), each pixel of the similar block is transformed to each pixel of the block. Therefore, when "0" and "1" are allocated to the pixel values of the blocks of the boundary block and the other block, when the inverse transform is executed for reduction as shown in FIG. 84(b), more detailed lines are reproduced gradually as shown in FIG. 84(c). By repeating this, a segment picture which represents a region boundary can be obtained finally.

In this reproducing method and apparatus, since the same region parameter can be used for representing the region shape obtained by the region boundary representing method and apparatus according to the present invention, the data indicating the inside and the outside of the region is not necessary. Therefore, in this reproducing method, it is possible to further reduce the region boundary data.

Two systems which can be realized by utilization of the present invention will be described hereinbelow by way of example.

Figure 85:
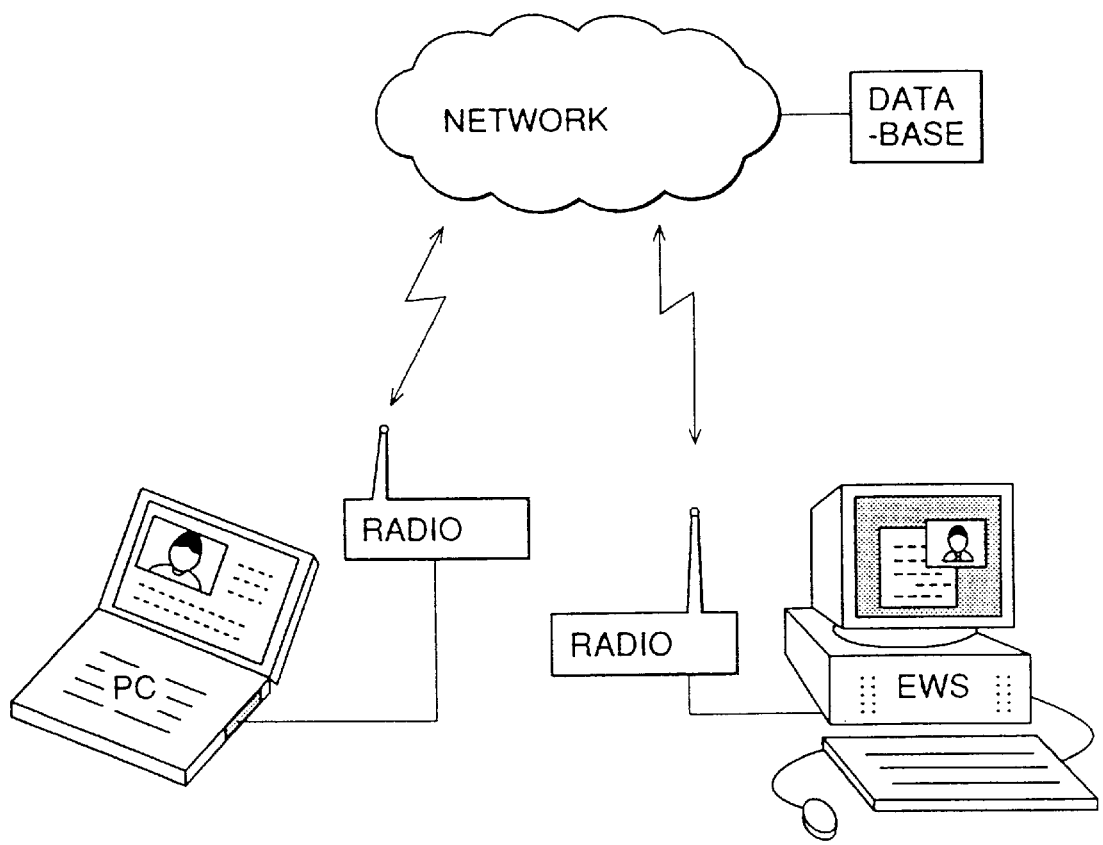
FIG. 85 is an illustration showing an example of a radio communications system using the picture region boundary representing method and apparatus according to the present invention.

FIG. 85 shows a system for performing radio communications between two terminals. Since the quantity of transmittable data is very small in the case of the radio communications, as compared with the cable communications, the compression technique for video signals of huge data quantity is indispensable. Therefore, when pictures are required to be transmitted each other, video signals are compressed at each terminal; the compressed picture data are received each other; and the pictures are reproduced at each terminal, respectively. In this case, in particular when the picture data are compressed, if the region boundary representing method according to the present invention is used, it is possible to realize effective communications according to the usage, by extracting only a specific region, by compressing only the region required to be transmitted, or by reproducing a picture by distributing many bits to only an important region (to obtain a clear picture), etc.

Figure 86:
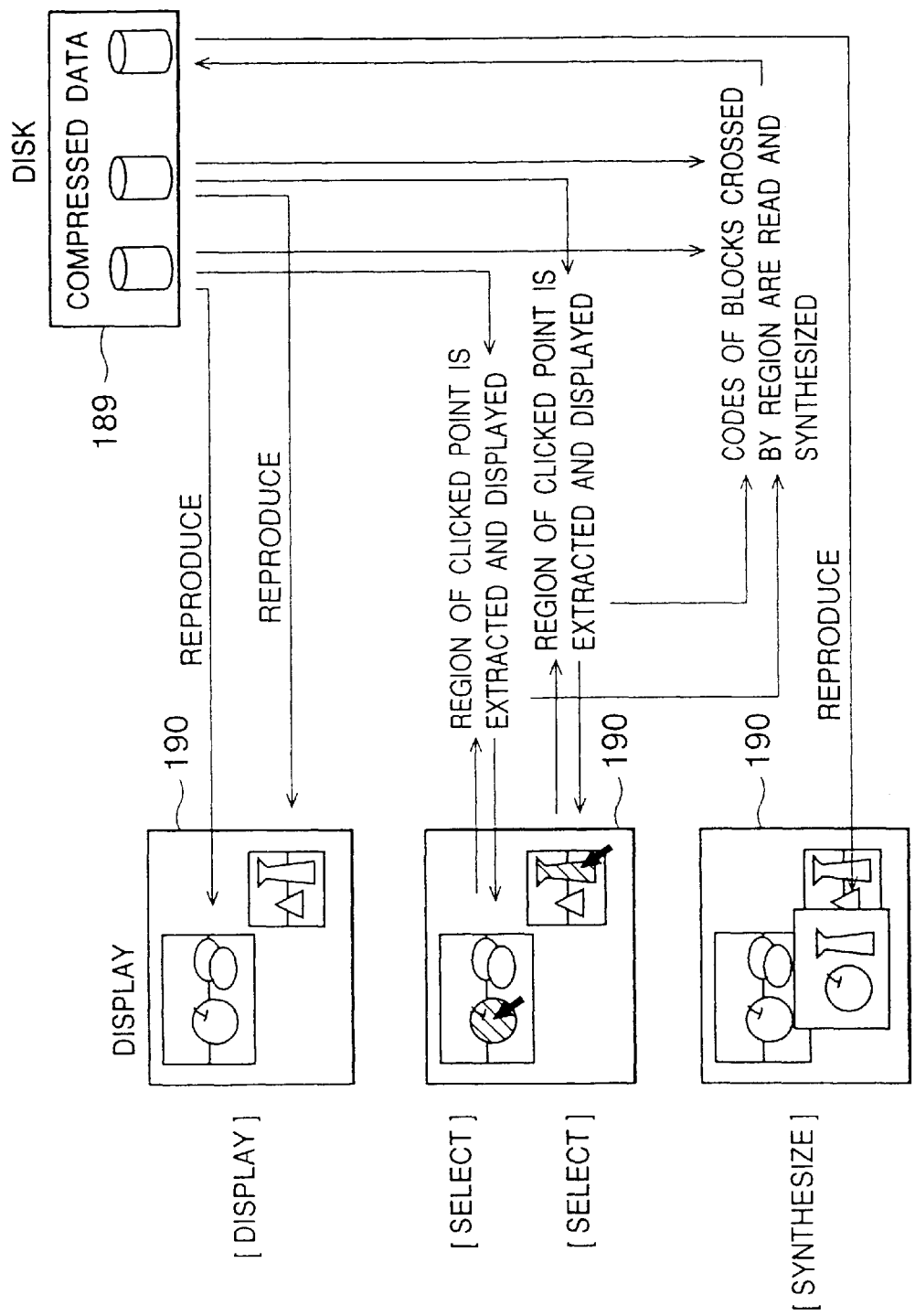
FIG. 86 is an illustration showing an example for realizing a picture synthesizing tool by using the picture region boundary representing method and apparatus according to the present invention.

Further, a picture synthesizing tool by use of the picture region dividing method according to the present invention will be described hereinbelow. When the present invention is utilized, a picture can be formed by synthesizing the compressed data. FIG. 86 shows an example of this system. In this system, some fractal-coded compressed video data are previously stored in a disk 189. The user reads necessary video data from the disk 189 and reproduces pictures and display them on a display unit 190. Here, for instance, when a different picture is required to form by specifying objects on two different pictures, only a region clicked by the user on the picture is extracted by using the region dividing method according to the present invention (the extracting method is described in the first embodiment), to detect a block covering the region. Then, the extracted region is arranged at any desired position to form a desired synthesized picture. As well understood from the principle of region division, since the mapping points in one region can be represented by use of the pixels in the region, as far as there are the parameters of the region, the region can be reproduced. Simultaneously, the parameters of the region boundary block are written at the addresses corresponding to the desired position, to form the compressed data of a synthesized picture. When the compressed data are reproduced, the desired synthesized picture as shown can be obtained. This system can be used for the preceding example (shown in FIG. 85) in which the radio receiver-transmitters are used.

In this tool, it is unnecessary to compress the synthesized picture again. Further, the compressed data of the synthesized picture can be substituted by the address indicative of the desired region in the original picture data. In many cases, the synthesized pictures can be stored effectively.

What is claimed is:

1. A method for image representation such as decoding using compressed image data, wherein an image is represented as a pixel value provided at each pixel in an image plane which is divided into a plurality of blocks, and compressed data include at least position data of a similar region about each of said blocks and conversion data of said pixel value, comprising:

a) a step of setting an initial value of said pixel value by applying to a pixel position mapping points which are represented by coordinates and said pixel value of said image plane;

b) a step of performing a map in which each of mapping points moves from a block including said mapping points to a corresponding position in the similar region, and said pixel value is converted at the same time, wherein each of said mapping points is directly representative of a position of a pixel;

c) a step of repeating said map;

d) a step of judging said mapping points as a positive divergence when a pixel value of the mapping point exceeds a predetermined uppermost value, judging said mapping points as a negative divergence when a pixel value of the mapping point goes below a predetermined lowermost value, and judging mapping points not to be divergent when the mapping point stays between said predetermined uppermost and lowermost values even though a predetermined number of maps are repeated; and a step of changing said initial value by setting the pixel value from an initial value until judged not to be divergent or at a boundary value between initial values of said positive divergence and said negative divergence.

2. An apparatus for image representation such as decoding using compressed image data, wherein an image is represented as a pixel value provided at each pixel in an image plane which is divided into a plurality of blocks, and compressed data including at least position data of a similar region about each of said blocks and conversion data of said pixel value, comprising:

a) means for holding said compressed data;

b) means for setting an initial value of said pixel value by applying to a pixel position mapping points, which are represented by coordinates, and said pixel value of said image plane;

c) means for holding said pixel value and a position of said mapping points;

d) means for performing a map in which each of the mapping points moves from a block including said mapping points to a corresponding position in the similar region, and said pixel value is converted at the same time, wherein each of the mapping points is directly representative of a position of a pixel;

e) means for repeating said map;

f) means for judging a mapping point as a positive divergence when a pixel value of the mapping point exceeds a predetermined uppermost value, judging the mapping point as a negative divergence when a pixel value of the mapping points drops below a predetermined lowermost value, and judging the mapping point not to be divergent when the mapping point stays between said predetermined uppermost and lowermost values even though a predetermined number of maps are repeated;

g) means for changing said initial value by setting the pixel value from an initial value until judged not to be divergent or at a boundary value between initial values of said positive divergence and said negative divergence; and h) means for holding said pixel value.

* * * * *